United States Patent [19]

Elgamal et al.

[11] Patent Number: 5,825,890
[45] Date of Patent: Oct. 20, 1998

[54] SECURE SOCKET LAYER APPLICATION PROGRAM APPARATUS AND METHOD

[75] Inventors: Taher Elgamal, Palo Alto; Kipp E.B. Hickman, Los Altos, both of Calif.

[73] Assignee: Netscape Communications Corporation, Mountain View, Calif.

[21] Appl. No.: 889,879

[22] Filed: Jul. 1, 1997

Related U.S. Application Data

[63] Continuation of Ser. No. 519,585, Aug. 25, 1995, Pat. No. 5,657,390.
[51] Int. Cl.⁶ ........................................................ H04L 9/00
[52] U.S. Cl. ........................................... 380/49; 395/682
[58] Field of Search ................... 380/49, 23, 24, 380/25, 4; 395/682; 370/60, 94.1

[56] References Cited

U.S. PATENT DOCUMENTS

| | | | |
|---|---|---|---|
| 5,550,984 | 8/1996 | Geib | 380/49 |
| 5,553,239 | 9/1996 | Heath et al. | 380/25 |
| 5,657,390 | 8/1997 | Elgamal et al. | 380/49 |
| 5,671,279 | 9/1997 | Elgamal | 380/23 |
| 5,673,322 | 9/1997 | Pepe et al. | 380/49 |

*Primary Examiner*—David Cain
*Attorney, Agent, or Firm*—Limbach & Limbach, LLP

[57] ABSTRACT

A computer program product comprising: a computer useable medium having computer readable program code means embodied therein for encrypting and decrypting information transferred over a network between a client application program running in a client computer and a server application program running in a server computer, the computer readable program code means in the computer program product comprising: computer readable program code means for providing a socket application program interface to an application layer program; computer readable program code means for providing encrypted information to transport protocol layer services; computer readable program code means for encrypting information received from an application layer program; and computer readable program code means for decrypting information received from transport protocol layer services.

27 Claims, 10 Drawing Sheets

| | |
|---|---|
| client-hello | C→S: challenge, cipher_specs |
| server-hello | S→C: connection-id, server_certificate, cipher_specs |
| client-master-key | C→S: {master_key}server_public_key |
| client-finish | C→S: {connection-id, handshake-hash}client_write_key |
| server-verify | S→C: {challenge}server_write_key |
| server-finish | S→C: {new_session_id, handshake-hash}server_write_key |

FIG. 4

| | |
|---|---|
| client-hello | C→S: challenge, session_id, cipher_specs |
| server-hello | S→C: connection-id, server_id_hit |
| client-finish | C→S: {connection-id, handshake-hash}client_write_key |
| server-verify | S→C: {challenge}server_write_key |
| server-finish | S→C: {new_session_id, handshake-hash}server_write_key |

FIG. 5

| | |
|---|---|
| client-hello | C→S: challenge, session_id, cipher_specs |
| server-hello | S→C: connection-id, session_id_hit |
| client-finish | C→S: {connection-id, handshake-hash}client_write_key |
| server-verify | S→C: {challenge}server_write_key |
| request-certificate | S→C: {auth_type,challenge} server_write_key |
| client-certificate | C→S: {cert_type,client_cert, response_data}client_write_key |
| server-finish | S→C: {new_session_id, handshake-hash}server_write_key |

FIG. 6

| | |
|---|---|
| client-hello | C→S: challenge, cipher_specs |
| server-hello | S→C: connection-id, server_certificate, cipher_specs |
| client-dh-key | C→S: Y,random |
| client-session-key | C→S: {session_key_1}master_key, {random} session_key_1 |
| client-finish | C→S: {connection-id, handshake-hash}client_write_key |
| server-finish | S→C: {new_session_id, handshake-hash}server_write_key |

FIG. 7

SECURE SOCKET LAYER APPLICATION PROGRAM APPARATUS AND METHOD

This is a continuation of Ser. No. 08/579,585 filed Aug. 25, 1995 now U.S. Pat. No. 5,657,390.

BACKGROUND OF THE INVENTION

1. Field of the Invention

The invention relates generally to computer networks, and more particularly, to securing private communications between networked computers.

2. Description of the Related Art

There is an increasing need for security in communications over public and private networks. The expanding popularity of the Internet, and especially the World Wide Web, have lured many more people and businesses into the realm of network communications. There has been a concomitant rapid growth in the transmission of confidential information over these networks. As a consequence, there is a critical need for improved approaches to ensuring the confidentiality of private information.

Network security is a burgeoning field. There are well known encryption algorithms, authentication techniques and integrity checking mechanisms which serve as the foundation for today's secure communications. For example, public key encryption techniques using RSA and Diffie-Hellman are widely used. Well known public key encryption techniques generally described in the following U.S. Pat. Nos.: 4,200,770 entitled, Cryptographic Apparatus and Method, invented by Hellman, Diffie and Merkle; 4,218,582 entitled, Public Key Cryptographic Apparatus and Method, invented by Hellman and Merkle; 4,405,829 entitled Cryptographic Communications System and Method, invented by Rivest, Shamir and Adleman; and 4,424,414 entitled, Exponentiation Cryptographic Apparatus and Method, invented by Hellman and Pohlig. For a general discussion of network security, refer to *Network and Internetwork Security*, by William Stallings, Prentice Hall, Inc., 1995.

In spite of the great strides that have been made in network security, there still is a need for further improvement. For example, with the proliferation of heterogeneous network environments in which different host computers use different operating system platforms, there is an increasing need for a security mechanism that is platform independent. Moreover, with the increasing sophistication and variety of application programs that seek access to a wide range of information over networks, there is an increasing need for a security mechanism that can work with many different types of applications that request a wide variety of different types of information from a wide variety of different types of server applications. Furthermore, as security becomes more important and the volume of confidential network transactions expands, it becomes increasingly important to ensure that security can be achieved efficiently, with minimal time and effort. The present invention meets these needs.

SUMMARY OF THE INVENTION

In one aspect, the invention provides a sockets application program interface bound to a security protocol which is layered between an application layer and transport layer. The socket interface is widely used in network environments. This facilitates integration of the invention into a wide range of host machines connected to a network. Placing the security protocol between the application layer and the transport layer enables many different types of application programs to employ the new security with only slight modification. Moreover, the security protocol can communicate with many different operating system platforms without requiring operating system changes.

In another aspect, the invention provides a more efficient handshake protocol and session key generation scheme. When a client and server application first establish a secure sockets connection, in accordance with the invention, they engage in a novel handshake protocol in which they negotiate security procedures, produce a master key and generate session keys to be used to encrypt and decrypt information transferred through the sockets connection. If there are multiple connections between the client and server applications during a prescribed time interval, then the handshake protocol may elect to reuse a previously negotiated master key, thereby obviating the need to generate a new master key, and saving time in establishing a secure connection.

These and other features and advantages of the invention will become more apparent from the following description of exemplary embodiments thereof, as illustrated in the accompanying drawings.

BRIEF DESCRIPTION OF THE DRAWINGS

FIG. 4 illustrates client/server message flow, in accordance with a present embodiment of the invention, using the RSA protocol where no session-identifier is found;

FIG. 5 shows client/server message flow, in accordance with a present embodiment of invention, using the RSA protocol where there is a shared session-identifier;

FIG. 6 shows client/server message flow, in accordance with a present embodiment of the invention, using the RSA protocol and there is a common session-identification and client authentication is requested;

FIG. 7 shows client/server message flow, in accordance with a present embodiment of the invention, using a Diffie-Hellman key exchange where there is shared session-identification;

DETAILED DESCRIPTION OF THE PREFERRED EMBODIMENT

The present invention comprises a novel process and related computer program embodied in a computer useable medium for ensuring private communications between application programs running on different computers. The following description is presented to enable any person skilled in the art to make and use the invention. Descriptions of specific applications are provided only as examples. Various modifications to the preferred embodiment will be readily apparent to those skilled in the art, and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

A. The Client—Server Model

This section provides a general description of exemplary host computers (client and server) and the network environment in which they operate.

Figure 1:
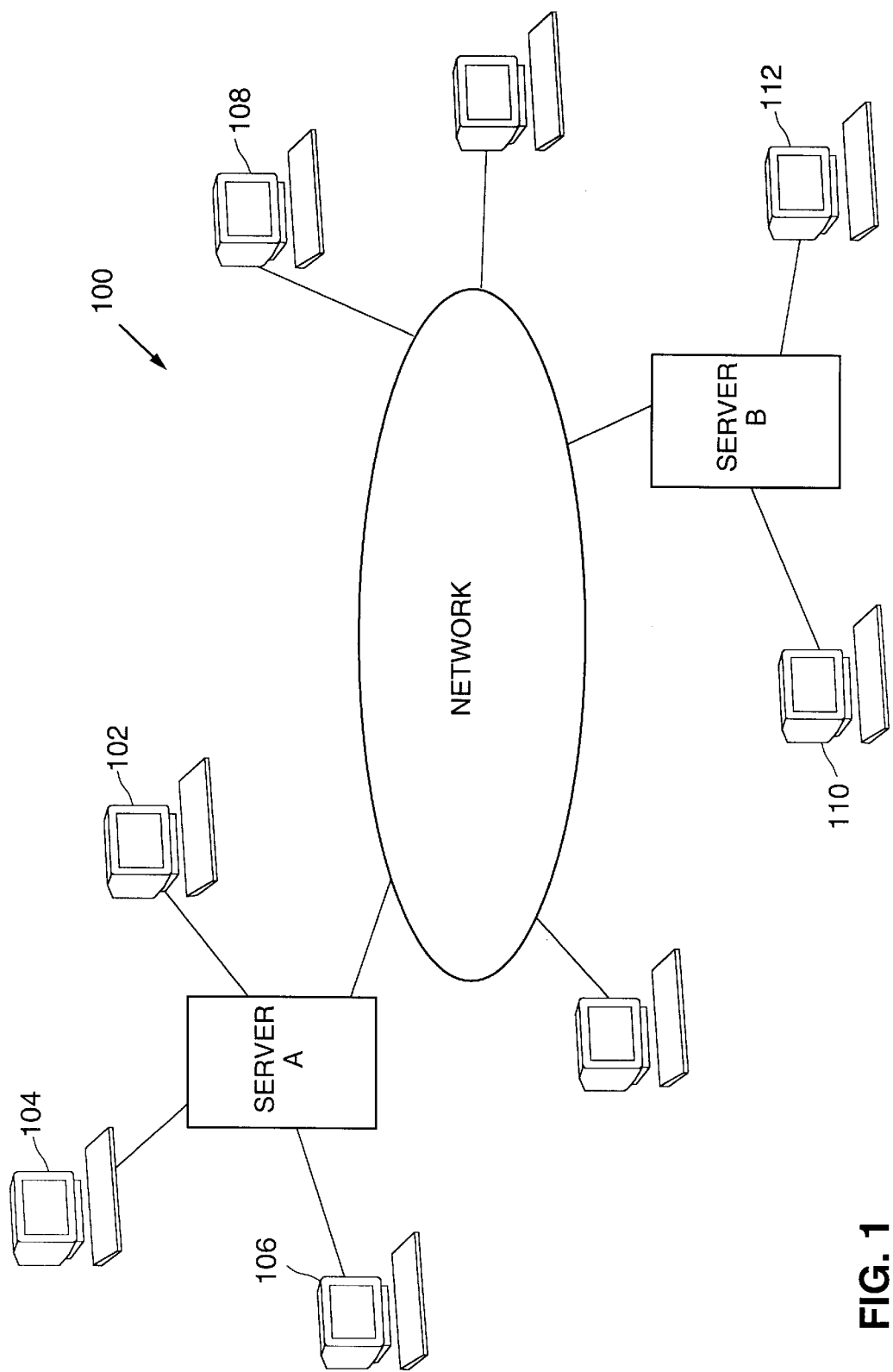
FIG. 1 is a pictorial diagram of a computer network.

FIG. 1 is an illustrative pictorial diagram of a typical well known computer network 100 such as the Internet, for example. The computer network 100 includes small computers, such as computers 102, 104, 106, 108, 110 and 112 and large computers, such as computers A and B, commonly used as servers. In general, small computers may be "personal computers" or workstations and are sites where a human user operates the computer to make requests for data or services from other computers on the network. Often, the requested data resides in the large computers referred to as servers. In this scenario, the small computers are client systems and the large computers are servers. In this specification, the term "client" refers to a computer's general role as a requester of data or services, and the term "server" refers to a computer's role as a provider of data or services. In general the size of a computer, in terms of its storage capacity and processing capability, does not necessarily affect its ability to act as a client or server. Further, it is possible that a computer may request data or services in one transaction and provide data or services in another transaction, thus changing its role from client to server or vice versa.

Figure 2:
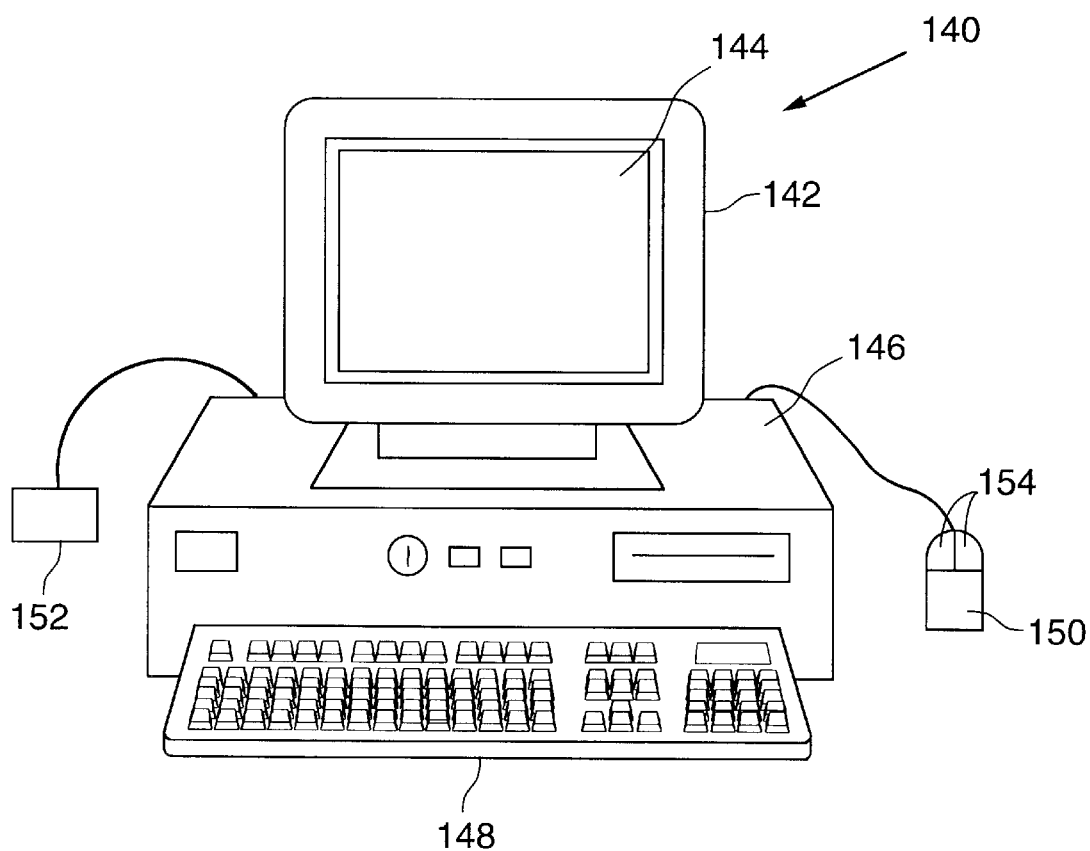
FIG. 2 is an illustrative drawing of a computer of the network of FIG. 2.

The illustrative drawing of FIG. 2 shows an exemplary well known client computer system 140. It includes a display device 142 (such as a monitor), a display screen 144, a cabinet 146 (which encloses typical computer components such as a CPU, RAM ROM, video card, hard drive, network adapter card, serial ports, etc.), a keyboard 148, a mouse 150, and perhaps a modem 152. The modem, for example, allows the client computer system to be connected to an Internet network via phone lines, for example.

B. HTML Documents and HTTP

This section describes the use of identification tags to designate hyperlinks using HTML documents and HTTP as an example. As explained in the specification, however, the present invention applies to other types of documents as well, such as Adobe PDF, voice documents and motion picture and still picture documents.

In order to make the transfer of data from one arbitrary computer to another possible, uniform protocols have been developed. An early attempt at creating a uniform protocol for data transfers over the Internet is File Transfer Protocol (FTP). More recent protocols include Gopher developed at the University of Minnesota and the World Wide Web project which defined the HyperText Transfer Protocol (HTTP). HTTP has been defined by an Internet Draft dated Nov. 5, 1993 and subsequent drafts.

By providing uniform protocols so that clients may request objects and servers may deliver objects to clients, computers on the Internet are able to easily transfer different types of information such as text and images. By using the HyperText concept an efficient user interface is provided to a human user that allows the user to discover what information is available and to request the information.

Figure 3:
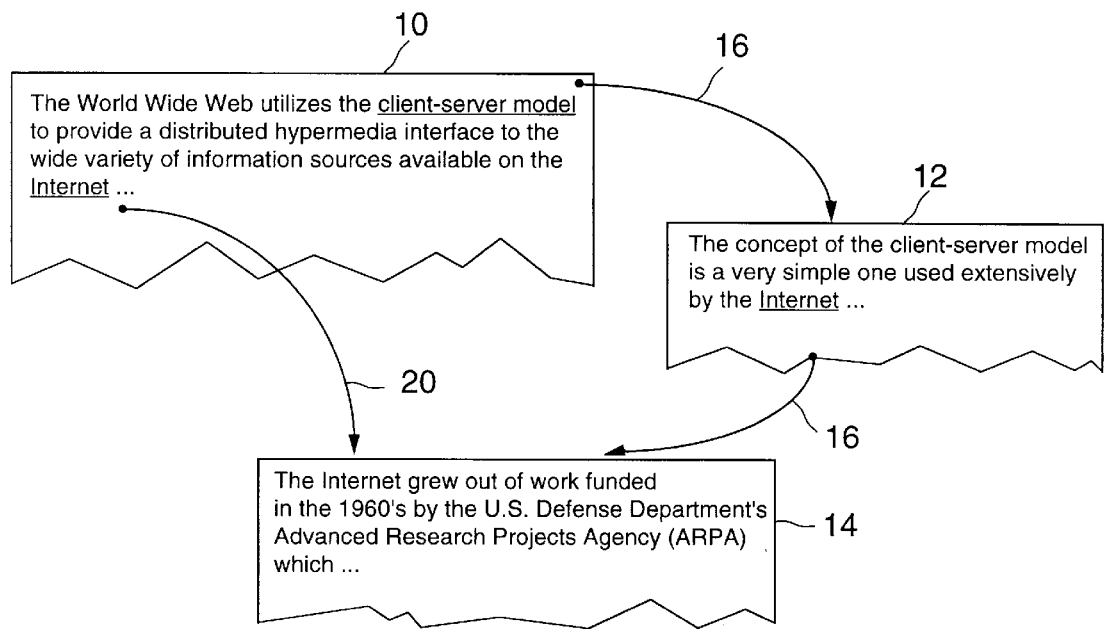
FIG. 3 is an illustrative diagram of an electronic document with hyperlinks.

An illustration of the HyperText concept is shown in FIG. 3. In FIG. 3, a portion of document 10 is shown. This is symbolic of text which would appear, for example, on a computer display screen as viewed by a user. Text portion 10 includes simple text and HyperText, the latter being text associated with a link. In text portion 10 there are two HyperText phrases associated with links. The first one is "client-server model" while the second is "Internet". The fact that these text phrases are associated with links is indicated by the underlining of the text phrases.

The first phrase "client-server model" is linked to text document 12 by means of link 16. Text document 12 is a separate document from text document 10. Text document 12 may reside in the same computer system as text document 10 or text document 12 may be in a remote location such as in a storage device connected to a server that is geographically removed from the computer system that a user is operating to view document 10.

In practice, links such as 16 can be implemented in a document, such as document 10, by using a special text format that allows embedded tags or other symbols within the text to specify a link. These embedded tags are not displayed to a user reading the text. One popular tag syntax is part of the HyperText Markup Language (HTML) and uses a Uniform Resource Locator (URL) form of addressing. The URL is unique for each object on the network. Objects may be text documents, images, sounds, programs or other forms of digital data. In FIG. 3, documents 12 and 14 are text objects pointed to by HyperText links. A HyperText link can be specified in a number of ways with HTML's. The use of URLs is merely a currently popular standard way to specify links.

Once specified, link 16 allows a user who is viewing document 10 to easily retrieve document 12. The user is provided with a simple and obvious indication that the phrase "client-server model" is a HyperText link to another document by the underlining. Since the phrase is one that is being used in context within the document the user is reading, the user may make a timely decision to learn more about the subject of the HyperText phrase. For example, in FIG. 3, the HyperText phrase "client-server model" links to document 12 which provides a further description of a client-server model.

A common way for the user to access document 12 while viewing document 10 on a display screen of a computer system is to move a pointer on the display screen by means of an input device, such as a mouse, so that the pointer is over the phrase "client-server model". The user then depresses the mouse button to "click on" the phrase. This causes the user's computer system to retrieve document 12 either from local storage or from a remote location connected to the user's computer via a network such as the Internet. Once document 12 is retrieved, the user's computer system displays the document, or a portion of the document, on the user's display screen.

Similarly, the second phrase in document 10, "Internet . . . allows the user to access document 14 by link 20. In other words, if the user clicks on the HyperText phrase "Internet" document 14, or a portion of document 14, is displayed on the user's screen. HyperText documents can have nested linking. Document 12 is the target of a HyperText link and may, itself, have HyperText links within it as shown in FIG. 3 where link 18 is associated with the HyperText "Internet" in document 12. Note that the same word or phrase may function as a link in different documents and different documents may link to a common document. Many variations on HyperText linking from that shown in FIG. 3 are possible.

C. Overview of Sockets API and Secure Sockets Layer (SSL) Interface

A current embodiment of the invention provides a security protocol layered beneath an application protocol used by an application program to communicate over a network. The security protocol is implemented through a "Secure Sockets Layer" library (the SSL library) which is bound to the application program. The SSL library modules emulate the widely known "sockets" application program interface (API). The sockets API is supported by most major operating systems including UNIX and Microsoft Windows. For a general discussion of the sockets interface, refer to, *Internetworking with TCP/IP* volume 1, by Douglas E. Comer, Prentice-Hall, Inc. 1995, pages 335–364.

The SSL library establishes a sockets connection with an application running on a remote computer and then performs a security handshake. Once the security handshake is complete, the SSL library then encrypts and decrypts all data sent to and received from a remote host computer through the socket connection. The SSL library is used with a reliable transport protocol. For the UNIX Windows environments, this is commonly provided by TCP/IP. The sockets API also can be used to provide access to Xerox XNS, Novell SPX/IPX and the OSI protocols as well.

The sockets API typically serves as an interface used by applications to communicate with the TCP/IP protocol stack. Generally, the client and server programs each invoke operating system functions that set up an association between them referred to as a sockets connection. The client and server applications then invoke operating system functions to send and receive information between them over a network, such as the Internet, in a similar manner to calling functions to perform ordinary input/output. The information, for example, may include graphics, data, instructions and even computer programs. The sockets connection between the two programs uses data structures which allow access to TCP/IP services. The sockets API ordinarily provides a series of system calls that application programs can invoke to request sockets connection communication services.

More specifically, the typical approach to using sockets is that a server application creates an open socket ready to accept connections at a given IP address and (well known) port. Once such a socket has been created, buffer space can be allocated to store incoming connection requests. The server socket ordinarily behaves as a passive endpoint waiting for a connection request to arrive from a client. In order for a client to send a connection request to a passive socket, the socket must have a name. Therefore, names are bound to sockets and are published so that a remote client can address the named socket. To initiate a connection to a remote socket a client application ordinarily requests a connection and specifies a local (client) socket and a remote name as parameters. Multiple clients can use a single server socket. Client requests can be queued in a buffer associated with the server socket. Typically when a request is accepted from the queue, a new socket is created and the new socket is used as the server side connection endpoint with a client. In this manner, a single well known port number can be used to establish many simultaneous socket connections. A shutdown (or close) request usually is employed to terminate a socket connection.

Thus, in a present embodiment of the invention, an application layer program makes sockets calls to its SSL library which sets up a sockets connection and also ensures security during data transmission over the network. There are important advantages in binding a connection interface (sockets API) plus a security protocol (described below) in a layer between an application program layer and a transport layer in accordance with the invention. For example, since the sockets API is so widely used by application programs and operating systems, the SSL's sockets API can be adopted for use in a broad range of network environments. Moreover, since the SSL library of the presently preferred embodiment of the invention, is disposed between the application program layer and the transport layer, security can be provided to multiple different types of applications without significant modification to the applications themselves. Furthermore, changes in security requirements or procedures often can be more readily implemented by changing security protocols disposed above the transport layer, which is typically implemented as part of the operating system, than by changing the operating system itself. As explained above, the SSL library is layered between the application layer programs and the operating system transport control protocol stack. As a result, SSL security can be modified and upgraded without changing the operating system.

D. SSL Library's Security: Key Exchange, Authentication and Integrity Checks This section explains the apparatus and methods whereby a client application and a server application ensure adequate security during an information exchange between them. Subsequent sections explain the details of a novel "Record Protocol Specification" used during SSL communications between client and server and the details of a novel "Handshake Protocol" used to establish a secure "sockets" layer (SSL) communication channel between client and server. The disclosure in this section references public key algorithms, bulk ciphers, authentication processes and integrity checks in general. It will be appreciated that the principles discussed in this section can be applied to numerous different specific instances of each of these security and integrity check mechanisms. The section below describing the handshake protocol provides many examples of different combinations of public key algorithms, bulk ciphers, authentication processes and integrity checks that can be employed consistent with the invention.

RSA Key Exchange Assuming No "Session-Identifier"

Referring to FIG. 4, there is shown the message flow during handshake protocol negotiation where RSA key exchange is employed and no "session-identifier" is stored in server cache. Note that at the stage at which the message exchange in FIG. 4 begins, the client and server already have established a "sockets" connection between them, and the server has determined that the connection is to be a secure connection that employs the novel SSL processes and program control mechanisms described herein. As explained above, the sockets API is well known. Moreover, in accordance with the invention, the sockets connection is initiated by a client application SSL_open call to its SSL library which is bound to the client application. The data transferred between client and server can be encrypted/decrypted as it is channeled through the socket. But first, before any data is transferred, the client and the server must negotiate an encryption technique for the data transfer, authenticate the connected parties (server and possibly client too), and check the integrity of the agreed upon secure connection. This negotiation is carried out in response to the SSL_open call through message flow of FIG. 4, which takes place using the sockets connection previously set up as part of that same SSL_open call.

The client sends to the server, through the sockets connection, a client-hello message which includes the following information: challenge data and cipher_specs. In the current implementation of the invention, the challenge data is a random number used to ensure channel integrity as explained below. The cipher-specs indicate which bulk ciphers are supported by the client.

The server responds to the client-hello message with a server-hello message which includes the following information: connection_identification, server_certificate and cipher_specs. The connection_identification is a randomly generated set of bits. The server_certificate is issued to the server through well known techniques and is used to certify the authenticity of the server. The cipher_specs sent by the server to the client indicate the bulk cipher to be used during the data transfer. The bulk cipher is selected by the server from the choices provide by the client in the ciper_specs portion of the client-hello message. Since it is possible that there may be multiple different ciphers supported by the client and by the server, it is necessary for the client and server to "negotiate" which cipher to use based upon the available client and server ciphers. Upon receiving the client-hello message, the server determines which server ciphers match the available client ciphers identified in the client cipher_specs portion of the client-hello message. The server selects a cipher to be used to encrypt/decrypt the data to be transmitted and indicates its choice in the cipher_specs portion of the server-hello message.

The client delivers a master key to the server in a client-master-key message. The master key, for example, can be a randomly generated number. The master key is used by the client and the server to produce session keys which will be employed to actually encrypt/decrypt the data to be transferred through the sockets connection. The master key is a shared secret between the client and the server. The master key is delivered by the client to the server in encrypted form using a key exchange encryption algorithm. In FIG. 4, an RSA public key algorithm is employed for key exchange.

Once the master key has been delivered to the server, the server and the client both can independently generate the session keys used to actually encrypt/decrypt data transferred following successful completion of the handshake protocol. The session keys are produced using well known techniques such as through hash functions referenced in the sections below or some other function of the master key and another data value. A more detailed explanation of the session key production techniques used in the presently preferred embodiment of the invention is provided below in the handshake protocol section. It should be understood that, while public key encryption techniques are used for master key exchange, the actual encryption/decryption of data transferred between client and server through the socket is achieved using a well known bulk cipher, such as RC2, RC4 or IDEA, negotiated through the respective cipher specs components of the information exchanged in the client-hello and server-hello messages. The selected bulk cipher uses the session keys to encipher/decipher data and messages transferred through the socket connection.

The client sends a client-finished message which indicates that the client is satisfied with the server. In a present embodiment of the invention, the client-finish message includes a hash of all of the handshake protocol messages previously sent by the client. The hash is encrypted using the agreed upon bulk cipher plus a session key generated by the client, referred to in FIG. 4 as the client-write-key. Note that the hash function also is negotiated as part of the cipher_specs. In addition, the connection-identification previously sent to the client by the server is transmitted to the server with the client-finish message to authenticate the channel. The server uses the client messages handshake hash to verify the integrity of the communication between client and server. This final integrity check will expose third party intervention even if it occurred at the beginning of the handshake protocol.

The server sends a server-finished message which indicates that the server is satisfied with the client and is ready to begin the actual data transfer through the socket connection. In a present embodiment of the invention, the server-finish message includes a hash of all of the handshake protocol messages previously sent by the server. The hash is encrypted using the agreed upon bulk cipher plus a session key generated by the server, referred to in FIG. 4 as the server_write_key. The hash function also is negotiated as part of the cipher_specs. The server uses the server messages handshake hash to verify the integrity of the communication between client and server as explained above.

In addition, a new session_identification is sent together with the hashandshake hash encrypted using the bulk cipher and the server_write_key. This new_session_identification is stored by both the client application and the server application in their respective cache memories together with the master key and the encryption algorithm selection (cipher plus hash) so that, as explained below, the master key can be used again in a future socket connection between the client and the server. Note that if a client machine, for example, is running multiple instantiations of the application program then each instantiation will have its own session-identification.

In a present embodiment, the session_identifications are stored by client application and server application in a table like the following:

| session_ID | machine IP address | master key | encryption algorithm | timer |
|---|---|---|---|---| session_identification table

The server-finish message also includes the challenge data sent by the client to the server in the client-hello message. The challenge data is encrypted by the selected bulk cipher using the server_write_key. The client decrypts the challenge data in order to verify that the key exchange has been successful by testing the ability to encrypt and decrypt the mutually known challenge data using the newly generated session keys.

RSA Key Exchange Assuming a Session-Identifier Found By Client and Server

Referring to FIG. 5, there is shown a sequence of messages transferred through the socket connection when the client and server negotiate the handshake protocol at a time when each stores a common session_identification in its respective cache memory. The session_identification for a given handshake protocol is stored for a period of time together with the information generated during the handshake. That stored information includes the previously agreed upon block cipher and hash function as well as the earlier master key. A given session_identification together with its related information is retained in cache memory in the client and in the server for a prescribed period of time, 100 seconds in a current implementation. During that time interval if the client application again attempts to access the server through a new SSL library connection, then the new connection can use the same block cipher, hash function and master key that were negotiated during the prior handshake protocol.

The stored session_identification information advantageously saves time in establishing secure sockets connections without unreasonably compromising security. The generation of session keys is a relatively time consuming task since it involves the exchange of a master key using a relatively slow public key algorithm. By using the previously derived session_identification information, the master key and encryption algorithm (a block cipher plus a hash function in the preferred embodiment), the most time consuming handshake steps can be avoided. This approach is particularly beneficial, for example, in applications such as client-server data transfers involving a client application establishing a secure sockets connection with a secure server over the Internet. A client application, such as a web browser constructed in accordance with the present invention for example, may set up a connection to a remote server in order to retrieve information requested by a client user.

For instance, an electronic document containing hyperlinks may be displayed by the client browser application. Whenever a user "clicks" on (or selects) portion of the document associated with a hyperlink, another electronic document or file or a graphic or some other remotely stored information that corresponds to the link is retrieved over the Internet from the server. Before the transfer can occur, however, the handshake protocol is negotiated, and encryption/decryption information is developed as described above. That information is stored with the session_identification for that connection. When that new document (or other information) has been transferred to the client, the SSL library causes the secure sockets connection used to accomplish the transfer of that next document to be closed. The session_identification information (master key, block cipher, hash function) is stored in cache by the client and server applications for a prescribed time intervals. If within that time a user of that same client browser application "clicks" on another hyperlink then the client browser application will set up another sockets connection with the server to satisfy this latest request. Rather than go through the entire time consuming handshake protocol, however, the client and server will use the previously generated and stored session_identification information (master key, block cipher, hash function) to secure data transfer through the new socket set up by the SSL library to satisfy this latest request.

It will be appreciated that as each subsequent client request is made to the secure server, a new session_identification with a new interval timer is stored in the client cache memory and in the server cache memory. Thus, the same block cipher, master key and hash functions can be used for multiple secure sockets connections, even when the connections occur over a time interval which is extends beyond the prescribed interval of the original connection for which the session_identification information was negotiated, provided that there is no time gap between any two requests that exceeds the prescribed time interval.

Referring to FIG. 5 in step_the client-hello message sends a session_identification which identifies previously stored security information (master key, block cipher, hash function) together with challenge data and cipher_specs. The server-hello message sends a connection_identification together with a session_identification_hit indication. Since the has been a hit, there is a match between a session_identification stored in the client cache and a session_identification stored in the server cache. This means that there was a previous secure sockets connection between the client application and the server application, and that the session_identification information negotiated and stored in conjunction with that prior connection still is available for use with this later connection. Therefore there is no need to negotiate a cipher_specs or to generate and a new master key or to generate new session keys. The remaining steps in FIG. 5 are identical to the corresponding steps in FIG. 4. Note that a new session_identification is delivered in the server-finish message. This new session_identification supplants the prior session_identifications which matched.

RSA Key Exchange Assuming Session-Identification Match and Client Authentication In FIG. 6 the first four messages, client-hello, server_hello, client-finish and server-verify are identical to the first four messages in FIG. 5. However, the server sends a request-certificate message which includes authentication_type and challenge data encrypted with the server_write key (one of the earlier agreed upon master keys). The authentication-type specifies an encryption technique to be used to authenticate the client; several authentication techniques can be supported by a current embodiment of the invention as explained in a following section. The challenge data is used in the authentication process. A client-certificate message is sent by the client to the server. The client-certificate message includes certificate_type, client_certificate and response_data, all of which are encrypted using the client_write_key (one of the earlier agreed upon master key). Several certificate types, described below, are supported by the current embodiment. The certificate_type indicates which one has been employed. The client_certificate contains the data defined by the certificate_type value. The response data contains authentication response data which is a function of the authentication_type sent by the server in the request-certificate message. The final step is the same as the final steps in FIGS. 4 and 5.

Diffie-Hellman Key Exchange Assuming No Session-Identification

FIG. 7, illustrates a Diffie-Hellman (DH) key exchange in accordance with a current implementation of the present invention. The client-hello and the server-hello messages, are the same as the corresponding messages in FIG. 4. Also, the client-finish message and the server-finish message are the same as corresponding messages in FIG. 4. In a present implementation of a DH key exchange, a "Y" value and a random number are delivered by the client to the server in a client-dh-key message. The Y value is a public number which corresponds to a secret number which is the result of an exponentiation process. The Y value and the random number are used by both client and server to generate a new randomized key. In a DH key exchange, both sides in the exchange independently generate the same master key. The client-session-key message delivers the session_key_1 encrypted by a master_key.

The client-session-key message_also delivers the random number encrypted by the session_key_1. This encrypted random number is important in hardware to implementations of the DH exchange.

E. SSL Library's Sockets API
Overview of Internet Architecture

Figure 8:
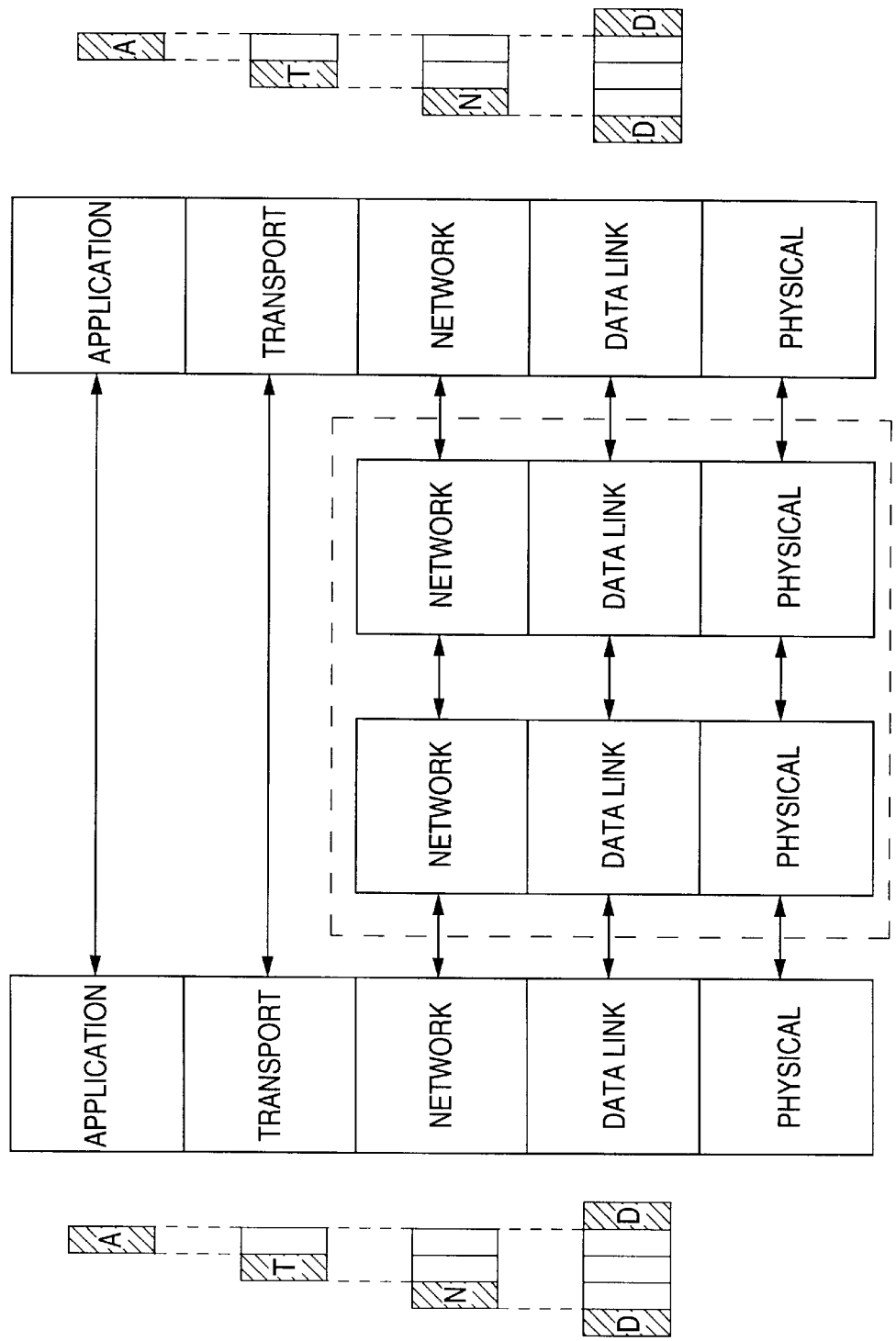
FIG. 8 shows a generalized representation of a typical Internet protocol stack which resides in each host machine (client and server) and a typical subnet protocol stack.

Referring to FIG. 8, there is a generalized illustrative representation of a typical protocol stack which resides in each host machine (client and server) connected to the Internet. Also shown is the encapsulation and decapsulation of a typical program data unit (PDU) (or message) as it travels from one host to another through the Internet. The application layer security mechanisms and processes of the present invention ordinarily operate in an Internet environment, although the invention can be practiced in different network environments as well.

The typical Internet protocol stack includes five network "layers". Note that the Internet model lacks the presentation and session layers that are proposed in the International Standards Organization (ISO) Open Systems Interconnection (OSI) Reference Model. During client-server communications, information to be transferred from the server to the client, for example, is first transferred from server application layer computer programs down to the server transport layer. Next, the information is transferred down through network, data link and physical layers that may be associated with the server, and then up through physical, data link and network layers that may be associated with the client. Information transfer down and back up through these lower three layers may involve transfers through a communication subnet which may include routing devices as illustrated. The information then continues its trip up through the client transport layer to the client application layer. The transfer of information in the opposite direction, from client to server, involves a similar layer by layer transfer but in the opposite direction, starting with the client application layer and ending with the server application layer. Those skilled in the art will appreciate that there are various different protocols that can be used to implement the different protocol layers, and that many variations of the basic network model are possible. For a discussion of well known network architectures and the typical functions associated with the various layers within the architecture refer to, *Network Management Standards SNMP, CMIP, TMN, MIBs and Object Libraries*, Second Edition, by Uyless Black, McGraw-Hill, Inc., 1994. Also see, *Computer Networks*, Second Edition, by Andrew S. Tanenbaum, Prentice-Hall, Inc., 1989.

Focus on Application and Transport Layer Security

Figure 9:
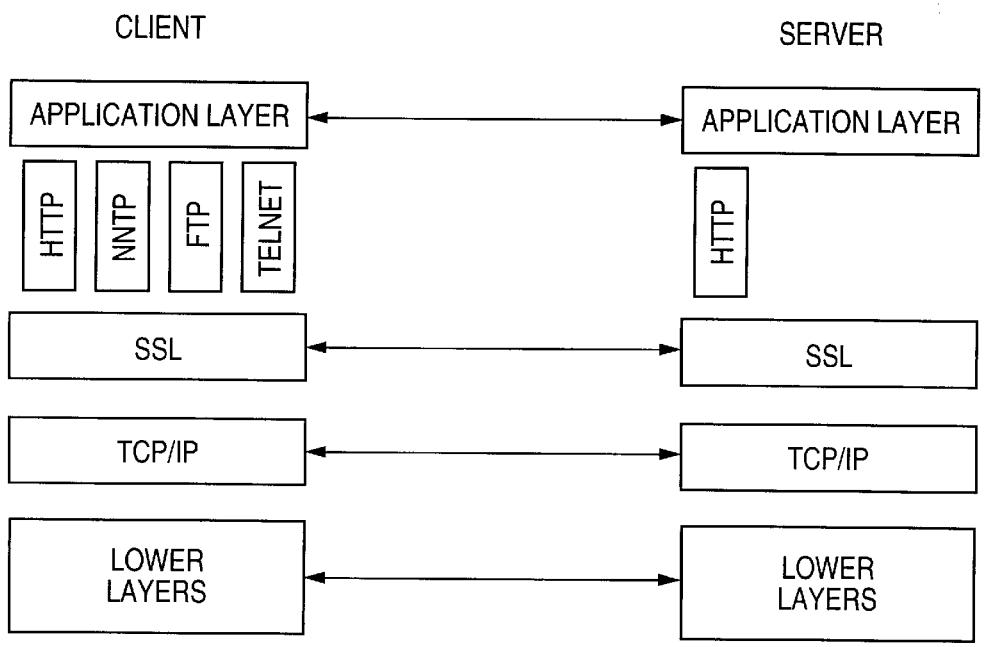
FIG. 9 is an illustrative view of client side and server side application layer and transport layer programs and protocol structures in accordance with a present embodiment of the invention.

In FIG. 9, there is an illustrative drawing providing a more detailed view of client side and server side application layer and transport layer programs and protocol structures used during client-server network communications in accordance with a current embodiment of the invention. The client and server application layers each include SSL libraries which cooperate to provide an application program interface which encrypts and decrypts information passed between different client and server application programs through a transport layer socket connection. The client application layer, for example, may include any of numerous types of computer programs which rely upon client-server network connections. For example, the client application might be a network browser application used to provide user access to the World Wide Web. Alternatively, for instance, the client application might be employed for financial transactions involving credit card or home banking. It should be appreciated that these are but a few sample types of application programs that require security when involved in information transfer using a client-server network connection. The server application layer, for example, may include an HTTP server which provides information to a client browser application in response to a client request. In a present embodiment, the client application layer may includes multiple application layer protocols used during transfers of information in connection with different categories of applications. For example, in a present embodiment of the invention, a client application may employ HTTP, network news transfer protocol (NNTP), file transfer protocol (FTP), and Telnet. Each different application protocol is used in communications involving different server applications. For example, NNTP is used to access certain news sources over the Internet; FTP can be used for file transfers over the Internet; and a Telnet can be used for remote login over the Internet.

An SSL library provides a sockets API that other applications can call to encrypt and decrypt information passed through a socket connection. Moreover, in a current embodiment of the invention, both the client and the server include operating system services which implement respective client and server transport layer protocols that use socket type connections. These built in transport layer operating system services may be an integral part of the client and server operating systems. That is generally the case, for example, with the UNIX operating system.

Alternatively, for example, the present invention may be practiced in a host (client or server) environment in which transport layer socket connection services are implemented as part of an application layer dynamic link library (DLL), such as Winsock for instance, which runs on top of a Windows operating system. Winsock is a DLL which provides a socket application program interface, but it does not provide the socket layer security.

Figure 10:
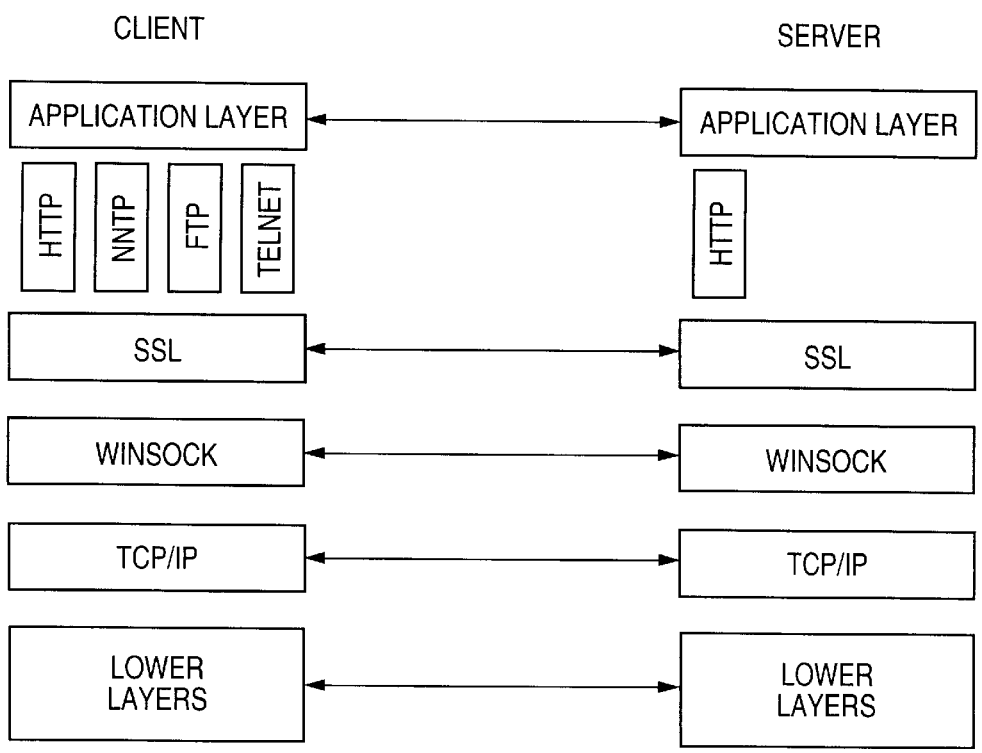
FIG. 10 is an illustrative view of client and server side application layer and transport layer programs and protocol structures which employ the Winsock DLL in conjunction with the SSL library in accordance with an alternative embodiment of the invention.

The illustrative drawing of FIG. 10 shows client and server side application layers and transport layers which employ the Winsock DLL in conjunction with the SSL library in accordance with an alternative embodiment of the present invention. In operation, for example, a client application calls Winsock to request a socket connection to a server application. Winsock, in turn, calls the SSL library and requests a connection to the server application. The SSL library then calls the operating system protocol stack and establishes the socket connection with the server side. The client side and server side SSL libraries negotiate security. Once a security scheme has been agreed upon, the client side SSL library returns a message to Winsock indicating that a socket connection is available. Winsock, in turn, returns a message to the calling client application indicating that a socket is ready. The client then can proceed to communicate with the server application through Winsock and the SSL library using the secure socket connection set up by the SSL library.

Figure 11:
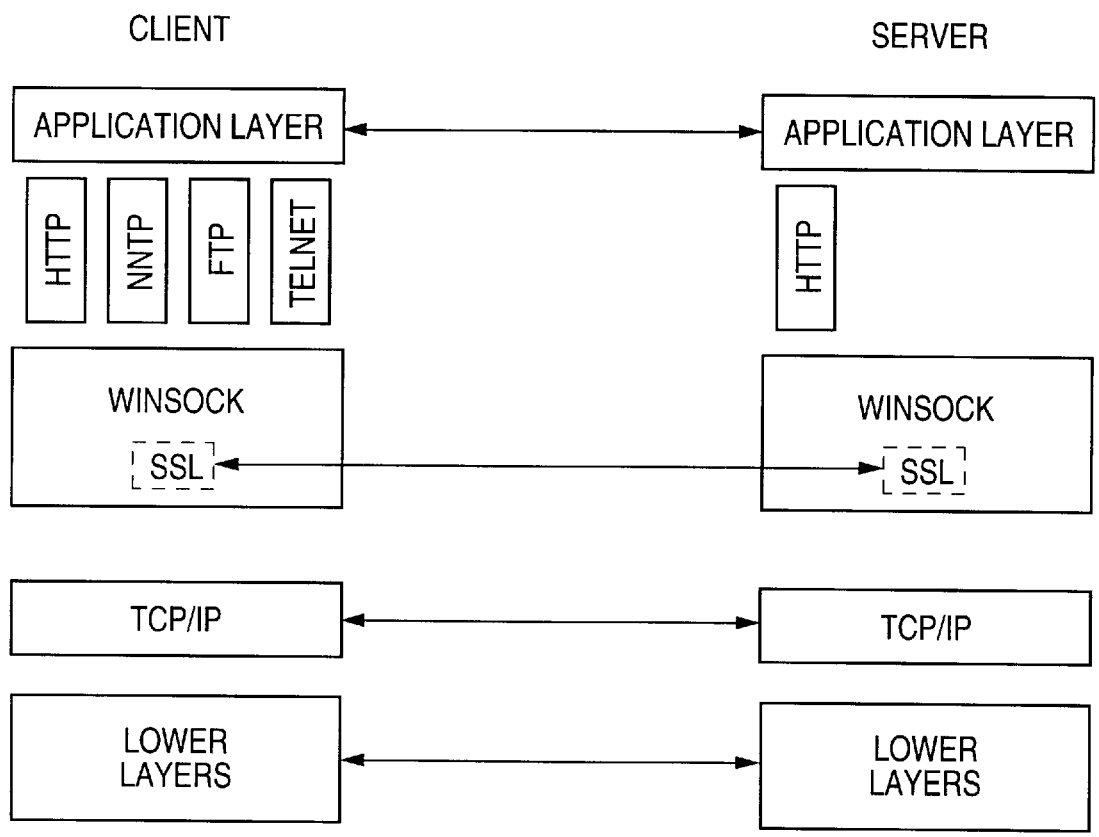
FIG. 11 is an illustrative view of client and server side application layer and transport layer programs and protocol structures which employ a variation of the Winsock DLL in conjunction with the SSL library in accordance with another alternative embodiment of the invention; and which employ a variation of the Winsock DLL in conjunction with the SSL library in accordance with another alternative embodiment of the present invention.

The illustrative drawings of FIG. 11 shows client and server side application layers and transport layers which employ a variation of the Winsock DLL in conjunction with the SSL library in accordance with another alternative embodiment of the present invention. Winsock has been modified to incorporate the SSL library functionality into a new DLL referred to herein as the Winsock/SSL_library. In operation, for example, a client application calls Winsock/SSL_library to request a socket connection to a server application. The Winsock/SSL_library, in turn, calls the operating system protocol stack and establishes the socket connection with the server side. The client side and server side Winsock/SSL_libraries negotiate security. Once a security scheme has been agreed upon, the client side Winsock/SSL_library returns a message to the calling client application indicating that a socket is ready. The client then can proceed to communicate with the server application through the Winsock/SSL_library using the secure socket connection.

SSL Library's Sockets API

Briefly summarized, in a present embodiment, the application program interface provided by the SSL library includes the following calls: SSL_open, SSL_write, SSL_read and SSL_close.

SSL open

When an application calls SSL_open, the SSL library to make a request to the operating system transport layer service to open a socket connection. The handshake protocol takes place between the client side and server side SSL libraries. The handshake results in an encryption scheme agreed upon by the client and server side SSL libraries. Once the handshake has been successfully completed, the SSL library returns a message to the calling application indicating that a socket connection has been opened.

SSL write

When an application calls SSL_write, the SSL library encrypts the information presented to it by the application using the agreed upon encryption scheme. The SSL library then calls the operating system transport layer service and requests a write of the encrypted message to a server designated by the calling application using the socket connection created during SSL_open.

SSL read

When a host (client or server) that monitors a port designated for SSL library communications receives a message, the application calls SSL_read which invokes the SSL library which then decrypts the message, and passes the decrypted message to the application.

SSL close

When a transfer of information through a socket connection created by an SSL_open call is finished or an error condition occurs, SSL_close is called by either the client or the server. The SSL library that receives SSL_close sends a message instructing the operating system transport layer service to close the socket connection. Note that whenever an error is detected during information transfer, either during handshake protocol or actual data transfer, SSL_close is called by the host (client or server) that discovers the error. This is a security precaution.

Thus, the SSL library decrypts information before sending it to an application program, and encrypts information after receiving it from an application program. Conversely, the SSL library encrypts information before sending it to a transport layer socket connection, and decrypts information after receiving it from a transport layer socket connection. In other words, the SSL library only sends and receives clear (unencrypted) information to and from application programs, and the SSL library only sends and receives encrypted information to and from a socket connection. In essence, the apparatus and method of the present invention redirects client-server information transfers between application layer and transport layer so that the information passes through an encryption/decryption mechanism implemented as client side and server side SSL libraries. The operation of the security mechanisms and processes of the present invention will become more apparent from the following explanation of the flow diagram of FIG. E3.

F. An Example of the SSL Library in Action

Figure 12A:
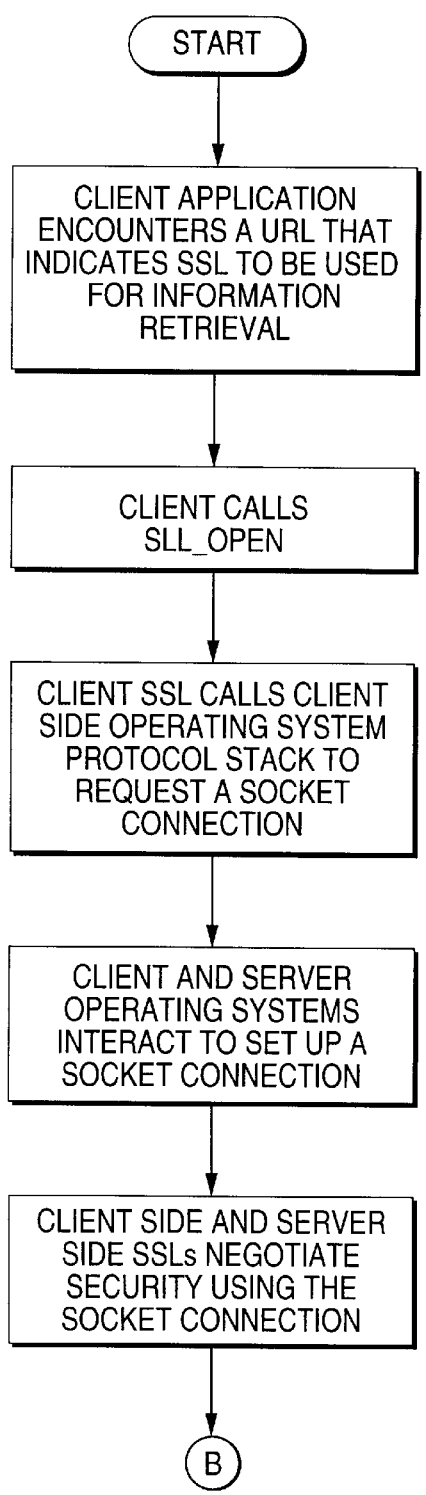
FIG. 12 is an illustrative flow diagram showing an example of the process involved in secure client-server communication in accordance with a present embodiment of the invention.
Figure 12B:
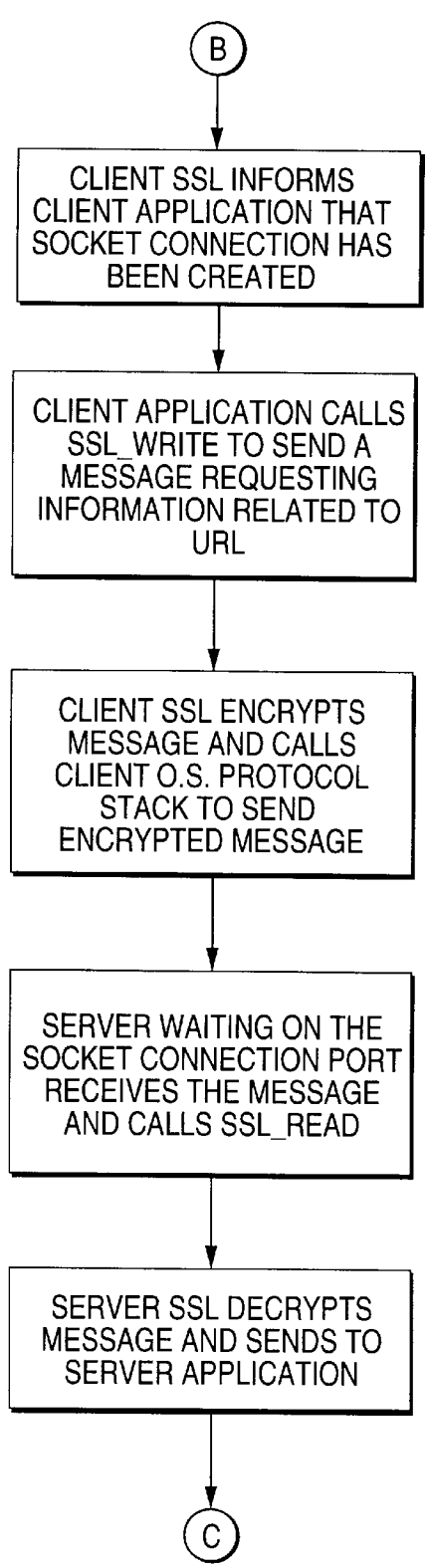
Figure 12C:
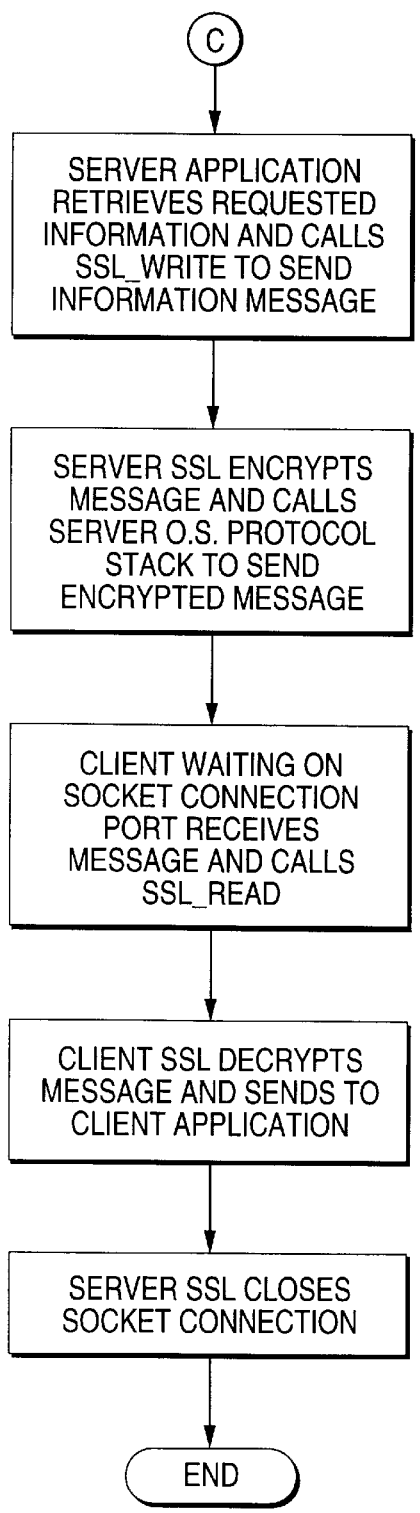

FIGS. 12A–C illustrates the operation of the application layer and transport layer programs and protocols of FIGS. 9 and 8 during client-server communications in accordance with a present embodiment of the invention. For the purpose of explaining the FIG. 12A–C flow diagram, it is assumed that the client application is a network browser and that the server application is an HTTP server. However, it should be appreciated that the invention can be employed with other types of client and server applications. Furthermore, the invention can be practiced with a host that employs an application layer DLL, such as Winsock, which provides a socket application program interface to host applications.

In FIG. 12A–C a user of a client browser application program, for example, may wish to access additional information (text, graphics, or sound, etc.) that relates to certain text or an image or an icon displayed on a client computer screen. Referring to FIG. 3, for instance, the client computer screen at first might display the illustrated text describing the World Wide Web. Embedded in the text is the word, "Internet", which is highlighted through underlining and bolding. The highlighting indicates to the user that the word, "Internet", corresponds to a hyperlink that can be used to access a related electronic document that provides more information about the Internet. When the user "clicks" on (or selects) the word "Internet", the client application retrieves from the electronic document a URL such as, HTTP:\\HOME.NETSCAPE.COM\FILENAME.HTML, for example, with a header that identifies a server that has the additional information about the "Internet" sought by the user. In practice, for example, the electronic document may contain an HTML hyperlink tag that is used to set up a client-server relationship in which the sought after "Internet" information stored by a server will be provided to the client application in response to the user's "clicking" on the word "Internet" in the electronic document.

Although this example is cast in terms of a document having an HTML format, the invention may be practiced with documents or files using different formats. That is, a prefix (like HTTPS), marker or name can be added to the URL, or other network address indicator, of almost any file or document to indicate that it is to be made "secure" in accordance with the invention. For example, a JPEG, GIF, MPEG, Postscript or voice files, or almost any hypermedia document can be made secure using the apparatus and methods of the invention.

Note that even the act of opening an electronic document may involve creating multiple socket connections in order to gather information to be displayed as part of the document. For example, document text may be retrieved from one server, and each graphics image in the document may be retrieved from another server. The information in the document may be highly confidential. Hence, each of the connections used to open the document in the first place can be protected through encryption in accordance with the present invention. Moreover, once the document is displayed, it may contain hyperlinks to yet other information (text, graphics, sound, etc.). It is just such a hyperlink that is the subject of the example illustrated in FIG. 12A–C.

Referring again to FIG. 12A–C, the client application calls SSL_open to request a socket connection with the server identified in the URL associated with the highlighted selected word "Internet". In this example, the HTTPS header in the URL indicates that the server is a secure HTTP server. The "S" suffix in the header syntax indicates that the connection is to be a secure connection, and that the application should invoke the SSL library. The absence of an "S" from the header syntax, that is a normal HTTP header, would indicate that the connection need not be secure, and that the SSL library need not be invoked. Thus, the HTTPS header indicates to the application that the SSL library is to be called to provide a secure HTTP transfer. Note that the protocol known as HTTP itself is not altered or modified. Rather, information transferred between client and server applications is encrypted/decrypted in transit using the client side and server side SSL libraries. In effect, the SSL libraries provide an additional security layer between application and transport layers.

It will be appreciated that a URL prefix or suffix or similar identifier can be employed to indicate to an application program that the SSL library should be invoked in connection with other types of client-server transfers as well. For example, an FTP transfer can be made secure by inserting a marker such as, "FTPS", in a URL to indicate that the application should call the SSL library to accomplish the transfer. The client side and server side SSL libraries handle security while the FTP application remains unchanged. The same can be done with NNTP or Telnet transfers, for example. In each case, the client and server SSL libraries set up a secure socket connection through which all information is passed in encrypted form.

In response to SSL_open, the client SSL library calls the appropriate client operating system service requesting a socket connection with the HTTP server identified in the URL. It will be appreciated that different client computers may employ different operating systems, such as UNIX or Windows, for instance.

The client and the server establish a socket connection between them. At this point in the SSL_open process, the socket connection is not yet a secure one. Rather, it is a typical connection of the general type that the client operating system would set up in response to an application request to open a socket connection. More specifically, the client operating system transport layer service, over a network architecture of the general type disclosed in FIG. 8, communicates with the corresponding operating system service transport layer service of the designated HTTP server to establish a client endpoint and a server endpoint for a transport layer socket connection. The client endpoints are defined by a combination comprising IP address (or DNS name) and port number. A TCP message header typically contains a port number which indicate the source and destination ports of a message. The lower level protocols carry the IP address. A host (client or server) can determine whether or not a message is encrypted based upon the port numbers in the TCP header.

When the client and server operating system services have established the socket connection described above, the client operating system returns a message to the SSL library indicating successful connection. The client side SSL library and the server side SSL library then engage in a handshake protocol in accordance with the invention using the socket connection that has been established by the client and server operating system services. During the handshake procedure, for example, encryption/decryption precautions are negotiated, the server is authenticated and the integrity of the socket security is checked. A detailed explanation of the handshake protocol is provided elsewhere in this specification. Once the handshake procedure has been successfully completed, the client SSL library returns to the client application a message indicating the HTTP server endpoint of the socket connection. Meanwhile, the server side SSL library listens on the endpoint port.

Next, continuing with the above example, the client application sends an SSL_write to the client side SSL library with a message addressed to the designated server endpoint requesting the information relating to the selected word "Internet" that appeared in the electronic document. In response to the SSL_write, the client side SSL library encrypts the client application message using an encryption/decryption scheme agreed upon for the connection during the handshake negotiation process. The client side SSL then calls the client operating system transport layer service with a request to send the encrypted message addressed to the HTTP server endpoint using the socket connection created during the SSL_open. The client operating system sends the encrypted client application request over the network to the HTTPS server endpoint. Note that the information transferred through the socket connection is secure since it was encrypted before it entered the socket using the agreed upon SSL library encryption procedures.

Upon receipt of the encrypted client application message addressed to the designated server port number, the server calls SSL_read invokes the SSL library decryption routines which then decrypt the received message using the agreed upon decryption scheme. Basically, the server knows that any message sent to the designated server port number is a message that requires decryption. Whenever a message arrives on a server port number designated during the SSL_open process, the server calls SSL_read to decrypt the received message. Once decrypted, the message is passed over to the server application. The HTTP server retrieves the information requested by the client application message.

As explained above, there is a session_identification table stored for each client-server socket connection which indicates the master key, cipher and hash for the session. This session_identification information is used as context for the present secure socket connection, and as explained above, may be reused in later connections.

When the server has retrieved the requested information, it then calls the server SSL library with an SSL_write requesting delivery of the requested information to the client side endpoint. The server side SSL library encrypts information, and then calls the server operating system transport layer service and requests a write of the encrypted message to the designated client endpoint. The server side operating system transport layer service handles the request and delivers the message to the client application endpoint.

Upon receipt of the encrypted server message addressed to the designated client port number, the client application calls SSL_read to invoke the SSL library decryption routines which then decrypt the received message using the agreed upon decryption scheme. The client side SSL library then delivers the decrypted HTTP server message to the client application.

Finally, the client application displays on the client display screen information corresponding to the selected word, "Internet", which was retrieved from the HTTPS server. The server calls SSL_close to close the socket connection when it has finished sending the requested information.

G. Record Protocol Specification

In this section, additional details are provided concerning SSL record formats, handshake protocols and security techniques employed by a presently preferred embodiment of the invention.

SSL Record Header Format

In SSL, all data sent is encapsulated in a record, an object which is composed of a header and some non-zero amount of data. Each record header contains a two or three byte length code. If the most significant bit is set in the first byte of the record length code then the record has no padding and the total header length will be 2 bytes, otherwise the record has padding and the total header length will be 3 bytes. The record header is transmitted before the data portion of the record.

Note that in the long header case (3 bytes total), the second most significant bit in the first byte has special meaning. When zero, the record being sent is a data record. When one, the record being sent is a security escape (there are currently no examples of security escapes; this is reserved for future versions of the protocol). In either case, the length code describes how much data is in the record.

The record length code does not include the number of bytes consumed by the record header (2 or 3). For the 2 byte header, the record length is computed by (using a "C" like notation):

RECORD-LENGTH=((byte[0]&0x7f)<<8))|byte[1];
Where byte[0] represents the first byte received and byte[1] the second byte received. When the 3 byte header is used, the record length is computed as follows (using a "C"-like notation):

RECORD-LENGTH=((byte[0]&0x3f)<<8))|byte[1];
IS-ESCAPE=(byte[01&0x40)!=0;
PADDING=byte[2];

The record header defines a value called PADDING. The PADDING value specifies how many bytes of data were appended to the original record by the sender. The padding data is used to make the record length be a multiple of the block ciphers block size when a block cipher is used for encryption.

The sender of a "padded" record appends the padding data to the end of its normal data and then encrypts the total amount (which is now a multiple of the block cipher's block size). The actual value of the padding data is unimportant, but the encrypted form of it must be transmitted for the receiver to properly decrypt the record. Once the total amount being transmitted is known the header can be properly constructed with the PADDING value set appropriately. The receiver of a padded record decrypts the entire record data (sans record length and the optional padding) to get the clear data, then subtracts the PADDING value from the RECORD-LENGTH to determine the final RECORD-LENGTH. The clear form of the padding data must be discarded.

SSL Record Data Format

The data portion of an SSL record is composed of three components (transmitted and received in the order shown):

MAC-DATA[MAC-SIZE]
ACTUAL-DATA [N]
PADDING-DATA [PADDING]

ACTUAL-DATA is the actual data being transmitted (the message payload). PADDING-DATA is the padding data sent when a block cipher is used and padding is needed. Finally, MAC-DATA is the "message Authentication Code".

When SSL records are sent in the clear, no cipher is used. Consequently the amount of PADDING-DATA will be zero and the amount of MACDATA will be zero. When encryption is in effect, the PADDING-DATA will be a function of the cipher block size. The MAC-DATA is a function of the CIPHER-CHOICE (more about that later).

The MAC-DATA is computed as follows:
MAC-DATA:=HASH[SECRET, ACTUAL-DATA, PADDING-DATA, SEQUENCE-NUMBER]

Where the SECRET data is fed to the hash function first, followed by the ACTUAL-DATA, which is followed by the PADDING-DATA which is finally followed by the SEQUENCE-NUMBER. The SEQUENCE-NUMBER is a 32 bit value which is presented to the hash function as four bytes, with the first byte being the most significant byte of the sequence number, the second byte being the next most significant byte of the sequence number, the third byte being the third most significant byte, and the fourth byte being the least significant byte (that is, in network byte order or "big endian" order).

MAC-SIZE is a function of the digest algorithm being used. For MD2 and MD5 the MAC-SIZE will be 16 bytes (128 bits).

The SECRET value is a function of which party is sending the message and what kind of key exchange algorithm/cipher was chosen.

For the non-token key exchange algorithms (e.g. RSA, DH):

If the client is sending the message then the SECRET is the CLIENT-WRITE-KEY (the server will use the SERVER-READ-KEY to verify the MAC). If the client is receiving the message then the SECRET is the CLIENT-READ-KEY (the server will use the SERVER-WRITE-KEY to generate the MAC).

For the token key exchange algorithms (e.g. RSA-TOKEN, DH-TOKEN, FORTEZZA-TOKEN):

The SECRET value is the RANDOM-NUMBER from the CLIENT-SESSION-KEY message. The value is used identically by the client and the server for both sending and receiving.

The SEQUENCE-NUMBER is a counter which is incremented by both the sender and the receiver. For each transmission direction, a pair of counters is kept (one by the sender, one by the receiver). Every time a message is sent by a sender the counter is incremented. Sequence numbers are 32 bit unsigned quantities and must wrap to zero after incrementing past 0xFFFFFFFF.

The receiver of a message uses the expected value of the sequence number as input into the MAC HASH function (the HASH function is chosen from the CIPHER-CHOICE). The computed MAC-DATA must agree bit for bit with the transmitted MAC-DATA. If the comparison is not identity then the record is considered damaged, and it is to be treated as if an "1/0 Error" had occurred (i.e. an unrecoverable error is asserted and the connection is closed).

A final consistency check is done when a block cipher is used and the protocol is using encryption. The amount of data present in a record (RECORD-LENGTH))must be a multiple of the cipher's block size. If the received record is not a multiple of the cipher's block size then the record is considered damaged, and it is to be treated as if an "1/0 Error" had occurred (i.e. an unrecoverable error is asserted and the connection is closed).

The SSL Record Layer is used for all SSL communications, including handshake messages, security escapes and application data transfers. The SSL Record Layer is used by both the client and the server at all times.

For a two byte header, the maximum record length is 32767 bytes. For the three byte header, the maximum record length is 16383 bytes. The SSL Handshake Protocol messages are constrained to fit in a single SSL Record Protocol record.

Application protocol messages are allowed to consume multiple SSL Record Protocol record's.

Before the first record is sent using SSL all sequence numbers are initialized to zero. The transmit sequence number is incremented after every message sent, starting with the CLIENT-HELLO and SERVER-HELLO messages.

Out of Band Data

SSL Version 3 supports the transmission and reception of "out of band data". Out of band data is normally defined at the TCP/IP protocol level, but because of SSL's privacy enhancements and support for block ciphers, this becomes difficult to support.

To send out-of-band data, the sender sends an escape record whose body contains a single byte of data indicating the escape type code:
char escape-tee-code The escape-type-code value should be SSL__ET__OOB__ DATA. The record following the escape record will be interpreted as "out-of-band" data and will only be made available to the receiver through an unspecified mechanism that is different than the receivers normal data reception method. The transmitted data record and the escape record are transmitted normally (i.e. encryption, MAC computations, and block cipher padding remain in effect).

Note that the escape record and the following record are sent using normal TCP sending mechanisms, not using the "out of band" mechanisms.

H. Handshake Protocol

In this section, additional details are provided concerning the SSL handshake protocol and security techniques employed by a presently preferred embodiment of the invention.

Protocol Flow

The handshake protocol includes several phases. In a present embodiment of the invention, the first phase is the "hello" phase which is used to define the capabilities of the client and server and to agree upon a set of algorithms to use for privacy and authentication. The first phase also allows for the discovery of a "session-identification", and if present, to skip some of the successive phases. The following messages are exchanged in the hello phase:

CLIENT-HELLO
SERVER-HELLO

The second phase is the key exchange phase during which key material is exchanged between the client and server. The key exchange results in the client and server sharing a master key. The following are exchanged in the key exchange phase:

CLIENT-MASTER-KEY
CLIENT-DH-KEY

The third phase is the session key production phase in which the actual session keys that will be used during the current communication session are produced. The following are exchanged in he session key production phase:

CLIENT-SESSION-KEY

The fourth phase is the server-verify phase which, in the current embodiment, is used only when the RSA key exchange algorithm is used. This phase verifies the server's discovery of the master key and subsequent generation of the session keys.

The following messages are exchanged in the server verify phase:

SERVER-VERIFY

The fifth phase involves client authentication. This phase is used only for key exchange algorithms that do not authenticate the client. Currently, only the RSA key exchange algorithm fails to authenticate the client. The following messages are exchanged in the client authentication phase:

REQUEST-CERTIFICATE
CLIENT-CERTIFICATE

The sixth phase is the final phase during which both sides of the conversation exchange "finish" messages. The following messages are exchanged in the finished phase:

CLIENT-FINISHED
SERVER-FINISHED

Errors

Error handling in the SSL Handshake protocol is very simple. When an error is detected, the detecting party sends a message to the other party. Errors that are not recoverable cause the client and server to abort the secure connection. Servers and client are required to "forget" any session identifiers associated with a failing connection.

The SSL Handshake Protocol defines the following errors:

NO-CIPHER-ERROR

The above error is returned by the client to the server when it cannot find a cipher or key size that it supports that is also supported by the server. This error is not recoverable.

NO-CERTIFICATE-ERROR

When a REQUEST-CERTIFICATE message is sent, the above error may be returned if the client has no certificate to reply with. This error is recoverable (for client authentication only).

BAD-CERTIFICATE-ERROR

The above error is returned when a certificate is deemed bad by the receiving party. Bad means that either the signature of the certificate was bad or that the values in the certificate were inappropriate (e.g. a name in the certificate did not match the expected name). This error is recoverable (for client authentication only).

UNSUPPORTED-CERTIFICATE-TYPE-ERROR

The above error is returned when a client/server receives a certificate type that it can't support. This error is recoverable (for client authentication only).

Handshake Protocol Messages

Handshake protocol messages are encapsulated using the "SSL Record Protocol". The messages are composed of two parts: a single byte message code and some data. The client and server exchange messages until both sides have sent their "finished" message, indicating that they are satisfied with the handshake protocol conversation. While one end of the conversation may have finished, the other end may not. Therefore, the finished end must continue to receive protocol handshake messages until it receives a "finished" message from its peer.

After the pair of session keys has been determined by each party, the message bodies are encrypted. For the client, this happens after it verified the session-identifier or creates a new master key and has sent it to the server. For the server, this happens after the session-identifier is found to be good, or the server receives the client's master key message.

The following notation is used in the preferred embodiment for SSLHP messages:

```
char MSG-EXAMPLE
char FIELD1
char FIELD2
char THING-MSB
char THING-LSB
char THING-DATA[(MSB<<8)|LSB];
```

This notation defines the data in the protocol message, including the message type code. The order is presented top to bottom, with the top most element being transmitted first, and the bottom most element transferred last.

For the "THING-DATA" entry, the MSB and LSB values are actually THING-MSB and THING-LSB (respectively) and define the number of bytes of data actually present in the message. For example, if THINGMSB were zero and THING-LSB were 8 then the THING-DATA array would be exactly 8 bytes long. This shorthand is used below.

Length codes are unsigned values, and when the MSB and LSB are combined the result is an unsigned value. Unless otherwise specified lengths values are "length in bytes".

ERROR Message

The ERROR message may be sent clear or encrypted. The error message may be sent in a number of the Handshake Protocol phases. Its format is:

char MSG-ERROR
    char ERROR-CODE-MSB
    char ERROR-CODE-LSB

This message is sent when an error is detected. If the message is sent after session-key have been negotiated then the message is sent encrypted, otherwise it is sent in the clear. Also, if the error is unrecoverable then the sender shuts down its connection after sending the error. In a similar fashion the receiver will close its connection upon receipt of an unrecoverable error.

"Hello" Phase Messages

The "Hello" phase messages are used by client and server inform of security and encryption capabilities. The security and encryption information is contained the CIPHER-SPECS data passed initially from the client to the server. This data defines the kinds of security and encryption algorithms that the client can support. The data is made available to the server in the CLIENT-HELLO message. The CIPHER SPECS contain the key exchange algorithms supported by the client in server and the certificate types supported by the client. The server is required to examine the CIPHER-SPECS sent by the client and remove any that it does not support and any that it chooses not to support. In addition, for SSL version 3, the server is required to choose a single key exchange algorithm from the choices provided by the client.

The encryption and security capabilities that are resolved by the "Hello" phase messages are:

The key exchange algorithm and certificates for each endpoint (the client's certificate is optional).

The symmetric cipher algorithm the session-key(s) for it and any key argument data.

The hash function used for MAC computations handshake hash computation and session key production.

Client-Hello

The client-hello message is sent in the clear. The form of the client-hello message is as follows:

char MSG-CLIENT-HELLO
    char CLIENT-VERSION-MSB
    char CLIENT-VERSION-LSB
    char CIPHER-SPECS-LENGTH-MSB
    char CIPHER-SPECS-LENGTH-LSB
    char SESSION-ID-LENGTH-MSB
    char SESSION-ID-LENGTH-LSB
    char CHALLENGE-LENGTH-MSB
    char CHALLENGE-LENGTH-LSB
    char CIPHER-SPECS-DATA[(MSB<<8)|LSB]
    char SESSION-ID-DATA[(MSB<<8)|LSB]
    char CHALLENGE-DATA[(MSB<<8)|LSB]

When a client first connects to a server it is required to send the CLIENT-HELLO message. The server is expecting this message from the client as its first message. It is an error for a client to send anything else as its first message.

The client sends to the server its SSL version (currently there are several versions of the novel SSL), its cipher specs (see below), some challenge data, and the session-identifier data. The session-identifier data is only sent if the client found a session-identifier in its cache for the server, and the SESSION-ID-LENGTH will be non-zero. When there is no session-identifier for the server SESSION-ID-LENGTH must be zero. The challenge data is used to authenticate the server. After the client and server agree on a pair of session keys, the server returns a SERVER-VERIFY message with the encrypted form of the CHALLENGE-DATA Also note that the server will not send its SERVER-HELLO message until it has received the CLIENT-HELLO message. This is done so that the server can indicate the status of the client's session-identifier back to the client in the servers first message (i.e. to increase protocol efficiency and reduce the number of round trips required).

The server examines the CLIENT-HELLO message and will verify that it can support the client version and one of the client cipher specs. The server can optionally edit the cipher specs. removing any entries it doesn't choose to support. The edited version will be returned in the SERVER-HELLO message if the session-identifier is not in the server's cache.

The CIPHER-SPECS-LENGTH must be greater than zero and a multiple of 3. The SESSION-ID-LENGTH must either be zero or 16. The CHALLENGE-LENGTH must be greater than or equal to 16 and less than or equal to 32.

This message must be the first message sent by the client to the server. After the message is sent the client waits for a SERVER-HELLO message. Any other message returned by the server (other than ERROR) is disallowed.

Server-Hello

The SERVER-HELLO message is sent in the clear. The format of the SERVER-HELLO message is as follows:

char MSG-SERVER-HELLO
    char SESSION-ID-HIT
    char CERTIFICATE-TYPE
    char SERVER-VERSION-MSB
    char SERVER-VERSION-LSB
    char CERTIFICATE-LENGTH-MSB
    char CERTIFICATE-LENGTH-LSB
    char CIPHER-SPECS-LENGTH-MSB
    char CIPHER-SPECS-LENGTH-LSB
    char CONNECTION-ID-LENGTH-MSB
    char CONNECTION-ID-LENGTH-LSB
    char CERTIFICATE-DATA[MSB<<8)|LSB]
    char CIPHER-SPECS-DATA[MSB<<8)|LSB]
    char CONNECTION-ID-DATA[MSB<<8)|LSB]

The server sends this message after receiving the clients CLIENT-HELLO message. The server returns the SESSION-ID-HIT flag indicating whether or not the received session-identifier is known by the server (i.e. in the server's session-identifier cache). The SESSION-ID-HIT flag will be non-zero if the client sent the server a session-identifier (in the CLIENT-HELLO message with SESSION-ID-LENGTH 0) and the server found the client's session-identifier in its cache. If the SESSION-ID-HIT flag is non-zero then the CERTIFICATE-TYPE, CERTIFICATE-LENGTH and CIPHER-SPECS-LENGTH fields will be zero.

The CERTIFICATE-TYPE value, when non-zero, has one of the values described above (see the information on the CLIENT-CERTIFICATE message).

When the SESSION-ID-HIT flag is zero, the server packages up its certificate, its cipher specs and a connection-id to send to the client. Using this information the client can generate a session key and return it to the server with the CLIENT-MASTER-KEY message.

When the SESSION-ID-HIT flag is non-zero, both the server and the client compute a new pair of session keys for the current session derived from the MASTER-KEY that was exchanged when the SESSION-ID was created. The SERVER-READ-KEY and SERVER-WRITE-KEY are derived from the original MASTER-KEY keys in the same manner as the CLIENT-READ-KEY and CLIENT-WRITE-KEY:

SERVER-READ-KEY:=CLIENT-WRITE-KEY
SERVER-WRITE-KEY:=CLIENT-READ-KEY

Note that when keys are being derived and the SESSION-ID-HIT flag is set and the server discovers the client's session-identifier in the servers cache, then the KEY-ARG-DATA is used from the time when the SESSION-ID was established. This is because the client does not send new KEY-ARG-DATA (recall that the KEY-ARG-DATA is sent only in the CLIENT-MASTER-KEY message).

The CONNECTION-ID-DATA is a string of randomly generated bytes used by the server and client at various points in the protocol. The CLIENT-FINISHED message contains an encrypted version of the CONNECTION-ID-DATA. The length of the CONNECTION-ID must be between 16 and than 32 bytes, inclusive.

The CIPHER-SPECS-DATA define the kind of algorithms supported by the sender. Each SESSION-CIPHER-SPEC is 3 bytes long and looks like this:

char CIPHER-KIND-0
char CIPHER-KIND-1
char CIPHER-KIND-2

Where CIPHER-KIND is one of (for SSL version 2 and version 3):

SSL_CK_RC4_128_WITH_MD5
SSL_CK_RC4_128_EXPORT40_WITH_MD5
SSL_CK_RC2_128_CBC_WITH_MD5
SSL_CK_RC2128_CBC_EXPORT40_WITH_MD5
SSL_CK_IDEA_128_CBC_WITH_MD5
SSL_CK_DES_64_CBC_WITH_MD5
SSL_CK_DES_192_EDE3_CBC_WITH_MD5

The following CIPHER-KIND's are added for SSL version 3:

SSL_CK_NULL_WITH_MD5
SSL_CK_DES_64_CBC_WITH_SHA
SSL_CK_DES_192_EDE3 CBC_WITH_SHA
SSL_KEA_RSA
SSL_KEA_RSA_TOKEN_WITH_DES
SSL_KEA_RSA_TOKEN_WITH_DES_EDE3
SSL_KEA_RSA_TOKEN_WITH_RC4
SSL_KEA_DH SSL_KEA_DH_TOKEN_WITH_DES
SSL_KEA_DH_TOKEN_WITH_DES_EDE3
SSL_KEA_DH_ANONYMOUS
SSL_KEA_DH_TOKEN_ANONYMOUS_WITH_DES
SSL_KEA_DH_TOKEN_ANONYMOUS_WITH_DES_EDE3
SSL_KEA_FORTEZZA SSL_KEA_FORTEZZA_ANONYMOUS
SSL_KEA_FORTEZZA_TOKEN
SSL_KEA_FORTEZZA_TOKEN_ANONYMOUS

Note that additional or different algorithms may be used without departing from the invention.

The server receives CIPHER-KIND-DATA from the client and culls out the ciphers the server does not want to support. In addition, for SSL version 3 the server must eliminate all but one of the key exchange algorithm's.

The SSL_CK_RC4_128_EXPORT40_WITH_MD5 cipher is an RCJ cipher where some of the session key is sent in the clear and the rest is sent encrypted (exactly 40 bits of it). MD5 is used as the hash function for production of MAC's and session key's. This cipher type is provided to support "export" versions (i.e. versions of the protocol that can be distributed outside of the United States) of the client or server.

An exportable implementation of the SSL Handshake Protocol will have secret key lengths restricted to 40 bits and only support either RC2, RC4 or both. For non-export implementations key lengths can be more generous (we recommend at least 128 bits). It is permissible for the client and server to have a non-intersecting set of stream ciphers. This, simply put, means they cannot communicate.

The SSL Handshake Protocol defines the SSL_CK_RC4_128_WITH_MDS to have a key length of 128 bits. The SSL_CK_RC4_128_EXPORT40_WITH_MD5 also has a key length of 128 bits. However, only 40 of the bits are secret (the other 88 bits are sent in the clear by the client to the server).

The SERVER-HELLO message is sent after the server receives the CLIENT-HELLO message, and before the server sends the SERVER-VERIFY message.

Key Exchange Phase Messages

The "Key Exchange" phase is used to establish a MASTER-KEY that is a shared secret between the client and the server. The kind of message sent by the client is dependent on the key exchange algorithm chosen by the server. If an RSA key exchange algorithm is used then the CLIENT-MASTER-KEY message will be sent. The CLIENT-DH-KEY is used for Diffie-Hellman style key exchanges (e.g. DH and FORTEZZA).

In addition, session key production is a function of the Kind of key exchange algorithm. "Token" key exchange algorithms use the CLIENT-SESSION-KEY message to define the session keys. Non-token key exchange algorithm'5 use the key production facilities described in below in the section describing session-key production.

Client-Master-Key

The client-master-key is sent primarily in the clear. The format of the client-master-key message is as follows:

char MSG-CLIENT-MASTER-KEY
char CIPHER-KIND [3]
char CLEAR-KEY-LENGTH-MSB
char CLEAR-KEY-LENGTH-LSB
char ENCRYPTED-KEY-LENGTH-MSB
char ENCRYPTED-KEY-LENGTH-LSB
char KEY-ARG-LENGTH-MSB
char KEY-ARG-LENGTH-LSB
char CLEAR-KEY-DATA[MSB<<8)|LSB]
char ENCRYPTED-KEY-DATA[MSB<<8)|LSB]
char KEY-ARG-DATA[MSB<<8)|LSB]

The client sends this message when it has determined a master key for the server to use. Note that when a session-identifier has been agreed upon, the client-master-key message is not sent.

The CIPHER-KIND field indicates which cipher was chosen from the server's CIPHER-SPECS.

The CLEAR-KEY-DATA contains the clear portion of the MASTER-KEY. The CLEAR-KEY-DATA is combined with the SECRET-KEY-DATA (described shortly) to form the MASTER-KEY, with the SECRET-KEY-DATA being the least significant bytes of the final MASTER-KEY. The ENCRYPTED-KEY-DATA contains the secret portions of the MASTER-KEY, encrypted using the server's public key. The encryption block is formatted using block type 2 from PKCS#1, as specified in RSA Encryption Standard, Version 1.5, November 1993.

The data portion of the block is formatted as follows:
char SECRET-KEY-DATA [SECRET-LENGTH]

SECRET-LENGTH is the number of bytes of each session key that is being transmitted encrypted. The SECRET-LENGTH plus the CLEARKEY-LENGTH equals the number of bytes present in the cipher key (as defined by the CIPHER-KIND). It is an error if the SECRET-LENGTH found after decrypting the PKCS#1 formatted encryption block does not match the expected value. It is also an error if CLEAR-KEY-LENGTH is non-zero and the CIPHER-KIND is not an export cipher.

If the key algorithm needs an argument (for example, DES-CBC's initialization vector) then the KEY-ARG-LENGTH fields will be non-zero and the KEY-ARG-DATA will contain the-relevant data. For the
SSL_CK_RC2_128_CBC_WITH_MD5
SSL_CK_RC2_128_CBC_EXPORT40_WITH_MD5
SSL_CK_IDEA_128_CBC_WITH_MD5
SSL_CK_DES_64_CBC_WITH_MD5
SSL_CK_DES_192_EDE3_CBC_WITH_MD5
SSL_CK_DES_64_CBC_WITH_SHA
SSL_CK_DES_192_EDE3_CBC_WITH_SHA
algorithms the KEY-ARG data must be present and be exactly 8 bytes long.

The CLIENT-MASTER-KEY message must be sent after the CLIENT-HELLO message and before the CLIENT-FINISHED message. The CLIENT-MASTER-KEY message must be sent if the SERVER-HELLO message contains a SESSION-ID-HIT value of 0.

Session Key Production

Client and server session key production is a function of the CIPHERCHOICE (Note that this step is skipped for "token" key exchange algorithm's—the CLIENT-SESSION-KEY message is used instead):
SSL_CK_NULL_WITH_MD5
SSL_CK_RC4_128_WITH_MD5
SSL_CK_RC4_128_EXPORT40_WITH_MD5
SSL_CK_RC2_128_CBC_WITH_MD5
SSL_CK_RC2_128_CBC_EXPORT40_WITH_MD5
SSL_CK_IDEA_128_CBC_WITH_MD5
KEY-MATERIAL-0:=MD5[MASTER-KEY, "0", CHALLENGE, CONNECTION-ID
KEY-MATERIAL-I:=MD5[MASTER-KEY, "1", CHALLENGE, CONNECTION-ID
CLIENT-READ-KEY:=KEY-MATERIAL-0[0–15]
CLIENT-WRITE-KEY:=KEY-MATERIAL-1[0–15]

Where KEY-MATERIAL-0[0–15] means the first 16 bytes of the KEY-MATERIAL-0 data, with KEY-MATERIAL-0[0] becoming the most significant byte of the CLIENT-READ-KEY.

Data is fed to the MD5 hash function in the order shown, from left to right: first the MASTER-KEY, then the "0" or "1", then the CHALLENGE and then finally the CONNECTION-ID).

Note that the "0" means the ascii zero character (0×30), not a zero value. "1" means the ascii I character (0×31). MD5 produces 128 bits of output data which are used directly as the key to the cipher algorithm (The most significant byte of the MD5 output becomes the most significant byte of the key material).

Finally, note that although the NULL cipher produces session keys in the same was as the other ciphers listed, the session keys are not actually used for encryption. However, they are used for the SECRET value in the MAC computation.
SSL_CK_DES_64_CBC_WITH_MD5
SSL_CK_DES_64_CBC_WITH_SHA
KEY-MATERIAL-0:=HASH[MASTER-KEY, CHALLENGE, CONNECTION-ID
CLIENT-READ-KEY:=KEY-MATERIAL-0[0–7]
CLIENT-WRITE-KEY:=KEY-MATERIAL-0[8–15]

For DES-CBC, a single 16 bytes of key material are produced using HASH. The first 8 bytes of the hash function results are used as the CLIENT-READ-KEY while the next 8 bytes are used as the CLIENT-WRITE-KEY The initialization vector is provided in the KEY-ARG-DATA. Note that the raw key data is not parity adjusted and that this step must be performed before the keys are legitimate DES keys.
SSL_CK_DES_192_EDE3_CBC_WITH_MD5
SSL_CK_DES_192_EDE3_CBC_WITH_SHAKEY-MATERIAL-0:=HASH[MASTER-KEY, "0", CHALLENGE, CONNECTION-ID KEY-MATERIAL-I:=HASH[MASTER-KEY, "1", CHALLENGE, CONNECTION-ID
KEY-MATERIAL-2:=HASH[MASTER-KEY, "2", CHALLENGE, CONNECTION-ID
CLIENT-READ-KEY-0:=KEY-MATERIAL-0[0–7]
CLIENT-READ-KEY-I:=KEY-MATERIAL-0[8–15]
CLIENT-READ-KEY-2:=KEY-MATERIAL-I[0–7]
CLIENT-WRITE-KEY-0:=KEY-MATERIAL-I[8–15]
CLIENT-WRITE-KEY-I:=KEY-MATERIAL-2[0–7]
CLIENT-WRITE-KEY-2:=KEY-MATERIAL-2[8-IS]

Data is fed to the HASH function in the order shown, from left to right: first the MASTER-KEY, then the "0", "1" or "2", then the CHALLENGE and then finally the CONNECTION-ID. Note that the "0" means the ascii zero character (0×30), not a zero value. "1" means the ascii 1 character (0×31). "2" means the ascii 2 character (0×32).

A total of 6 keys are produced, 3 for the read side DES-EDE3 cipher and 3 for the write side DES-EDE3 function. The initialization vector is provided in the KEY-ARG-DATA. The keys that are produced are not parity adjusted. This step must be performed before proper DES keys are usable.

Recall that the MASTER-KEY is given to the server in the CLIENT-MASTER-KEY message. The CHALLENGE is given to the server by the client in the CLIENT-HELLO message. The CONNECTION-ID is given to the client by the server in the SERVER-HELLO message. This makes the resulting cipher keys a function of the original session and the current session. Note that the master key is never directly used to encrypt data, and therefore cannot be easily discovered.

Client-DH-Key

The client-DH-Key is sent primarily in the clear. The form of the client-DH-Key message is as follows:
char MSG-CLIENT-DH-KEY
char Y-LENGTH-MSB
char Y-LENGTH-LSB
char CERTIFICATE-TYPE
char CERTIFICATE-LENGTH-MSB
char CERTIFICATE-LENGTH-LSB
char RANDOM-LENGTH-MSB
char RANDOM-LENGTH-LSB char Y-DATA[MSB<<8|LSB]
char CERTIFICATE-DATA[MSB<<8|LSB]
char RANDOM-DATA[MSB<<8|LSB]

The client sends this message to the server to finish a Diffie-Hellman style key exchange. The client provides it's "Y" value either directly in the YDATA or indirectly in the CERTIFICATE-DATA. If the key exchange algorithm is not 'anonymous'" then the client must provide the certificate data.

The RANDOM-DATA is used by the server and client to produce the MASTER-KEY. This is necessary when mutual authentication is used because otherwise the MASTER-KEY would be a constant.

The CLIENT-SESSION-KEY message must immediately follow this message.

Session Key Production Phase Messages

This message is used by "token" key exchange algorithms. Token's disallow key material to leave the token unencrypted and because of this the client must communicate to the server the encrypted value of the session keys (because the server cannot produce them).

Client-Session-Key

The client-session-key message format is as follows:
char MSG-CLIENT-SESSION-KEY
char CIPHER-KIND [3]
char CLEAR-KEY1-LENGTH-MSB
char CLEAR-KEY1-LENGTH-LSB
char ENCRYPTED1-KEY-LENGTH-MSB
char ENCRYPTED1-KEY-LENGTH-LSB
char CLEAR-KEY2-LENGTH-MSB
char CLEAR-KEY2-LENGTH-LSB
char ENCRYPTED2-KEY-LENGTH-MSB
char ENCRYPTED2-KEY-LENGTH-LSB
char KEY-ARG-LENGTH-MSB
char KEY-ARG-LENGTH-LSB
char RANDOM-NUMBER-LENGTH-MSB
char RANDOM-NUMBER-LENGTH-LSB
char CLEAR-KEY1-DATA[MSB<<8/LSB]
char ENCRYPTED-KEY1-DATA[MSB<<8/LSB]
char CLEAR-KEY2-DATA[MSB<<8/LSB]
char ENCRYPTED-KEY2-DATA[MSB<<8/LSB]
char KEY-ARG-DATA[MSB<<8/LSB]
char RANDOM-NUMBER-DATA[MSB<<8/LSB]

This message is sent by the client after either the CLIENT-MASTERKEY message or the CLIENT-DH-KEY message. The message is used to establish one (or two) session keys with the server. Each session key is composed of two pieces: the CLEAR-KEY-DATA and the ENCRYPTED-KEY-DATA. If the CIPHER-KIND indicates an export grade cipher then some of the key data will be sent in the clear (in the CLEAR-KEY-DATA). The CLEAR-KEY-DATA and the ENCRYPTED-KEY-DATA are concatenated to produce a session key. This message allows for two independent session keys to be established. If two keys are used then the first key (KEY1) becomes the CLIENTWRITE-KEY and the SERVER-READ-KEY. The second key (KEY2) becomes the CLIENT-READ-KEY and the SERVER-WRITE-KEY.

The ENCRYPTED-KEY-DATA's are encrypted using the MASTER-KEY (the MASTER-KEY was established by the CLIENT-DH-KEY message). The RANDOM-NUMBER-DATA is encrypted using KEY1.

The KEY-ARG-DATA is used by ciphers that require some sort of initialization data (e.g. DES's IV). The RANDOM-NUMBER-DATA is used as the SECRET for MAC computations (recall that for tokens the session key data is not available in the clear)

Server Verify Phase Messages

The server-verify message is sent encrypted.

Server-Verify

The client-session-key message has the following format:
char MSG-SERVER-VERIFY
char CHALLENGE-DATA[N−1]

The server sends this message after a pair of session keys (SERVER-READ-KEY and SERVER-WRITE-KEY) have been agreed upon either by a session-identifier or by explicit specification with the CLIENT-MASTER-KEY message. The message contains an encrypted copy of the CHALLENGE-DATA sent by the client in the CLIENT-HELLO message.

"N" is the number of bytes in the message that was sent, so "N−1" is the number of bytes in the CHALLENGE-DATA without the message header byte.

This message is used to verify the server as follows. A legitimate server will have the private key that corresponds to the public key contained in the server certificate that was transmitted in the SERVER-HELLO message. Accordingly, the legitimate server will be able to extract and reconstruct the pair of session keys (SERVER-READ-KEY and SERVER-WRITE-KEY). Finally, only a server that has done the extraction and decryption properly can correctly encrypt the CHALLENGE-DATA. This, in essence, "proves" that the server has the private key that goes with the public key in the server's certificate.

The CHALLENGE-DATA must be the exact same length as originally sent by the client in the CLIENT-HELLO message. Its value must match exactly the value sent in the clear by the client in the CLIENT-HELLO message. The client must decrypt this message and compare the value received with the value sent, and only if the values are identical is the server to be "trusted". If the lengths do not match or the value doesn't match then the connection is to be closed by the client.

This message must be sent by the server to the client after either detecting a session-identifier hit (and replying with a SERVER-HELLO message with SESSION-ID-HIT not equal to zero) or when the server receives the CLIENT-MASTER-KEY message. This message must be sent before any Phase 2 messages or a SERVER-FINISHED message.

Client Authentication Phase Messages

Client Authentication messages are sent encrypted.

Request-Certificate

The request-certificate message has the following format:
char MSG-REQUEST-CERTIFICATE
char AUTHENTICATION-TYPE
char CERTIFICATE-CHALLENGE-DATA[N−2]

A server may issue this request asking for the client's certificate. This message can be used with the RSA key exchange algorithm only. The client responds with a CLIENT-CERTIFICATE message immediately if it has one, or an ERROR message (with error code NO-CERTIFICATE-ERROR) if it doesn't. The CERTIFICATE-CHALLENGE-DATA is a short byte string (whose length is greater than or equal to 16 bytes and less than or equal to 32 bytes) that the client will use to respond to this message.

The AUTHENTICATION-TYPE value is used to choose a particular means of authenticating the client. The following types are defined:
SSL_AT_MD5_WITH_RSA_ENCRYPTION The SSL_AT_MD5_WITH_RSA_ENCRYPTION type requires that the client construct an MD5 message digest using information as described above in the section on the CLIENT-CERTIFICATE message. Once the digest is created, the client encrypts it using its private key (formatted according to the digital signature standard defined in PKCS#1). The server authenticates the client when it receives the CLIENT-CERTIFICATE message.

This message may be sent after a SERVER-VERIFY message and before a SERVER-FINISHED message.

Client-Certificate

The format of the client-certificate message is as follows:

char MSG-CLIENT-CERTIFICATE
char CERTIFICATE-TYPE
char CERTIFICATE-LENGTH-MSB
char CERTIFICATE-LENGTH-LSB
char RESPONSE-LENGTH-MSB
char RESPONSE-LENGTH-LSB
char CERTIFICATE-DATA[MSB<<8/LSB]
char RESPONSE-DATA[M5B<<8/LSB]

This message is sent by one an SSL client in response to a server REQUEST-CERTIFICATE message. The CERTIFICATE-DATA contains data defined by the CERTIFICATE-TYPE value. An ERROR message is sent with error code NO-CERTIFICATE-ERROR when this request cannot be answered properly (e.g. the receiver of the message has no registered certificate).

CERTIFICATE-TYPE is one of:

SSL_X509_CERTIFICATE

The CERTIFICATE-DATA contains an X.509 (1988) signed certificate. See CCITT, Recommendation X.509: "The Directory—Authentication Framework". 1988.

SSL_PKCS7_CERTIFICATE

The CERTIFICATE-DATA contains a PKCS-7 formatted certificate list.

The RESPONSE-DATA contains the authentication response data. This data is a function of the AUTHENTICATION-TYPE value sent by the server.

When AUTHENTICATION-TYPE is SSL_AT_MD5_WITH_RSA_ENCRYPTION then the RESPONSE-DATA contains a digital signature of the following components (in the order shown):

1. the KEY-MATERIAL-0
2. the KEY-MATERIAL-1 (only if defined by the cipher kind)
3. the KEY-MATERIAL-2 (only if defined by the cipher Kind)
4. the CERTIFICATE-CHALLENGE-DATA (from the REQUEST-CERTIFICATE message)
5. the server's signed certificate (from the SERVER-HELLO message)

The digital signature is constructed using MD5 and then encrypted using the clients private key, formatted according to PKCS#1's digital signature standard. See, RSA Laboratories, PKCS#1: RSA Encryption Standard, Version 1.5, November 1993. The server authenticates the client by verifying the digital signature using standard techniques. Note that other digest functions are supported. Either a new AUTHENTICATION-TYPE can be added, or the algorithm-id in the digital signature can be changed.

This message must be sent by the client only in response to a REQUEST-CERTIFICATE message.

Finished Phase Messages

Finished phase messages are sent encrypted.

Client-Finished

The Client-finished message has the following format:

char MSG-CLIENT-FINISHED
char CONNECTION-ID-LENGTH-MSB
char CONNECTION-ID-LENGTH-LSB
char HANDSHAKE-HASH-LENGTH-MSB
char HANDSHAKE-HASH-LENGTH-LSB
char CONNECTION-ID-DATA[MSB<<8/LSB]
char HANDSHAKE-HASH-DATA[MSB<<8/LSB]

The client sends this message when it is satisfied with the server. Note that the client must continue to listen for server messages until it receives a SERVER-FINISHED message. The CONNECTION-ID data is the original connection-identifier the server sent with its SERVER-HELLO message.

The HANDSHAKE-HASH data is the hash of the client's handshake messages sent previously to the server. The hash function used is defined by the agreed upon cipher (e.g., MD5). The client initializes the hash function at the beginning of the communications session and feeds into it every SSL record sent to the server. The entire record is sent including the record header, MAC, record data and optional padding. If the record was sent encrypted then the encrypted data is fed to the hash function, otherwise the clear data is used. The data is fed to the hash function in the same order as it is transmitted. When the client is ready to send the CLIENT-FINISHED message, the client "finalizes" the hash function retrieving from it the final hash value (in the case of MD5, 128 bits of data).

Note that data sent prior to discovery of the hash function must be saved by the client so that it can be fed to the hash function once the hash function is determined.

Also note that the client authentication messages will not be protected under the cover of the HANDSHAKE-HASH. This is not a problem, however, because the CLIENT-CERTIFICATE message is sent encrypted and is already protected with by a MAC.

For version 2 of the protocol, the client must send this message after it has received the SERVER-HELLO message. If the SERVER-HELLO message SESSION-ID-HIT flag is non-zero then the CLIENT-FINISHED message is sent immediately, otherwise the CLENTFINISHED message is sent after the CLIENT-MASTER-KEY message.

Client-FinishediV2 char MSG-CLIENT-FINISHED-V2
char CONNECTION-ID[N−1]

The client sends this message when it is satisfied with the server. Note that the client must continue to listen for server messages until it receives a SERVER-FINISHED message. The CONNECTION-ID data is the original connection-identifier the server sent with its SERVER-HELLO message, encrypted using the agreed upon session key.

"N" is the number of bytes in the message that was sent, so "N−1" is the number of bytes in the message without the message header byte.

For version 2 of the protocol, the client must send this message after it has received the SERVER-HELLO message. If the SERVER-HELLO message SESSION-ID-HIT flag is non-zero then the CLIENT-FINISHED message is sent immediately, otherwise the CLIENT-FINISHED message is sent after the CLIENT-MASTER-KEY message.

Server-Finished char MSG-SERVER-FINISHED
char SESSION-ID-LENGTH-MSB
char SESSION-ID-LENGTH-LSB char HANDSHAKE-HASH-LENGTH-MSB
    char HANDSHAKE-HASH-LENGTH-LSB
    char SESSION-ID-DATA[MSB<<8/LSB]
    char HANDSHAKE-HASH-DATA[MSB<<8/LSB]

The server sends this message when it is satisfied with the clients security handshake and is ready to proceed with transmission/reception of the higher level protocols data. The SESSION-ID is used by the client and the server at this time to add entries to their respective session-identifier caches. The session-identifier caches must contain a copy of any necessary data needed to reconstruct the security enhancements.

The HANDSHAKE-HASH data is the hash of the server's handshake messages sent previously to the client. The hash function used is defined by the agreed upon cipher (e.g. MD5). The server initializes the hash function at the beginning of the communications session and feeds into it every SSL record sent to the client. The entire record is sent including the record header, MAC, record data and optional padding. If the record was sent encrypted then the encrypted data is fed to the hash function, otherwise the clear data is used. The data is fed to the hash function in the same order as it is transmitted. When the server is ready to send the SERVER-FINISHED message, the server 'finalizes" the hash function retrieving from it the final hash value (in the case of MD5, 128 bits of data).

Note that data sent prior to discovery of the hash function must be saved by the server so that it can be fed to the hash function once the hash function is determined.

This message must be sent after the SERVER-VERIFY message.

Server-Finished-V2
    char MSG-SERVER-FINISHED-V2
    char SESSION-ID-DATA[N−1]

The server sends this message when it is satisfied with the clients security handshake and is ready to proceed with transmission/reception of the higher level protocols data. The SESSION-ID-DATA is used by the client and the server at this time to add entries to their respective session identifier caches. The session-identifier caches must contain a copy of the MASTER-KEY sent in the CLIENT-MASTER-KEY message as the master key is used for all subsequent session key generation.

"N" is the number of bytes in the message that was sent, so "N−1" is the number of bytes in the SESSION-ID-DATA without the message header byte.

This message must be sent alter the SERVER-VERIFY message.

I. Glossary of Terms

The words in this specification shall have their commonly accepted meaning in the relevant art except where specified otherwise. The following glossary is not intended to alter the common meaning of the terms explained in this section. The purpose of this section is to assist the reader in understanding the specification.

Application Protocol
    An application protocol is a protocol that normally layers directly on top of TCP/IP. For example: HTTP, TELNET, FTP and SMTP.
Authentication
    Authentication is the ability of one entity to determine the identity of another entity. Identity is defined by this document to mean the binding between a public key and a name and the implicit ownership of the corresponding private key.
Bulk Cipher
    This term is used to describe a cryptographic technique with certain performance properties. Bulk ciphers are used when large quantities of data are to be encrypted/decrypted in a timely manner. Examples include RC2, RC4, and IDEA.
Client
    In this specification client generally refers to the application entity that is initiates a connection to a server.
CLIENT-READ-KEY
    The session key that the client uses to initialize the client read cipher. This key has the same value as the SERVER-WRITE-KEY.
CLIENT-WRITE-KEY
    The session key that the client uses to initialize the client write cipher. This key has the same value as the SERVER-READ-KEY.
MASTER-KEY
    The master key that the client and server use for all session key generation. The CLIENT-READ-KEY, CLIENT-WRITE-KEY, SERVER-READ-KEY and SERVER-WRITE-KEY are generated from the MASTER-KEY.
MD2
    MD2 is a well known hashing function that converts an arbitrarily long data stream into a digest of fixed size. This function predates MD5, also a well known hashing function, which is viewed as a more robust hash function.
MD5
    MD5 is a well known hashing function that converts an arbitrarily long data stream into a digest of fixed size. The function has certain properties that make it useful for security, the most important of which is it's inability to be reversed.
Nonce
    A randomly generated value used to defeat "playback" attacks. One party randomly generates a nonce and sends it to the other party. The receiver encrypts it using the agreed upon secret key and returns it to the sender. Because the nonce was randomly generated by the sender this defeats playback attacks because the replayer can't know in advance the nonce the sender will generate. The receiver denies connections that do not have the correctly encrypted nonce.
Non-repudiable Information Exchange
    When two entities exchange information it is sometimes valuable to have a record of the communication that is non-repudiable. Neither party can then deny that the information exchange occurred. Version 2 of the SSL protocol does not support Non-repudiable information exchange.
Public Key Encryption
    Public key encryption is a technique that leverages asymmetric ciphers. A public key system consists of two keys: a public key and a private key. Messages encrypted with the public key can only be decrypted with the associated private key. Conversely, messages encrypted with the private key can only be decrypted with the public key. Public key encryption tends to be extremely compute intensive and so is not suitable as a bulk cipher.
Privacy
    Privacy is the ability of two entities to communicate without fear of eavesdropping. Privacy is often implemented by encrypting the communications stream between the two entities.
RC2, RC4
    Well known bulk ciphers developed by RSA. RC2 is block cipher and RC4 is a stream cipher.
Server
    In this specification, server generally refers to the application entity that responds to requests for connections from clients. The server generally is passive, waiting for requests from clients.

Session cipher

A session cipher is a "bulk" cipher that is capable of encrypting or decrypting arbitrarily large amounts of data. Session ciphers are used primarily for performance reasons. The session ciphers used by this protocol are symmetric. Symmetric ciphers have the property of using a single key for encryption and decryption.

Session identifier

A session identifier is a random value generated by a client that identifies itself to a particular server. The session identifier can be thought of as a handle that both parties use to access a recorded secret key (in our case a session key). If both parties remember the session identifier then the implication is that the secret key is already known and need not be negotiated.

Session key

The key to the session cipher. In SSL there are four keys that are called session keys: CLIENT-READ-KEY, CLIENT-WRITE-KEY, SERVER-READ-KEY, and SERVER-WRITE-KEY.

SERVER-READ-KEY

The session key that the server uses to initialize the server read cipher. This key has the same value as the CLIENT-WRITE-KEY.

SERVER-WRITE-KEY

The session key that the server uses to initialize the server write cipher. This key has the same value as the CLIENT-READ-KEY.

Symmetric Cipher

A symmetric cipher has the property that the same key can be used for decryption and encryption. An asymmetric cipher does not have this behavior. Some examples of symmetric ciphers: IDEA, RC2, RC4.

J. Source Code Listing

The following source code, which is hereby incorporated into this application, is used to implement the SSL library in accordance with a presently preferred embodiment of the invention. It will be appreciated that it is possible to implement the SSL library using different computer code without departing from the scope of the invention. This listing is provided merely to illustrate the best mode currently known to the inventors to practice the invention. Thus, neither the foregoing description nor the following source code listing is intended to limit the invention which is defined in the appended claims.

Notice of Copyright

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

ssl.h

```
/*
** Copyright (c) 1995. Netscape Communications Corporation. All rights
** reserved.  This use of this Secure Sockets Layer Reference
** Implementation (the "Software") is governed by the terms of the SSL
** Reference Implementation License Agreement. Please read the
** accompanying "License" file for a description of the rights granted.
** Any other third party materials you use with this Software may be
** subject to additional license restrictions from the licensors of such
** third party software and/or additional export restrictions. The SSL
** Implementation License Agreement grants you no rights to any such
** third party material.
*/
#ifndef sslref_ssl_h__
define sslref_ssl_h__ include "ssltypes.h"

/*
** Simple API provided to applications that use SSL.
*/

/* Create an SSL handle for "fd" */
extern SSLHandle *SSL_Create(int fd, int flags);

#define SSL_ENCRYPT_MASK        (1<<0)
#define SSL_ENCRYPT             (1<<0)  /* encrypt the connection */
define SSL_DONT_ENCRYPT        (0)     /* dont encrypt the connection */ define SSL_PROXY_MASK          (3<<1)
define SSL_SECURE_PROXY        (3<<1)  /* use ssld as proxy */
#define SSL_PROXY               (1<<1)  /* use sockd as proxy */
#define SSL_NO_PROXY            (0)     /* direct connection */

/* Destroy an SSL handle for "fd" */
extern void SSL_Destroy(SSLHandle *h);

/*
** Configure SSL server information.
**      "cert" pointer to the X509 certificate information
**      "certLen" length of the X509 certificate information
**      "privKey" the server's private key
*/
extern void SSL_ServerInfo(unsigned char *cert, int certlen,
                           RSAPrivateKey *privKey);

/*
** Configure authentication hook. The "hook" function is called after a
** certificate has been received and validated by SSL. The "hook"
** returns non-zero if it accepts the certificate, or zero if it
** doesn't. The "arg" value is an untyped pointer that can be used to
** pass information to the "hook" function.
*/
extern void SSL_AuthHook(int (*hook)(void *arg, unsigned char *cert,
                                     unsigned certLen),
                         void *arg);

/*
** Configure SSL client information
**      "cert" pointer to the X509 certificate information
**      "certLen" length of the X509 certificate information
**      "privKey" the client's private key
*/
extern void SSL_ClientInfo(unsigned char *cert, int certlen,
                           RSAPrivateKey *privKey);

/*
** Perform the handshake protocol using h. Return the status of the
``` ssl.h

```
**  handshake.
**       "h" the handle to the ssl connection
**       "how" determins how to perform the handshake If "how" is zero
**  then the handshake is done as an SSL client. If "how" is one then the
**  handshake is done as an SSL server. If "how" is two then the handshake
**  is done as an SSL server and requires client's to authenticate
**  themselves.
*/
extern int SSL_Handshake(SSLHandle *h, int how);

/* Values for "how" */
#define SSL_HANDSHAKE_AS_CLIENT                     0
#define SSL_HANDSHAKE_AS_SERVER                     1
#define SSL_HANDSHAKE_AS_SERVER_WITH_CLIENT_AUTH    2

/* Basic i/o operations */
extern int SSL_Read(SSLHandle *h, void *buf, int len);
extern int SSL_Write(SSLHandle *h, void *buf, int len);

/* Socket operations */
extern int SSL_Connect(SSLHandle *h, const void *sa, int salen);
extern int SSL_Bind(SSLHandle *h, const void *sa, int salen, long dstaddr);
extern int SSL_Listen(SSLHandle *h, int backlog);
extern SSLHandle *SSL_Accept(SSLHandle *h, void *addr, int *addrlenp);
extern int SSL_Getsockname(SSLHandle *h, void *name, int *namelenp);
extern SSLHandle *SSL_Rcmd(char **ahost,
                           int inport,
                           char *locuser,
                           char *remuser,
                           char *cmd,
                           SSLHandle **h2p,
                           int createflags);
extern int SSL_HandleToFD(SSLHandle *h);

/* Error codes. These are the return values */
#define SSL_ERROR_NO_CIPHERS                 -1
#define SSL_ERROR_NO_CERTIFICATE             -2
#define SSL_ERROR_BAD_CERTIFICATE            -4
#define SSL_ERROR_UNSUPPORTED_CERTIFICATE_TYPE -6
#define SSL_ERROR_IO                         -10
#define SSL_ERROR_BAD_MESSAGE                -11
#define SSL_ERROR_BAD_MAC                    -12
#define SSL_ERROR_UNSUPPORTED                -13
#define SSL_ERROR_BAD_CERT_SIG               -14
#define SSL_ERROR_BAD_CERT                   -15
#define SSL_ERROR_BAD_PEER                   -16
#define SSL_ERROR_PERMISSION_DENIED          -17

/****************************************************************/
/*
** Various and sundry protocol constants. DON'T CHANGE THESE. These
** values are defined by the SSL protocol specification.
*/ define SSL_PROTOCOL_VERSION                 2

/* Security handshake protocol codes */
#define SSL_MT_ERROR                         0
#define SSL_MT_CLIENT_HELLO                  1
#define SSL_MT_CLIENT_MASTER_KEY             2
#define SSL_MT_CLIENT_FINISHED               3
#define SSL_MT_SERVER_HELLO                  4
#define SSL_MT_SERVER_VERIFY                 5
#define SSL_MT_SERVER_FINISHED               6
#define SSL_MT_REQUEST_CERTIFICATE           7
#define SSL_MT_CLIENT_CERTIFICATE            8
``` ssl.h

```
/* Cypher kind's */
#define SSL_CK_RC4_128_WITH_MD5                 0x01,0x00,0x80
#define SSL_CK_RC4_128_EXPORT40_WITH_MD5        0x02,0x00,0x80
#define SSL_CK_RC2_128_CBC_WITH_MD5             0x03,0x00,0x80
#define SSL_CK_RC2_128_CBC_EXPORT40_WITH_MD5    0x04,0x00,0x80
#define SSL_CK_IDEA_128_CBC_WITH_MD5            0x05,0x00,0x80
#define SSL_CK_DES_64_CBC_WITH_MD5              0x06,0x00,0x40
#define SSL_CK_DES_192_EDE3_CBC_WITH_MD5        0x07,0x00,0xC0

/* Certificate type's */
#define SSL_CT_X509_CERTIFICATE                 0x01

/* Authentication type's */
#define SSL_AT_MD5_WITH_RSA_ENCRYPTION          0x01

/* Error codes */
#define SSL_PE_NO_CIPHERS                       0x0001
#define SSL_PE_NO_CERTIFICATE                   0x0002
#define SSL_PE_BAD_CERTIFICATE                  0x0004
#define SSL_PE_UNSUPPORTED_CERTIFICATE_TYPE     0x0006

/* Limits */
define SSL_MAX_BLOCK_CYPHER_LEN                0x3fff endif /* ssiref_ssl_h___ */
``` ssltypes.h

```
#ifndef __ssiref_ssitypes_h__
define __ssiref_ssitypes_h__ typedef struct DERLayoutStr DERLayout;
typedef struct DESContextStr DESContext;
typedef struct MDContextStr MDContext;
typedef struct PKCS5KeyStr PKCS5Key;
typedef struct RNGContextStr RNGContext;
typedef struct RSAPrivateKeyStr RSAPrivateKey;
typedef struct RSAPublicKeyStr RSAPublicKey;
typedef struct SSLHandleStr SSLHandle;

#endif /* __ssiref_ssitypes_h__ */
``` sslcfg.h

```
/*
** Copyright (c) 1995. Netscape Communications Corporation. All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#ifndef __sslref_cfg_h_
#define __sslref_cfg_h_

/*
** If you are using BSAFE, then you may or may not be able to use its DES
** code for SSL. If you have a repaired BSAFE (ask RSA if you do) then
** define this to true, otherwise leave it undefined. If it is undefined
** then libdes-3.0 is used for DES encryption.
*/
undef BSAFE_WORKS ifdef BSAFE
include "bsafe2/source/global.h"
#include "bsafe2/source/bsafe2.h"
#else    /* !BSAFE */
#include "rsaref20/source/global.h"
#include "rsaref20/source/rsaref.h"
#include "rsaref20/source/rsa.h"
endif   /* BSAFE */ endif /* __sslref_cfg_h_ */
``` sslib.h

```
/*
** Copyright (c) 1995, Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying 'License' file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#ifndef sslref_sslib_h___
#define sslref_sslib_h___

/*
** Security library used by SSL implementation and applications.
** Provides some basic capabilities wrapped up so that the underlying
** crypto library can be hidden.
*/
#include <sys/types.h>
#include "ssltypes.h"
#include "sslcfg.h"

#include <stdlib.h>
#include <stdio.h>
#include <unistd.h>
#include <string.h>
#include <netinet/in.h>

/* XXX */
extern unsigned char __ssl_ck_des64[3];
define CIPHER_KIND __ssl_ck_des64 struct RNGContextStr {
ifdef BSAFE
    B_ALGORITHM_OBJ rng;
#else
    unsigned char state[16];
    unsigned char stream[8];
    unsigned streamlen;
#endif
};

struct RSAPrivateKeyStr {
#ifdef BSAFE
    B_KEY_OBJ key;
#else   /* !BSAFE */
    R_RSA_PRIVATE_KEY key;
#endif  /* BSAFE */
};

struct RSAPublicKeyStr {
#ifdef BSAFE
    B_KEY_OBJ key;
#else   /* !BSAFE */
    R_RSA_PUBLIC_KEY key;
#endif  /* BSAFE */
};

/*
** A handle. Used to contain the state of the protocol machinery.
*/ typedef struct SSLSocksInfoStr SSLSocksInfo;

struct SSLSocksInfoStr {
``` ssllib.h

```c
    int direct;
    int didBind;

unsigned long sockdHost;
    unsigned short sockdPort;
    struct sockaddr_in bindAddr;

/* Data returned by sockd */
    unsigned long destHost;
    unsigned short destPort;
};

struct SSLHandleStr {
    /* Underlying unix file descriptor */
    int fd;
    int isServer;
    int serverFinished;
    int clientFinished;
    int createFlags;
    SSLSocksInfo *socks;

/* Handshake state */
    int haveSID;
    unsigned char *clientChallenge;
    unsigned clientChallengeLen;
    unsigned char *connectionID;
    unsigned connectionIDLen;
    unsigned char *authChallenge;
    unsigned authChallengeLen;
    RSAPublicKey *pubKey;

/* MAC state */
    int sendSeq;
    int rcvSeq;

/* Record layer state */
    unsigned char header[3];
    int padding;

/* Read buffer */
    unsigned char *base;
    unsigned char *data;
    int space;
    int len;

/* Cipher state */
    unsigned char *readKey;
    unsigned readKeyLen;
    unsigned char *writeKey;
    unsigned writeKeyLen;

/* Session-id stuff */
    unsigned char *sessionID;
    unsigned sessionIDLen;
    unsigned char *km;
    unsigned kmLen;
    unsigned char cipherKind[3];
    unsigned char *keyArg;
    unsigned keyArgLen;
    unsigned char *masterKey;
    unsigned masterKeyLen;
    unsigned char *peerCert;
    unsigned peerCertLen;

DESContext *readcx, *writecx;
};
``` ssllib.h

```c
#define MSB(x)          ((unsigned char)(((unsigned)(x) >> 8) & 0xff))
#define LSB(x)          ((unsigned char)(((unsigned)(x) >> 0) & 0xff))
#define COMBINE(p)      ((p)[0] << 8) | (p)[1])

#define MD2SIZE 16
define MD5SIZE 16 define SSL_MD2 1
define SSL_MD5 2 define DER_INTEGER             0x02
define DER_BIT_STRING          0x03
#define DER_OCTET_STRING        0x04
#define DER_NULL                0x05
#define DER_OBJECT_ID           0x06
#define DER_SEQUENCE            0x10
#define DER_SET                 0x11
#define DER_PRINTABLE_STRING    0x13
#define DER_T61_STRING          0x14
#define DER_IA5_STRING          0x16
define DER_UTC_TIME            0x17 define DER_CONSTRUCTED         0x20
define DER_UNIVERSAL           0x00
#define DER_APPLICATION         0x40
#define DER_CONTEXT_SPECIFIC    0x80
define DER_PRIVATE             0xC0 define DER_ANY                 0x100 struct DERLayoutStr {
    int type;
    unsigned char *item;
    unsigned itemLen;
};

extern unsigned DER_GetHeaderLen(unsigned char *der, unsigned *lenp);
extern long DER_GetInteger(unsigned char *der);
extern void DER_EncodeStr(unsigned char **dest, unsigned *destlenp, int type,
                          unsigned char *src, unsigned srclen);
extern void DER_EncodeInt(unsigned char **dest, unsigned *destlenp, int type,
                          long value);
extern void DER_EncodeSeq(unsigned char **dest, unsigned *destlenp, int type,
                          unsigned char *src1, unsigned srclen, ...);
extern int DER_DecodeSeq(DERLayout *seq, int nseq, int type,
                         unsigned char *src, unsigned srclen);

extern DESContext *DES_CreateContext(unsigned char *key, unsigned char *iv,
                                     int encrypt);
extern void DES_DestroyContext(DESContext *cx);
extern void DES_Encrypt(DESContext *cx, unsigned char *out, unsigned *outlen,
                        unsigned char *in, unsigned inlen);
extern void DES_Decrypt(DESContext *cx, unsigned char *out, unsigned *outlen,
                        unsigned char *in, unsigned inlen);

extern MDContext *MD_CreateContext(int type);
extern void MD_Update(MDContext *cx, unsigned char *buf, unsigned len);
extern void MD_Final(MDContext *cx, unsigned char *digest, unsigned *lenp);
extern void MD_DestroyContext(MDContext *cx);

extern RSAPrivateKey *PKCS1_CreatePrivateKey(RNGContext *rng, int keylen,
                                             int pubexp);
extern void PKCS1_DestroyPrivateKey(RSAPrivateKey *key);
extern unsigned PKCS1_GetPrivateKeySize(RSAPrivateKey *key);
extern void PKCS1_PrivateDecrypt(RSAPrivateKey *key,
                                 unsigned char *out, unsigned *outlen,
                                 unsigned char *in, unsigned inlen);
``` ssllib.h

```
extern void PKCS1_EncodePrivateKey(unsigned char **pk, unsigned *pklenp,
                                    RSAPrivateKey *key);
extern RSAPublicKey *PKCS1_ConvertToPublic(RSAPrivateKey *key);
extern RSAPublicKey *CreatePublicKey(unsigned char const *n, unsigned nlen,
                                      unsigned char const *e, unsigned elen);
extern void PKCS1_DestroyPublicKey(RSAPublicKey *key);
extern unsigned PKCS1_GetPublicKeySize(RSAPublicKey *key);
extern void PKCS1_PublicEncrypt(RSAPublicKey *key,
                                 unsigned char *out, unsigned *outlen,
                                 unsigned char *in, unsigned inlen,
                                 RNGContext *rng);
extern void PKCS1_EncodePublicKey(unsigned char **pk, unsigned *pklenp,
                                   RSAPublicKey *key);
extern int PKCS1_VerifySignature(int alg,
                                  unsigned char const *buf, unsigned buflen,
                                  unsigned char const *sig, unsigned siglen,
                                  RSAPublicKey *key);
extern void PKCS1_Sign(int alg,
                       unsigned char **sig, unsigned *siglen,
                       unsigned char const *buf, unsigned buflen,
                       RSAPrivateKey *key);

extern PKCS5Key *PKCS5_GenerateKey(char *pw, char *salt, int iterationCount);
extern void PKCS5_DestroyKey(PKCS5Key *key);
extern void PKCS5_Encrypt(PKCS5Key *key, unsigned char *out, unsigned *outlen,
                          unsigned char *in, unsigned inlen);
extern void PKCS5_Decrypt(PKCS5Key *key, unsigned char *out, unsigned *outlen,
                          unsigned char *in, unsigned inlen);
extern void PKCS5_Encode(PKCS5Key *key, unsigned char **bufp, unsigned *lenp);

extern void PKCS7_Wrap(unsigned char **dest, unsigned *destlenp,
                       unsigned char *rawold, unsigned rawoldlen,
                       unsigned char *src, unsigned srclen);

extern int PKCS7_Unwrap(unsigned char **oldp, unsigned *oldlenp,
                        unsigned char **datap, unsigned *datalenp,
                        unsigned char *src, unsigned srclen);

extern RSAPrivateKey *PKCS8_ReadPrivateKey(FILE *in, char *pw);
extern void PKCS8_WritePrivateKey(FILE *out, PKCS5Key *sk, RSAPrivateKey *key);

extern RNGContext *RNG_CreateContext(char *pseed, int seedlen);
extern void RNG_GenerateRandomBytes(RNGContext *cx, unsigned char *buf,
                                     unsigned len);
extern void RNG_DestroyContext(RNGContext *cx);

extern char *S_GetPassword(char *prompt);
extern void S_Zfree(void *buf, unsigned len);
extern int S_ReadCertificate(unsigned char **cert, unsigned *certlen, FILE *fp);
extern int S_Read(int fd, void *buf, int len);
extern int S_Write(int fd, void *buf, int len);

extern int SSL_ReadRecord(SSLHandle *h);
extern int SSL_ReadMessage(SSLHandle *h);
extern int SSL_SetError(int e);

extern int X509_CheckCert(SSLHandle *h, unsigned char const *cert, int certlen);
extern char *X509_FindSubject(unsigned char const *cert, int certlen);
extern char *SSL_GetPeerCommonName(SSLHandle *h);

/* internal functions */
extern void ssl_DestroySocksInfo(SSLSocksInfo *si);
extern int ssl_CreateSocksInfo(SSLHandle *h);
extern SSLHandle *ssl_NewHandle(int fd, int flags);

#endif /* ssl_ref_ssllib_h__ */
``` sslcert.c

```
/*
** Copyright (c) 1995.  Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "ssllb.h"

#define BEGIN    "-----BEGIN PRIVACY-ENHANCED MESSAGE-----"

static void ZapNL(char *cp)
{
    int len;
    len = strlen(cp);
    while (len) {
        if ((cp[len-1] == '\n') || (cp[len-1] == '\r')) {
            cp[--len] = 0;
        } else
            break;
    }
} static char *Cat(char *a, char *b)
{
    if (a) {
        a = (char*) realloc(a, strlen(a)+strlen(b)+1);
        strcat(a, b);
    } else {
        a = (char*) malloc(strlen(b)+1);
        strcpy(a, b);
    }
    return a;
} static int Strncasecmp(char *a, char *b, int n)
{
    char ca, cb;

while (--n >= 0) {
        ca = *a++;
        cb = *b++;
        if (ca != cb) {
            if (ca == 0) return -1;
            if (cb == 0) return 1;
            if ((ca >= 'A') && (ca <= 'Z')) {
                ca += 32;
            }
            if ((cb >= 'A') && (cb <= 'Z')) {
                cb += 32;
            }
            if (ca != cb) return ca - cb;
        }
    }
    return 0;
} static int Map(char **cpp, int *lenp)
{
    char c, *cp;
    int len;
``` sslcert.c

```
            cp = *cpp;
            len = *lenp;
            while (len) {
                c = *cp++;
                len--;
                if ((c == ' ') || (c == '\t') || (c == '\n') || (c == '\r')) {
                    continue;
                }
                break;
            }
            *cpp = cp;
            *lenp = len;

if ((c >= 'A') && (c <= 'Z')) {
                return 1 + (int)(c - 'A');
            }
            if ((c >= 'a') && (c <= 'z')) {
                return 1 + 26 + (int)(c - 'a');
            }
            if ((c >= '0') && (c <= '9')) {
                return 1 + 52 + (int)(c - '0');
            }
            if (c == '+') return 1 + 62;
            if (c == '/') return 1 + 63;
            if (c == '=') return 0;

return -1;
        }

/*
        ** Hack to read in certificate from a certificate-authorities email
        ** response. Handles email from a PEM based certificate authority.
        */
        int S_ReadCertificate(unsigned char **cert, unsigned *certlen, FILE *fp)
        {
            unsigned char *bin, *bp;
            unsigned binlen;
            char line[2000];
            char *body, *cp, *body0;
            int got, bodylen, b0, b1, b2, b3;

got = 0;
            body = 0;
            bin = 0;
            for (;;) {
                cp = fgets(line, sizeof(line), fp);
                if (!cp) break;
                ZapNL(cp);
                if (strcmp(cp, BEGIN) == 0) {
                    got = 1;
                } else if (got == 1) {
                    if (Strncasecmp(cp, "originator-certificate:", 23) == 0) {
                        cp = strchr(cp, ':');
                        cp++;
                        body = Cat(body, cp);
                        got = 2;
                    }
                } else if (got == 2) {
                    if ((cp[0] == ' ') || (cp[0] == '\t')) {
                        body = Cat(body, cp);
                    } else
                        break;
                }
            }
            body0 = body;
            if ((got != 2) || !body) goto loser;
            bodylen = strlen(body);
``` ssicert.c

```c
/* Convert body (base64 encoding) back to binary */
binlen = (bodylen / 4) * 3;
bin = bp = (unsigned char*) malloc(binlen);
while (bodylen) {
    b0 = Map(&body, &bodylen);
    if (b0 <= 0) goto loser;
    b1 = Map(&body, &bodylen);
    if (b1 <= 0) goto loser;
    b2 = Map(&body, &bodylen);
    if (b2 < 0) goto loser;
    b3 = Map(&body, &bodylen);
    if (b3 < 0) goto loser;
    b0--;
    b1--;
    if (b2 == 0) {
        bp[0] = (b0 << 2) | ((b1 >> 4) & 0x3);
        bp++;
    } else if (b3 == 0) {
        b2--;
        bp[0] = (b0 << 2) | ((b1 >> 4) & 0x3);
        bp[1] = ((b1 & 0xf) << 4) | ((b2 >> 2) & 0xf);
        bp += 2;
    } else {
        b2--;
        b3--;
        bp[0] = (b0 << 2) | ((b1 >> 4) & 0x3);
        bp[1] = ((b1 & 0xf) << 4) | ((b2 >> 2) & 0xf);
        bp[2] = ((b2 & 0x3) << 6) | b3;
        bp += 3;
    }
}
free(body0);
*cert = bin;
*certlen = bp - bin;
return 0;

loser:
    *cert = 0;
    *certlen = 0;
    if (bin) free(bin);
    free(body0);
    return -1;
}
```

-88- sslhp.c

```
/*
** Copyright (c) 1995. Netscape Communications Corporation. All rights
** reserved. This use of this Secure Sockets Layer Reference
** Implementation (the "Software") is governed by the terms of the SSL
** Reference Implementation License Agreement. Please read the
** accompanying 'License' file for a description of the rights granted.
** Any other third party materials you use with this Software may be
** subject to additional license restrictions from the licensors of such
** third party software and/or additional export restrictions. The SSL
** Implementation License Agreement grants you no rights to any such
** third party material.
*/
#include "ssl.h"
#include "ssllib.h"

#include <assert.h>
#include <unistd.h>
#include <stdlib.h>
#include <stdio.h>
#include <string.h>
#include <time.h>
#include <sys/socket.h>
#include <netinet/in.h>

/* Server info */
static unsigned char *server_cert;
static int server_certLen;
static RSAPrivateKey *server_key;

/* Client info */
static unsigned char *client_cert;
static int client_certLen;
static RSAPrivateKey *client_key;

/* Session-ID data */
static unsigned char *sid_sid;
static unsigned sid_len;
static unsigned char *sid_km;
static unsigned sid_kmLen;
static unsigned char sid_cipherKind[3];
static unsigned char *sid_keyArg;
static unsigned sid_keyArgLen;
static unsigned char *sid_masterKey;
static unsigned sid_masterKeyLen;
static unsigned char *sid_peerCert;
static unsigned sid_peerCertLen;
static struct in_addr sid_ip;
static time_t sid_time;

/* Random number generator */
static RNGContext *rng;

static int (*auth_hook)(void *arg, unsigned char *cert, unsigned certLen);
static void *auth_arg;

unsigned char __ssl_ck_des64[] = {
    SSL_CK_DES_64_CBC_WITH_MD5,
};

static unsigned char cipherSpecs[] = {
    SSL_CK_DES_64_CBC_WITH_MD5,
};

/**************************************************************************/ static void Copy(unsigned char **destp, unsigned char *src, int srclen)
{
``` sslhp.c

```c
    if (*destp) {
        free(*destp);
        *destp = 0;
    }
    if (src) {
        *destp = (unsigned char*) malloc(srclen);
        memcpy(*destp, src, srclen);
    }
}

/**************************************************************************/
/*
** Generate some random bytes. The RSAREF cryptographically secure (?)
** random number generator is not usable directly because the
** R_GenerateBytes is not part of the accepted API. Too bad.
*/
static int GenerateRandomBytes(unsigned char *dest, unsigned len)
{
    if (rng == 0) {
        rng = RNG_CreateContext(0, 0);
    }
    RNG_GenerateRandomBytes(rng, dest, len);
    return 0;
}

/**************************************************************************/
static unsigned char *LookupSID(SSLHandle *h, int *sidlenp)
{
    struct sockaddr_in sin;
    int sinsize;

/* Check for a session-id */
    sinsize = sizeof(sin);
    getpeername(h->fd, (struct sockaddr*) &sin, &sinsize);

*sidlenp = 0;
    if (sid_sid && (memcmp(&sin.sin_addr, &sid_ip, sizeof(sid_ip)) == 0)) {
        /* Found server in our session-id cache */
        if (time(0) > sid_time) {
            /* Session-id is too old */
            free(sid_sid);
            sid_sid = 0;
            return 0;
        }
        *sidlenp = sid_len;
        return sid_sid;
    }
    return 0;
} static void RecordSID(SSLHandle *h, unsigned char *sid, int sidlen)
{
    struct sockaddr_in sin;
    int sinsize;

Copy(&sid_sid, sid, sidlen);
    sid_len = sidlen;
    sinsize = sizeof(sin);
    getpeername(h->fd, (struct sockaddr*) &sin, &sinsize);
    memcpy(&sid_ip, &sin.sin_addr, sizeof(sid_ip));
    sid_time = time(0) + 100;

Copy(&sid_masterKey, h->masterKey, h->masterKeyLen);
    sid_masterKeyLen = h->masterKeyLen;
    Copy(&sid_keyArg, h->keyArg, h->keyArgLen);
``` sslhp.c

```
        sid_keyArgLen = h->keyArgLen;
        Copy(&sid_km, h->km, h->kmLen);
        sid_kmLen = h->kmLen;
        Copy(&sid_peerCert, h->peerCert, h->peerCertLen);
        sid_peerCertLen = h->peerCertLen;
        memcpy(sid_cipherKind, h->cipherKind, 3);
} static void RecoverSIDState(SSLHandle *h)
{
        Copy(&h->masterKey, sid_masterKey, sid_masterKeyLen);
        h->masterKeyLen = sid_masterKeyLen;
        Copy(&h->keyArg, sid_keyArg, sid_keyArgLen);
        h->keyArgLen = sid_keyArgLen;
        Copy(&h->km, sid_km, sid_kmLen);
        h->kmLen = sid_kmLen;
        Copy(&h->peerCert, sid_peerCert, sid_peerCertLen);
        h->peerCertLen = sid_peerCertLen;
        Copy(&h->sessionID, sid_sid, sid_len);
        h->sessionIDLen = sid_len;
        memcpy(h->cipherKind, sid_cipherKind, 3);
}

/***************************************************************/
/*
** Produce read & write keys
*/
static int ProduceKeys(SSLHandle *h)
{
        MDContext *digest;
        unsigned char km[3*16];
        unsigned int outlen;

assert(h->masterKeyLen != 0);
        assert(h->clientChallengeLen != 0);
        assert(h->connectionIDLen != 0);

if (memcmp(h->cipherKind, CIPHER_KIND, 3) == 0) {
                digest = MD_CreateContext(SSL_MD5);
                MD_Update(digest, h->masterKey, h->masterKeyLen);
                MD_Update(digest, (unsigned char*) "0", 1);
                MD_Update(digest, h->clientChallenge, h->clientChallengeLen);
                MD_Update(digest, h->connectionID, h->connectionIDLen);
                MD_Final(digest, km, &outlen);
                MD_DestroyContext(digest);

/* Save entire key material in case client auth is used */
                h->km = (unsigned char*) malloc(outlen);
                memcpy(h->km, km, outlen);
                h->kmLen = outlen;

if (h->isServer) {
                        Copy(&h->readKey, km+8, 8);
                        Copy(&h->writeKey, km, 8);
                } else {
                        Copy(&h->readKey, km, 8);
                        Copy(&h->writeKey, km+8, 8);
                }
                h->readKeyLen = 8;
                h->writeKeyLen = 8;

h->readcx = DES_CreateContext(h->readKey, h->keyArg, 0);
                h->writecx = DES_CreateContext(h->writeKey, h->keyArg, 1);
        }
        return 0;
}
``` sslhp.c

```
/****************************************************************/
/*
** Send a handshake message in the clear
*/
static int SendClearMsg(SSLHandle *h, void *buf, int len)
{
    char header[2];
    int nb;

header[0] = 0x80 | MSB(len);
    header[1] = LSB(len);
    nb = S_Write(h->fd, header, 2);
    if (nb != 2) {
        SSL_SetError(SSL_ERROR_IO);
        return SSL_ERROR_IO;
    }
    nb = S_Write(h->fd, buf, len);
    if (nb != len) {
        SSL_SetError(SSL_ERROR_IO);
        return SSL_ERROR_IO;
    }
    h->sendSeq++;

return 0;
} static int SendError(SSLHandle *h, int err, int encrypted)
{
    char msg[3];

msg[0] = SSL_MT_ERROR;
    msg[1] = MSB(err);
    msg[2] = LSB(err);
    if (encrypted) {
        return SSL_Write(h, msg, 3);
    }
    return SendClearMsg(h, msg, 3);
}

/****************************************************************/
static int SendClientHello(SSLHandle *h)
{
    unsigned char *msg, *sid;
    int sidlen, nb, rv;

/* Generate challenge */
    h->clientChallengeLen = 16;
    h->clientChallenge = (unsigned char*) malloc(16);
    rv = GenerateRandomBytes(h->clientChallenge, 16);
    if (rv < 0) return rv;

/* Lookup session-id */
    sid = LookupSID(h, &sidlen);
    if (sid) {
        h->haveSID = 1;
    }

/* Create client-hello message */
    msg = (unsigned char*) malloc(9 + sizeof(cipherSpecs) + sidlen + 16);
    msg[0] = SSL_MT_CLIENT_HELLO;
    msg[1] = MSB(SSL_PROTOCOL_VERSION);
    msg[2] = LSB(SSL_PROTOCOL_VERSION);
    msg[3] = MSB(sizeof(cipherSpecs));
    msg[4] = LSB(sizeof(cipherSpecs));
``` sslhp.c

```
    msg[5] = MSB(sidlen);
    msg[6] = LSB(sidlen);
    msg[7] = 0;
    msg[8] = 16;
    memcpy(msg+9, cipherSpecs, sizeof(cipherSpecs));
    memcpy(msg+9+sizeof(cipherSpecs), sid, sidlen);
    memcpy(msg+9+sizeof(cipherSpecs)+sidlen, h->clientChallenge, 16);

nb = SendClearMsg(h, msg, 9 + sizeof(cipherSpecs) + sidlen + 16);
    free(msg);
    return nb;
} static int SendClientMasterKey(SSLHandle *h)
{
    unsigned char *msg;
    int nb, cklen, eklen, kalen;
    unsigned int outlen;

cklen = 0;
    eklen = PKCS1_GetPublicKeySize(h->pubKey) >> 3;
    kalen = h->keyArgLen;

/* Create client-master-key message */
    msg = (unsigned char*) malloc(10+cklen+eklen+kalen);
    msg[0] = SSL_MT_CLIENT_MASTER_KEY;
    msg[1] = h->cipherKind[0];
    msg[2] = h->cipherKind[1];
    msg[3] = h->cipherKind[2];
    msg[4] = MSB(cklen);
    msg[5] = LSB(cklen);
    msg[6] = MSB(eklen);
    msg[7] = LSB(eklen);
    msg[8] = MSB(kalen);
    msg[9] = LSB(kalen);

PKCS1_PublicEncrypt(h->pubKey, msg+10+cklen, &outlen,
                        h->masterKey, h->masterKeyLen, rng);

memcpy(msg+10+cklen+eklen, h->keyArg, kalen);

/* Send the message */
    nb = SendClearMsg(h, msg, 10+cklen+eklen+kalen);
    free(msg);
    return nb;
} static int SendClientCertificate(SSLHandle *h, unsigned char *ch, unsigned len)
{
    unsigned char *msg, *buf;
    unsigned char *r;
    unsigned rlen, blen;
    int rv;

/*
    ** Generate response data by peforming a PKCS1 signing operation on
    ** some particular data.
    */
    blen = h->kmLen + len + h->peerCertLen;
    buf = (unsigned char*) malloc(blen);
    memcpy(buf, h->km, h->kmLen);
    memcpy(buf+h->kmLen, ch, len);
    memcpy(buf+h->kmLen+len, h->peerCert, h->peerCertLen);
    PKCS1_Sign(SSL_MD5, &r, &rlen, buf, blen, client_key);
    S_Zfree(buf, blen);

/* Create client-master-key message */
```

-93- sslhp.c

```c
    msg = (unsigned char*) malloc(6+client_certLen+rlen);
    msg[0] = SSL_MT_CLIENT_CERTIFICATE;
    msg[1] = SSL_CT_X509_CERTIFICATE;
    msg[2] = MSB(client_certLen);
    msg[3] = LSB(client_certLen);
    msg[4] = MSB(rlen);
    msg[5] = LSB(rlen);
    memcpy(msg+6, client_cert, client_certLen);
    memcpy(msg+6+client_certLen, r, rlen);

rv = SSL_Write(h, msg, 6+client_certLen+rlen);
    S_Zfree(r, rlen);
    free(msg);
    return rv;
} static int SendClientFinished(SSLHandle *h)
{
    unsigned char *msg;
    int rv;

msg = (unsigned char*) malloc(1+h->connectionIDLen);
    msg[0] = SSL_MT_CLIENT_FINISHED;
    memcpy(msg+1, h->connectionID, h->connectionIDLen);
    rv = SSL_Write(h, msg, 1+h->connectionIDLen);
    free(msg);
    return rv;
}

/***************************************************************/
/*
** Pick a cipher that we both speak
*/
static int PickCipher(SSLHandle *h, unsigned char *hs, int hslen)
{
    unsigned char *os;
    int oslen;

/* Make sure we have a good server */
    if (hslen < 3) {
        SSL_SetError(SSL_ERROR_BAD_PEER);
        return SSL_ERROR_BAD_PEER;
    }

/* Find first cipher-kind that matches */
    for (; hslen; hslen -= 3) {
        os = cipherSpecs;
        oslen = sizeof(cipherSpecs);
        for (; oslen; oslen -= 3, os += 3) {
            if ((os[0] == hs[0]) && (os[1] == hs[1]) && (os[2] == hs[2])) {
                /* Found a match */
                h->cipherKind[0] = os[0];
                h->cipherKind[1] = os[1];
                h->cipherKind[2] = os[2];
                return 0;
            }
        }
    }
    SSL_SetError(SSL_ERROR_NO_CIPHERS);
    return SSL_ERROR_NO_CIPHERS;
}

/*
** Generate random data for master key
*/
static int GenerateMasterKey(SSLHandle *h)
``` sslhp.c

```c
{
    int rv;

h->masterKey = (unsigned char*) malloc(8);
    h->masterKeyLen = 8;
    rv = GenerateRandomBytes(h->masterKey, 8);
    if (rv < 0) return rv;
    h->keyArg = (unsigned char*) malloc(8);
    h->keyArgLen = 8;
    rv = GenerateRandomBytes(h->keyArg, 8);
    if (rv < 0) return rv;

return 0;
}
/*
** Perform client handshake.
*/
static int ClientHandshake(SSLHandle *h)
{
    int rv, version, certlen, cslen, cidlen;

/* First send client-hello */
    rv = SendClientHello(h);
    if (rv < 0) return rv;

/* Get server hello */
    rv = SSL_ReadRecord(h);
    if (rv <= 0) return rv;
    if (h->len <= 11) {
        if ((h->len == 3) && (h->data[0] == SSL_MT_ERROR)) {
            return -COMBINE(h->data+1);
        }
        SSL_SetError(SSL_ERROR_BAD_PEER);
        return SSL_ERROR_BAD_PEER;
    }
    if (h->data[0] != SSL_MT_SERVER_HELLO) {
        SSL_SetError(SSL_ERROR_BAD_PEER);
        return SSL_ERROR_BAD_PEER;
    }
    version = COMBINE(h->data+3);
    certlen = COMBINE(h->data+5);
    cslen   = COMBINE(h->data+7);
    cidlen  = COMBINE(h->data+9);
    if (version != SSL_PROTOCOL_VERSION) {
        SSL_SetError(SSL_ERROR_UNSUPPORTED);
        return SSL_ERROR_UNSUPPORTED;
    }
    Copy(&h->connectionID, h->data+11+certlen+cslen, cidlen);
    h->connectionIDLen = cidlen;

/* Check session-id flag */
    if (h->data[1]) {
        /*
        ** Session-id cache hit. Next message from server is
        ** server-verify.
        */
        if (!h->haveSID) return SSL_SetError(SSL_ERROR_BAD_PEER);
        RecoverSIDState(h);
    } else {
        /* Session-id cache missed */
        if (h->data[2] != SSL_CT_X509_CERTIFICATE) {
            return SSL_SetError(SSL_ERROR_UNSUPPORTED);
        }
        if (cslen == 0) return SSL_SetError(SSL_ERROR_BAD_PEER);
        Copy(&h->peerCert, h->data+11, certlen);
        h->peerCertLen = certlen;
``` sslhp.c

```c
    /* XXX check cidlen */
    rv = X509_CheckCert(h, (unsigned char*) h->data+11, certlen);
    if (rv < 0) return rv;
    if (auth_hook) {
        rv = (*auth_hook)(auth_arg, h->data+11, certlen);
        if (rv == 0) return SSL_SetError(SSL_ERROR_PERMISSION_DENIED);
    }
    rv = PickCipher(h, h->data-11+certlen, cslen);
    if (rv < 0) return rv;

/* Generate master key */
    rv = GenerateMasterKey(h);
    if (rv < 0) return rv;

/* Now send client-master-key message */
    rv = SendClientMasterKey(h);
    if (rv < 0) return rv;
}
rv = ProduceKeys(h);
if (rv < 0) return rv;

/* Get server verify message */
rv = SSL_ReadMessage(h);
if (rv <= 0) return rv;
if (h->len != 1+h->clientChallengeLen)
    return SSL_SetError(SSL_ERROR_BAD_PEER);
if (h->data[0] != SSL_MT_SERVER_VERIFY)
    return SSL_SetError(SSL_ERROR_BAD_PEER);
if (memcmp(h->data+1, h->clientChallenge, h->clientChallengeLen-1) != 0)
    return SSL_SetError(SSL_ERROR_BAD_PEER);

/* Send client finished message */
rv = SendClientFinished(h);
if (rv < 0) return rv;

/* Get remaining messages from server... */
while (!h->serverFinished) {
    rv = SSL_ReadMessage(h);
    if (rv <= 0) return rv;
    if (h->len == 0) return SSL_SetError(SSL_ERROR_BAD_PEER);
    switch (h->data[0]) {
        case SSL_MT_ERROR:
            return SSL_SetError(-COMBINE(h->data+1));

case SSL_MT_SERVER_FINISHED:
            /* Capture session-id for later */
            RecordSID(h, h->data+1, h->len - 1);
            h->serverFinished = 1;
            break;

case SSL_MT_REQUEST_CERTIFICATE:
            if (client_cert && client_key &&
                (h->data[1] == SSL_AT_MD5_WITH_RSA_ENCRYPTION)) {
                rv = SendClientCertificate(h, h->data+2, h->len - 2);
            } else {
                rv = SendError(h, SSL_PE_NO_CERTIFICATE, );
            }
            if (rv < 0) return rv;
            break;
    }
}

/* Handshake is all done */
h->len = 0;
return 0;
}
``` sslhp.c

```
/*************************************************************/
static int SendServerHello(SSLHandle *h, int sid, unsigned char *cs, int cslen)
{
    unsigned char *msg, *out, *ms, *outbase, *cp;
    int outlen, mslen, nb;

/* Scan incoming cipher specs and eliminate anything we don't support */
    if (!sid) {
        outlen = 0;
        outbase = out = cs;
        for (; cslen; cslen -= 3, cs += 3) {
            ms = cipherSpecs;
            mslen = sizeof(cipherSpecs);
            for (; mslen; mslen -= 3) {
                if ((ms[0] == cs[0]) && (ms[1] == cs[1]) && (ms[2] == cs[2])) {
                    /* Found a match */
                    memcpy(out, cs, 3);
                    out += 3;
                    outlen += 3;
                    break;
                }
            }
        }
        if (outlen == 0) {
            /* We lose. No overlap */
            SendError(h, SSL_PE_NO_CIPHERS, 0);
            return SSL_SetError(SSL_ERROR_NO_CIPHERS);
        }
    }

/* Send message */
    assert(h->connectionIDLen != 0);
    msg = (unsigned char*) malloc(11+server_certLen+outlen+h->connectionIDLen);
    cp = msg + 11;
    msg[0] = SSL_MT_SERVER_HELLO;
    msg[1] = sid;
    msg[2] = SSL_CT_X509_CERTIFICATE;
    msg[3] = MSB(SSL_PROTOCOL_VERSION);
    msg[4] = LSB(SSL_PROTOCOL_VERSION);
    if (!sid) {
        msg[5] = MSB(0);
        msg[6] = LSB(0);
        msg[7] = MSB(0);
        msg[8] = LSB(0);
    } else {
        msg[5] = MSB(server_certLen);
        msg[6] = LSB(server_certLen);
        msg[7] = MSB(outlen);
        msg[8] = LSB(outlen);
        memcpy(cp, server_cert, server_certLen); cp += server_certLen;
        memcpy(cp, outbase, outlen); cp += outlen;
    }
    msg[9] = MSB(h->connectionIDLen);
    msg[10] = LSB(h->connectionIDLen);
    memcpy(cp, h->connectionID, h->connectionIDLen); cp += h->connectionIDLen;

nb = SendClearMsg(h, msg, cp - msg);
    free(msg);
    return nb;
} static int SendServerVerify(SSLHandle *h)
{
    unsigned char *msg;
    int nb;
``` sslhp.c

```
    assert(h->clientChallengeLen != 0);
    msg = (unsigned char*) malloc(1+h->clientChallengeLen);
    msg[0] = SSL_MT_SERVER_VERIFY;
    memcpy(msg+1, h->clientChallenge, h->clientChallengeLen);
    nb = SSL_Write(h, msg, 1+h->clientChallengeLen);
    free(msg);
    return nb;
} static int SendRequestCertificate(SSLHandle *h)
{
    unsigned char *msg;
    int nb, rv;

h->authChallenge = (unsigned char*) malloc(16);
    rv = GenerateRandomBytes(h->authChallenge, 16);
    if (rv < 0) return rv;
    h->authChallengeLen = 16;

msg = (unsigned char*) malloc(2+16);
    msg[0] = SSL_MT_REQUEST_CERTIFICATE;
    msg[1] = SSL_AT_MD5_WITH_RSA_ENCRYPTION;
    memcpy(msg+2, h->authChallenge, 16);
    nb = SSL_Write(h, msg, 2+16);
    free(msg);
    return nb;
} static int SendServerFinished(SSLHandle *h)
{
    unsigned char *msg;
    int nb;

assert(h->sessionIDLen != 0);
    msg = (unsigned char*) malloc(1+h->sessionIDLen);
    msg[0] = SSL_MT_SERVER_FINISHED;
    memcpy(msg+1, h->sessionID, h->sessionIDLen);
    nb = SSL_Write(h, msg, 1+h->sessionIDLen);
    free(msg);
    return nb;
} static int CheckClientCertificate(SSLHandle *h,
                                  unsigned char *cert, unsigned certLen,
                                  unsigned char *r, unsigned rLen)
{
    unsigned char *buf;
    unsigned blen;
    int rv;

/* First validate certificate */
    rv = X509_CheckCert(h, cert, certLen);
    if (rv < 0) return rv;
    if (auth_hook) {
        rv = (*auth_hook)(auth_arg, cert, certLen);
        if (rv == 0) return SSL_SetError(SSL_ERROR_PERMISSION_DENIED);
    }
    Copy(&h->peerCert, cert, certLen);
    h->peerCertLen = certLen;

/* Then verify response */
    blen = h->kmLen + h->authChallengeLen + server_cert_Len;
    buf = (unsigned char*) malloc(blen);
    memcpy(buf, h->km, h->kmLen);
    memcpy(buf+h->kmLen, h->authChallenge, h->authChallengeLen);
    memcpy(buf+h->kmLen+h->authChallengeLen, server_cert, server_cert_Len
```

-98- sslhp.c

```c
    rv = PKCS1_VerifySignature(SSL_MD5, buf, blen, r, rLen, h->pubKey);
    S_Zfree(buf, tlen);

return rv;
}

/*
** Perform server handshake
*/
static int ServerHandshake(SSLHandle *h, int authClient)
{
    int rv, oursidlen, version, cslen, sidlen, chlen, gotAuth;
    int cklen, eklen, kalen;
    unsigned char *sid, *r;
    unsigned int outlen, rLen, certLen;

/* Generate connection id */
    h->connectionID = (unsigned char*) malloc(16);
    rv = GenerateRandomBytes(h->connectionID, 16);
    if (rv < 0) return rv;
    h->connectionIDLen = 16;

/* Read client-hello message */
    rv = SSL_ReadRecord(h);
    if (rv <= 0) return ( ( rv == 0 ) ? -1 : rv );
    if (h->len < 9) return SSL_SetError(SSL_ERROR_BAD_PEER);
    if (h->data[0] != SSL_MT_CLIENT_HELLO)
        return SSL_SetError(SSL_ERROR_BAD_PEER);
    version = COMBINE(h->data+1);
    if (version != SSL_PROTOCOL_VERSION)
        return SSL_SetError(SSL_ERROR_UNSUPPORTED);
    cslen = COMBINE(h->data+3);
    sidlen = COMBINE(h->data+5);
    chlen = COMBINE(h->data+7);
    if ((cslen == 0) || (chlen == 0)) return SSL_SetError(SSL_ERROR_BAD_PEER);
    Copy(&h->clientChallenge, h->data+9+cslen+sidlen, chlen);
    h->clientChallengeLen = chlen;

/* Check session-id */
    sid = LookupSID(h, &oursidlen);
    if (sid) {
        if (sidlen) {
            /* See if it's the same sid... */
            if (memcmp(sid, h->data+9+cslen, sidlen)) {
                /* Not the same sid... */
                oursidlen = 0;
            } else {
                /* It is the same sid...winner! */
            }
        } else {
            /* Don't use entry from sid cache because client didn't use it */
            oursidlen = 0;
        }
    }
    if (oursidlen == 0) {
        /* Generate session-id */
        h->sessionID = (unsigned char*) malloc(16);
        rv = GenerateRandomBytes(h->sessionID, 16);
        if (rv < 0) return rv;
        h->sessionIDLen = 16;
    }

/* Send server hello message */
    rv = SendServerHello(h, oursidlen ? 1 : 0, h->data+9, cslen);
    if (rv < 0) return rv;

if (!oursidlen) {
``` sslhp.c

```
/* Get the client-master-key message */
rv = SSL_ReadRecord(h);
if (rv <= 0) return ( ( rv == 0 ) ? -1 : rv );
if (h->len < 10) return SSL_SetError(SSL_ERROR_BAD_PEER);
if (h->data[0] != SSL_MT_CLIENT_MASTER_KEY)
    return SSL_SetError(SSL_ERROR_BAD_PEER);
h->cipherKind[0] = h->data[1];
h->cipherKind[1] = h->data[2];
h->cipherKind[2] = h->data[3];
cklen = COMBINE(h->data+4);
eklen = COMBINE(h->data+6);
kalen = COMBINE(h->data+8);
Copy(&h->keyArg, h->data+10+cklen+eklen, kalen);
h->keyArgLen = kalen;

/* Decrypt in place the secret using our private key */
PKCS1_PrivateDecrypt(server_key, h->data+10+cklen,
                     &outlen, h->data+10+cklen, eklen);

Copy(&h->masterKey, h->data+10+cklen, outlen);
h->masterKeyLen = outlen;
} else {
    /* Copy info from session-id cache into h */
    RecoverSIDState(h);
}
rv = ProduceKeys(h);
if (rv < 0) return rv;

rv = SendServerVerify(h);
if (rv < 0) return rv;

#ifdef NOTDEFJSW
    if ((!oursidlen || !h->peerCertLen) && authClient) {
#else
    if (authClient) {
#endif
    /* Authenticate client */
    rv = SendRequestCertificate(h);
    if (rv < 0) return rv;
}

/* Now wait for client-finished message */
gotAuth = 0;
for (;;) {
    rv = SSL_ReadMessage(h);
    if (rv <= 0) return ( ( rv == 0 ) ? -1 : rv );
    if (h->len == 0) return SSL_SetError(SSL_ERROR_BAD_PEER);
    switch (h->data[0]) {
        case SSL_MT_ERROR:
            return -COMBINE(h->data+1);

case SSL_MT_CLIENT_CERTIFICATE:
            /* Check authentication response */
            certLen = COMBINE(h->data+2);
            rLen = COMBINE(h->data+4);
            rv = CheckClientCertificate(h, h->data+6, certLen,
                                        h->data+6+certLen, rLen);
            if (rv < 0) return rv;
            gotAuth = 1;
            break;

case SSL_MT_CLIENT_FINISHED:
            /* Check connection-id */
            if (h->connectionIDLen != h->len-1)
                return SSL_SetError(SSL_ERROR_BAD_PEER);
            if (memcmp(h->connectionID, h->data+1, h->connectionIDLen) != 0)
                return SSL_SetError(SSL_ERROR_BAD_PEER);
``` sslhp.c

```
            h->clientFinished = 1;
            break;
        }

/* See if it's time to stop */
        if (authClient) {
            if (gotAuth && h->clientFinished)
                break;
        } else {
            if (h->clientFinished)
                break;
        }
    }

/* Send server finished message */
    RecordSID(h, h->sessionID, h->sessionIDLen);
    rv = SendServerFinished(h);
    if (rv < 0) return rv;

/* Handshake is all done */
    h->len = 0;
    return 0;
}

/**********************************************************************/
/*
** SSL handshake code. Performs the SSL handshake protocol.
*/
int SSL_Handshake(SSLHandle *h, int how)
{
    if ( ( h->crmateFlags & SSL_ENCRYPT_MASK ) != SSL_DONT_ENCRYPT ) { switch (how) {
            case SSL_HANDSHAKE_AS_CLIENT:
                h->isServer = 0;
                return ClientHandshake(h);

case SSL_HANDSHAKE_AS_SERVER:
                h->isServer = 1;
                return ServerHandshake(h, 0);

case SSL_HANDSHAKE_AS_SERVER_WITH_CLIENT_AUTH:
                h->isServer = 1;
                return ServerHandshake(h, 1);
        }
    } else {
        return(0);
    }
}

/*
** A good place to set a breakpoint
*/
int SSL_SetError(int e)
{
    return e;
}

/*
** Stub to define server information
*/
void SSL_ServerInfo(unsigned char *c, int cl, RSAPrivateKey *key)
{
    server_key = key;
    server_cert = c;
    server_certLen = cl;
}
``` sslhp.c

```
}
/*
** Stub to define client information
*/
void SSL_ClientInfo(unsigned char *c, int cl, RSAPrivateKey *key)
{
    client_key = key;
    client_cert = c;
    client_certLen = cl;
} void SSL_AuthHook(int (*hook)(void *arg, unsigned char *cert,
                              unsigned certLen),
                  void *arg)
{
    auth_hook = hook;
    auth_arg = arg;
}
``` sslio.c

```
/*
** Copyright (c) 1995, Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying 'License' file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "ssl.h"
#include "ssllib.h"
#include <errno.h>

/*
** Perform symmetric DES cryptography.
*/
static int Crypto(unsigned char *dest, SSLHandle *h, int reading,
                  unsigned char *src, int len)
{
    unsigned part;

if (reading) {
        DES_Decrypt(h->readcx, dest, &part, src, len);
    } else {
        DES_Encrypt(h->writecx, dest, &part, src, len);
    }
    return 0;
}

/***************************************************************************/
/*
** Calculate MAC.  Use MD5.
*/
static int CalcMAC(unsigned char *dest, SSLHandle *h, int reading,
                   unsigned char *data, int len, int padding)
{
    unsigned char seq[4], pad[8];
    unsigned int ourlen;
    MDContext *md;

md = MD_CreateContext(SSL_MD5);
    if (reading) {
        MD_Update(md, h->readKey, h->readKeyLen);
    } else {
        MD_Update(md, h->writeKey, h->writeKeyLen);
    }
    MD_Update(md, data, len);
    if (padding) {
        memset(pad, padding, padding);
        MD_Update(md, pad, padding);
    }
    if (reading) {
        seq[0] = (h->rcvSeq >> 24) & 0xff;
        seq[1] = (h->rcvSeq >> 16) & 0xff;
        seq[2] = (h->rcvSeq >> 8) & 0xff;
        seq[3] = (h->rcvSeq >> 0) & 0xff;
        h->rcvSeq++;
    } else {
        seq[0] = (h->sendSeq >> 24) & 0xff;
        seq[1] = (h->sendSeq >> 16) & 0xff;
        seq[2] = (h->sendSeq >> 8) & 0xff;
        seq[3] = (h->sendSeq >> 0) & 0xff;
        h->sendSeq++;
``` sslio.c

```
    }
    MD_Update(md, seq, 4);
    MD_Final(md, dest, &outlen);
    MD_DestroyContext(md);
    return 0;
}

/*********************************************************************
**
** Spin reading until buffer is filled up with requested amount of data
*/
int S_Read(int fd, void *buf, int len)
{
    int count = 0;
    while (len) {
        int nb = read(fd, buf, len);
        if (nb < 0) {
            if ((errno == EINTR) || (errno == EAGAIN)) continue;
            return nb;
        }
        if (nb == 0) break;
        count += nb;
        len -= nb;
        buf = (void*) (((char*)buf) + nb);
    }
    return count;
} int S_Write(int fd, void *buf, int len)
{
    int count = 0;
    while (len) {
        int nb = write(fd, buf, len);
        if (nb < 0) {
            if ((errno == EINTR) || (errno == EAGAIN)) continue;
            return nb;
        }
        if (nb == 0) break;
        count += nb;
        len -= nb;
        buf = (void*) (((char*)buf) + nb);
    }
    return count;
}

/*
** Read an SSL record. Gather up the data and put into the buffer in h.
*/
int SSL_ReadRecord(SSLHandle *h)
{
    int nb;

h->len = 0;
    nb = S_Read(h->fd, h->header, 2);
    if (nb != 2) {
        if (nb == 0) return nb;
        SSL_SetError(SSL_ERROR_IO);
        return SSL_ERROR_IO;
    } if ((h->header[0] & 0x80) == 0) {
        /* Get rest of header. */
        nb = S_Read(h->fd, h->header + 2, 1);
        if (nb != 1) return SSL_SetError(SSL_ERROR_IO);
        h->len = ((h->header[0] & 0x3f) << 8) | h->header[1];
        h->padding = h->header[2];
```

-104- sslio.c

```
        if (h->header[0] & 0x40) {
            /* Somebody sent an escape...harumph */
            return SSL_SetError(SSL_ERROR_UNSUPPORTED);
        }
    } else {
        h->len = ((h->header[0] & 0x7f) << 8) | h->header[1];
        h->padding = 0;
    }

/* Make buffer big enough */
    if (h->len > h->space) {
        if (h->base) {
            h->base = (unsigned char*) realloc(h->base, h->len);
        } else {
            h->base = (unsigned char*) malloc(h->len);
        }
        h->space = h->len;
    }

/* Read rest of record */
    h->data = h->base;
    nb = S_Read(h->fd, h->data, h->len);
    if (nb != h->len) {
        SSL_SetError(SSL_ERROR_IO);
        return SSL_ERROR_IO;
    }
    h->rcvSeq++;

return h->len;
}

/*
** Read in an ssl message. Decrypt the incoming data.
*/
int SSL_ReadMessage(SSLHandle *h)
{
    unsigned char mac[MD5SIZE];
    int rv;

rv = SSL_ReadRecord(h);
    if (rv <= 0) return rv;
    if (h->len < MD5SIZE+h->padding) return SSL_SetError(SSL_ERROR_BAD_MESSAGE);
    h->rcvSeq++;

/* Decrypt the record (inplace) */
    if (memcmp(h->cipherKind, CIPHER_KIND, 3) == 0) {
        if (h->len & 7) return SSL_SetError(SSL_ERROR_BAD_MESSAGE);
        Crypt(h->data, h, 1, h->data, h->len);
    }

/* Check the mac */
    CalcMAC(mac, h, 1, h->data+MD5SIZE, h->len-MD5SIZE, 0);
    if (memcmp(mac, h->data, MD5SIZE) != 0) {
        return SSL_SetError(SSL_ERROR_BAD_MAC);
    } h->data += MD5SIZE;
    h->len = h->len - MD5SIZE - h->padding;

return h->len;
}

/************************************************************/
void SSL_Destroy(SSLHandle *h)
{
    if (h->base) free(h->base);
``` sslio.c

```c
if (h->clientChallenge) free(h->clientChallenge);
if (h->connectionID) free(h->connectionID);
if (h->pubKey) PKCS1_DestroyPublicKey(h->pubKey);
if (h->readKey) S_Zfree(h->readKey, h->readKeyLen);
if (h->writeKey) S_Zfree(h->writeKey, h->writeKeyLen);
if (h->sessionID) free(h->sessionID);
if (h->keyArg) free(h->keyArg);
if (h->masterKey) S_Zfree(h->masterKey, h->masterKeyLen);
if (h->km) S_Zfree(h->km, h->kmLen);
if (h->peerCert) free(h->peerCert);
if (h->readcx) DES_DestroyContext(h->readcx);
if (h->writecx) DES_DestroyContext(h->writecx);
if (h->socks) ssl_DestroySocksInfo(h->socks);
S_Zfree(h, sizeof(SSLHandle));
}

SSLHandle *ssl_NewHandle(int fd, int flags)
{
    SSLHandle *h;
    h = (SSLHandle*) calloc(1, sizeof(SSLHandle));
    if (h) {
        h->fd = fd;
        h->createFlags = flags;
    }
    return h;
}

SSLHandle *SSL_Create(int fd, int flags)
{
    SSLHandle *h;
    int rv;

h = ssl_NewHandle(fd, flags);

if ( h ) {
        rv = ssl_CreateSocksInfo(h);
        if ( rv < 0 ) {
            SSL_Destroy(h);
            h = 0;
        }
    } return(h);
} int SSL_Read(SSLHandle *h, void *buf, int len)
{
    int amount, count, nb;

if ( h->createFlags & SSL_ENCRYPT ) {
        count = 0;
        while (len) {
            /* Figure out how much to read this time through */
            amount = h->len;
            if (amount == 0) {
                if (count) break;

/* Get a new encrypted message from sender */
                nb = SSL_ReadMessage(h);
                if (nb <= 0) return nb;
                amount = h->len;
            }

/* Copy out a hunk of data */
            if (amount > len) amount = len;
            memcpy(buf, h->data, amount);
            h->data += amount;
``` sslio.c

```
            h->len -= amount;
            len -= amount;
            count += amount;
            buf = (void*) ((char*)buf + amount);
        }
    } else {
        count = read(h->fd, buf, len);
    }
    return count;
}

/*
** Limit write's so that they fit within a single record. Take into
** account the space needed by the MAC and by the block cypher (DES).
*/
#define MAX_WRITE \
    (SSL_MAX_BLOCK_CYPHER_LEN - MD5SIZE - 4)

int SSL_Write(SSLHandle *h, void *buf, int len)
{
    unsigned char *base, *cp;
    int nb, amount, count, padding, recordLen;

if ( ( h->createFlags & SSL_ENCRYPT_MASK ) != SSL_ENCRYPT ) {
        return(S_Write(h->fd, buf, len));
    } count = 0;
    while (len) {
        /* Make sure we don't send too large a record */
        amount = len;
        if (amount > MAX_WRITE) {
            amount = MAX_WRITE;
        }

/* Format up the record for transmission */
        base = cp = (unsigned char*) malloc(amount + 4 + MD5SIZE + 7);
        padding = amount & 7;
        if (padding) {
            padding = 8 - padding;
        }
        recordLen = amount + padding + MD5SIZE;
        if (padding) {
            *cp++ = (recordLen >> 8) & 0x7f;
            *cp++ = recordLen & 0xff;
            *cp++ = padding;
        } else {
            *cp++ = 0x80 | ((recordLen >> 8) & 0x7f);
            *cp++ = recordLen & 0xff;
        }

/* Compute mac and store it into the output buffer */
        CalcMAC(cp, h, 0, (unsigned char*)buf, amount, padding);
        memcpy(cp+MD5SIZE, buf, amount);
        memset(cp+MD5SIZE+amount, padding, padding);

/* Now encrypt the mac plus the input data plus the padding */
        if (memcmp(h->cipherKind, CIPHER_KIND, 3) == 0) {
            Crypto(cp, h, 0, cp, MD5SIZE+amount+padding);
        }
        cp += MD5SIZE + amount + padding;

/* Write it out */
        nb = S_Write(h->fd, base, cp - base);
        free(base);
        if (nb < 0) {
``` sslio.c

```
        return nb;
    }
    count += amount;
    len -= amount;
    buf = (void*) ((char*)buf + amount);
    }
    return count;
}
``` ssider.c

```
/*
** Copyright (c) 1995. Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "ssllib.h"
include <stdarg.h> static unsigned HeaderLen(unsigned len)
{
    if (len > 127) {
        if (len > 255) {
            if (len > 65535) {
                if (len > 16777215) {
                    return 6;
                } else {
                    return 5;
                }
            } else {
                return 4;
            }
        } else {
            return 3;
        }
    }
    return 2;
} static void StoreHeader(unsigned char *buf, unsigned code, unsigned len)
{
    unsigned char b[4];

b[0] = (len >> 24) & 0xff;
    b[1] = (len >> 16) & 0xff;
    b[2] = (len >> 8) & 0xff;
    b[3] = len & 0xff;
    *buf++ = code;
    if (len > 127) {
        if (len > 255) {
            if (len > 65535) {
                if (len > 16777215) {
                    *buf++ = 0x84;
                    *buf++ = b[0];
                    *buf++ = b[1];
                    *buf++ = b[2];
                    *buf++ = b[3];
                } else {
                    *buf++ = 0x83;
                    *buf++ = b[1];
                    *buf++ = b[2];
                    *buf++ = b[3];
                }
            } else {
                *buf++ = 0x82;
                *buf++ = b[2];
                *buf++ = b[3];
            }
        } else {
            *buf++ = 0x81;
```

-109- ssider.c

```c
            *buf++ = b[3];
        }
    } else {
        *buf++ = b[3];
    }
} void DER_EncodeStr(unsigned char **destp, unsigned *destlenp, int type,
                   unsigned char *src, unsigned srclen)
{
    unsigned char *dp;
    unsigned hlen;

hlen = HeaderLen(srclen);
    *destp = dp = (unsigned char*) malloc(hlen + srclen);
    StoreHeader(dp, type, srclen);
    memcpy(dp+hlen, src, srclen);
    *destlenp = hlen + srclen;
} void DER_EncodeInt(unsigned char **destp, unsigned *destlenp, int type,
                   long l)
{
    unsigned char bb[4], *dp;
    unsigned len, hlen;

bb[0] = (unsigned char) (l >> 24);
    bb[1] = (unsigned char) (l >> 16);
    bb[2] = (unsigned char) (l >> 8);
    bb[3] = (unsigned char) (l);

/*
    ** Small integers are encoded in a single byte. Larger integers
    ** require progressively more space.
    */
    if (l < -128) {
        if (l < -32768) {
            if (l < -8388608) {
                len = 4;
            } else {
                len = 3;
            }
        } else {
            len = 2;
        }
    } else if (l > 127) {
        if (l > 32767) {
            if (l > 8388607) {
                len = 4;
            } else {
                len = 3;
            }
        } else {
            len = 2;
        }
    } else {
        len = 1;
    } hlen = HeaderLen(len);
    *destp = dp = (unsigned char*) malloc(hlen + len);
    StoreHeader(dp, type, len);
    memcpy(dp+hlen, bb + (4 - len), len);
    *destlenp = hlen + len;
} void DER_EncodeSeq(unsigned char **destp, unsigned *destlenp, int type,
``` sslder.c

```c
                        unsigned char *src1, unsigned src1len,
                        ...)
{
    va_list ap;
    unsigned hlen, len, catlen;
    unsigned char *cat, *dp, *src;

va_start(ap, src1len);

/* Concatenate argument data and count up total length */
    cat = (unsigned char*) malloc(src1len);
    catlen = src1len;
    memcpy(cat, src1, src1len);
    for (;;) {
        src = va_arg(ap, char*);
        len = (unsigned) va_arg(ap, int);
        if (src == 0) break;
        cat = (unsigned char*) realloc(cat, catlen + len);
        memcpy(cat+catlen, src, len);
        catlen += len;
    }
    va_end(ap);

hlen = HeaderLen(catlen);
    *destp = dp = (unsigned char*) malloc(hlen + catlen);
    StoreHeader(dp, DER_SEQUENCE|DER_CONSTRUCTED|type, catlen);
    memcpy(dp+hlen, cat, catlen);
    free(cat);
    *destlenp = hlen + catlen;
}

/***************************************************************/
/*
** Parse a der length code. Return the total length of the header as well
** as the length of object that the header refers to (in *lenp).
*/
unsigned DER_GetHeaderLen(unsigned char *src, unsigned *lenp)
{
    unsigned hlen;

if (src[1] & 0x80) {
        hlen = 2 + (src[1] & 0x7f);
        switch (src[1] & 0x7f) {
          case 0x00:
            *lenp = 0;
            break;
          case 0x01:
            *lenp = src[2];
            break;
          case 0x02:
            *lenp = (src[2] << 8) | src[3];
            break;
          case 0x03:
            *lenp = (src[2] << 16) | (src[3] << 8) | src[4];
            break;
          case 0x04:
            *lenp = (src[2] << 24) | (src[3] << 16) | (src[4] << 8) | src[5];
            break;
        }
    } else {
        hlen = 2;
        *lenp = src[1];
    }
    return hlen;
} int DER_DecodeSeq(DERLayout *seq, int nseq, int type,
```

-110- sslder.c

```
                    unsigned char *src, unsigned srclen)
{
    unsigned hlen, olen;

/* Check and then strip off sequence */
    type = type | DER_SEQUENCE | DER_CONSTRUCTED;
    if (src[0] != type) {
        return -1;
    }
    hlen = DER_GetHeaderLen(src, &olen);
    src += hlen;
    srclen -= hlen;

/* Capture contents of sequence */
    while (--nseq >= 0) {
        if ((seq->type != DER_ANY) && (src[0] != seq->type)) {
            return -1;
        }
        hlen = DER_GetHeaderLen(src, &olen);
        seq->item = src;
        seq->itemLen = hlen + olen;
        seq++;
        src += hlen + olen;
        if (hlen + olen > srclen) {
            return -1;
        }
        srclen -= hlen + olen;
    }
    return 0;
} long DER_GetInteger(unsigned char *cp)
{
    unsigned len;
    long ival = 0;
    unsigned overflow = 0xff << ((sizeof(ival) - 1)*8);

if (cp[0] != DER_INTEGER) return 0;
    len = cp[1];
    if (len >= 0x80) return 0;
    cp += 2;
    while (len) {
        if (ival & overflow) {
            if (ival < 0) {
                return -1;
            }
            return (int) ((unsigned) (1 << (sizeof(ival)*8 - 1)) - 1);
        }
        ival = ival << 8;
        ival |= *cp++;
        --len;
    }
    return ival;
} void S_Zfree(void *buf, unsigned len)
{
    memset(buf, 0, len);
    free(buf);
}
``` ssldes.c

```
/*
** Copyright (c) 1995. Netscape Communications Corporation. All rights
** reserved. This use of this Secure Sockets Layer Reference
** Implementation (the "Software") is governed by the terms of the SSL
** Reference Implementation License Agreement. Please read the
** accompanying "License" file for a description of the rights granted.
** Any other third party materials you use with this Software may be
** subject to additional license restrictions from the licensors of such
** third party software and/or additional export restrictions. The SSL
** Implementation License Agreement grants you no rights to any such
** third party material.
*/
#include "ssllib.h"

#ifndef BSAFE_WORKS
/*
** Use libdes-x.0 to implement DES when we have a broken BSAFE library
*/
#include "libdes-x.0/des.h"
endif struct DESContextStr {
ifdef BSAFE_WORKS
    B_KEY_OBJ key;
    B_ALGORITHM_OBJ alg;
#else
    des_cblock key;
    des_cblock iv;
    des_key_schedule sched;
#endif
};

#ifdef BSAFE_WORKS
static B_ALGORITHM_METHOD *chooser[] = {
    &AM_DES_CBC_ENCRYPT_NO_PAD,
    &AM_DES_CBC_DECRYPT_NO_PAD,
    0,
};
endif DESContext *DES_CreateContext(unsigned char *key, unsigned char *iv, int enc)
{
    DESContext *cx;

cx = (DESContext*) malloc( sizeof(DESContext));
#ifdef BSAFE_WORKS
    B_CreateKeyObject(&cx->key);
    B_SetKeyInfo(cx->key, KI_DES8, (POINTER) key);
    B_CreateAlgorithmObject(&cx->alg);
    B_SetAlgorithmInfo(cx->alg, AI_DES_CBC_IV8, (POINTER) iv);
    if (enc) {
        B_EncryptInit(cx->alg, cx->key, chooser, 0);
    } else {
        B_DecryptInit(cx->alg, cx->key, chooser, 0);
    }
#else   /* !BSAFE_WORKS */
    memcpy(cx->key, key, 8);
    memcpy(cx->iv, iv, 8);
    des_set_odd_parity(&cx->key);
    des_key_sched(&cx->key, cx->sched);
#endif  /* BSAFE_WORKS */
    return cx;
} void DES_DestroyContext(DESContext *cx)
{
#ifdef BSAFE_WORKS
``` ssldes.c

```
    B_DestroyKeyObject(&cx->key);
#endif /* BSAFE_WORKS */
    memset(cx, 0, sizeof(DESContext));
    free(cx);
} void DES_Encrypt(DESContext *cx, unsigned char *out, unsigned *outlen,
                 unsigned char *in, unsigned inlen)
{
#ifdef BSAFE_WORKS
    B_EncryptUpdate(cx->alg, out, outlen, inlen, in, inlen, 0, 0);
#else /* !BSAFE_WORKS */
    des_cbc_encrypt((des_cblock*) &in[0], (des_cblock*) &out[0],
                    (long) inlen, cx->sched, &cx->iv, 1);
    /* update ivec cuz libdes doesn't */
    memcpy(cx->iv, &out[inlen-8], 8);
    *outlen = inlen;
#endif /* BSAFE_WORKS */
} void DES_Decrypt(DESContext *cx, unsigned char *out, unsigned *outlen,
                 unsigned char *in, unsigned inlen)
{
#ifdef BSAFE_WORKS
    B_DecryptUpdate(cx->alg, out, outlen, inlen, in, inlen, 0, 0);
#else /* !BSAFE_WORKS */
    unsigned char lastiv[8];

memcpy(lastiv, &in[inlen-8], 8);
    des_cbc_encrypt((des_cblock*) &in[0], (des_cblock*) &out[0],
                    (long) inlen, cx->sched, &cx->iv, 0);
    /* update ivec cuz libdes doesn't */
    memcpy(cx->iv, lastiv, 8);
    memset(lastiv, 0, 8);
    *outlen = inlen;
#endif /* BSAFE_WORKS */
}
``` sslpkcsl.c

```
/*
** Copyright (c) 1995. Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "ssllib.h"

ifdef BSAFE include "rsakeygn.h"

static B_ALGORITHM_METHOD *chooser[] = {
    &AM_RSA_KEY_GEN,
    &AM_RSA_ENCRYPT,
    &AM_RSA_DECRYPT,
    &AM_RSA_CRT_ENCRYPT,
    &AM_RSA_CRT_DECRYPT,
    &AM_MD2,
    &AM_MD5,
    0,
};

/*
** Insert leading zero for der encoding of private key information.  DER
** encoding of unsigned integers (which the private key information is)
** requires a leading zero if the high bit is set in the MSB
*/
static unsigned char *FixNZ(ITEM *it, unsigned *lenp)
{
    unsigned char *cp;

cp = (unsigned char*) malloc(it->len + 1);
    if (it->data[0] & 0x80) {
        /* Need extra 0 ... */
        cp[0] = 0;
        memcpy(cp+1, it->data, it->len);
        *lenp = it->len + 1;
    } else {
        memcpy(cp, it->data, it->len);
        *lenp = it->len;
    }
    return cp;
}
#else   /* !BSAFE */
/*
** Find first non-zero byte in key data buffer. The key data is (in
** theory) zero filled. DER encoding requires a leading zero if the data
** is unsigned and the high bit is set on the MSB, so add one in if
** necessary.
*/
static unsigned char *FindNZ(unsigned char *in, unsigned *lenp, unsigned maxlen)
{
    unsigned char *cp;

cp = (unsigned char*) malloc(maxlen+1);
    if (in[0] & 0x80) {
        /* Add in leading zero and return */
        cp[0] = 0;
        memcpy(cp+1, in, maxlen);
        *lenp = maxlen+1;
``` ssipkcs1.c

```c
        return cp;
    }
    while (in[0] == 0) {
        in++;
        maxlen--;
    }
    if (in[0] & 0x80) {
        cp[0] = 0;
        memcpy(cp+1, in, maxlen);
        *lenp = maxlen + 1;
    } else {
        memcpy(cp, in, maxlen);
        *lenp = maxlen;
    }
    return cp;
}

/*
** Setup a random number generator for RSAREF using random bytes from
** SSL rng.
*/
static void SetupRNG(RNGContext *rng, R_RANDOM_STRUCT *ctx)
{
    unsigned char *r;
    unsigned n;

R_RandomInit(ctx);
    R_GetRandomBytesNeeded(&n, ctx);
    r = (unsigned char*) malloc(n);
    RNG_GenerateRandomBytes(rng, r, n);
    R_RandomUpdate(ctx, r, n);
    S_Zfree(r, n);
}
endif /* BSAFE */
/****************************************************************/
/*
** Create a new private key
*/
RSAPrivateKey *PKCS1_CreatePrivateKey(RNGContext *rng, int keylen, int pubexp)
{
    RSAPrivateKey *key;
    int rv;
#ifdef BSAFE
    B_KEY_OBJ pub;
    B_ALGORITHM_OBJ gen;
    A_RSA_KEY_GEN_PARAMS kg;
#else /* !BSAFE */
    R_RSA_PUBLIC_KEY pubKey;
    R_RSA_PROTO_KEY protoKey;
    R_RANDOM_STRUCT ctx;
    unsigned char *r;
    unsigned n;
endif /* BSAFE */ if ( ( keylen > MAX_RSA_MODULUS_BITS ) ||
         ( keylen < MIN_RSA_MODULUS_BITS ) ) {
#ifdef BSAFE
        rv = BE_MODULUS_LEN;
#else /* BSAFE */
        rv = RE_MODULUS_LEN;
#endif /* BSAFE */
        SSL_SetError(rv);
        return(0);
    }
``` sslpkcsl.c

```
key = (RSAPrivateKey*) malloc(sizeof(RSAPrivateKey));
#ifdef BSAFE
    B_CreateAlgorithmObject(&gen);
    B_CreateKeyObject(&pub);
    B_CreateKeyObject(&key->key);
    rv = 0;
    do {
        kg.modulusBits = keylen;        /* NOT Exportable from U.S.A.! */
        switch ( pubexp ) {
            case 3:
                kg.publicExponent.data = "\003";      /* exponent is 3 */
                kg.publicExponent.len = 1;
                break;
            case 0x11:
                kg.publicExponent.data = "\021";      /* exponent is 17 */
                kg.publicExponent.len = 1;
                break;
            case 0x010001:
                kg.publicExponent.data = "\001\000\001";/* exponent is 65537 */
                kg.publicExponent.len = 3;
                break;
            default:
                rv = BE_DATA;
        }
        if (rv) break;
        rv = B_SetAlgorithmInfo(gen, AI_RSAKeyGen, (POINTER)&kg);
        if (rv) break;
        rv = B_GenerateInit(gen, chooser, 0);
        if (rv) break;
        rv = B_GenerateKeypair(gen, pub, key->key, rng->rng, 0);
        if (rv) break;
    } while (0);

if (rv) {
        SSL_SetError(rv);
        B_DestroyKeyObject(&key->key);
        S_Zfree(key, sizeof(RSAPrivateKey));
        key = 0;
    }
    B_DestroyAlgorithmObject(&gen);
    B_DestroyKeyObject(&pub);
    gen = 0;
    pub = 0;
#else   /* !BSAFE */
    SetupRNG(rng, &ctx);

/* Make key */ protoKey.bits = keylen;              /* NOT Exportable from U.S.A.! */
    switch ( pubexp ) {                  /* NOTE: RSAREF doesn't seem to */
        case 3:                          /*   support 17 for the exponent */
            protoKey.useFermat4 = 0;
            break;
        case 0x010001:
            protoKey.useFermat4 = 1;
            break;
        default:
            return(0);
    }
    R_GeneratePEMKeys(&pubKey, &key->key, &protoKey, &ctx);
    memset(&ctx, 0, sizeof(ctx));
    memset(&pubKey, 0, sizeof(pubKey));
endif  /* BSAFE */ return key;
``` ssipkcs1.c

```c
/*
** Destroy an existing private key
*/
void PKCS1_DestroyPrivateKey(RSAPrivateKey *key)
{
#ifdef BSAFE
    B_DestroyKeyObject(&key->key);
#endif /* BSAFE */
    memset(key, 0, sizeof(RSAPrivateKey));
    free(key);
}

/*
** Return the size, in bits, of the given private key
*/
unsigned PKCS1_GetPrivateKeySize(RSAPrivateKey *pub)
{
#ifdef BSAFE
    A_RSA_KEY *k1;
    unsigned rv;

B_GetKeyInfo((POINTER*)&k1, pub->key, KI_RSAPublic);
    rv = k1->modulus.len << 3;
    return rv;
#else
    return pub->key.bits;
#endif
}

/*
** Perform PKCS1 private key decryption
*/
void PKCS1_PrivateDecrypt(RSAPrivateKey *priv,
                          unsigned char *out, unsigned *outlen,
                          unsigned char *in, unsigned inlen)
{
#ifdef BSAFE
    B_ALGORITHM_OBJ alg;
    unsigned part1, part2;
    int rv;

B_CreateAlgorithmObject(&alg);
    do {
        rv = B_SetAlgorithmInfo(alg, AI_PKCS_RSAPrivate, (POINTER) 0);
        if (rv) break;
        rv = B_DecryptInit(alg, priv->key, chooser, 0);
        if (rv) break;
        rv = B_DecryptUpdate(alg, out, &part1, inlen, in, inlen, 0, 0);
        if (rv) break;
        rv = B_DecryptFinal(alg, out+part1, &part2, inlen-part1, 0, 0);
    } while(0);

if (rv) {
        SSL_SetError(rv);
        *outlen = 0;
    } else {
        *outlen = part1 + part2;
    }
    B_DestroyAlgorithmObject(&alg);
    alg = 0;
#else   /* !BSAFE */
    RSAPrivateDecrypt(out, outlen, in, inlen, &priv->key);   /* !RSAREF */
#endif /* BSAFE */
}
``` sslpkcs1.c

```
/*
** DER Encode a private key using PKCS1
*/
void PKCS1_EncodePrivateKey(unsigned char **pk, unsigned *pklenp,
                            RSAPrivateKey *key)
{
    unsigned char *n, *e, *d, *p, *q, *dmodp1, *dmodq1, *coeff;
    unsigned char *dn, *de, *dd, *dp, *dq, *ddmodp1, *ddmodq1, *dcoeff;
    unsigned nlen, elen, dlen, plen, qlen, dmodpllen, dmodqllen, coefflen;
    unsigned dnlen, delen, ddlen, dplen, dqlen, ddmodpllen;
    unsigned ddmodqllen, dcoefflen;
    unsigned char *vers;
    unsigned version;
#ifdef BSAFE
    A_PKCS_RSA_PRIVATE_KEY *ki;
endif /* Extract and prepare key information */
ifdef BSAFE
    ki = 0;
    B_GetKeyInfo((POINTER*)&ki, key->key, KI_PKCS_RSAPrivate);
    n = FixNZ(&ki->modulus, &nlen);
    e = FixNZ(&ki->publicExponent, &elen);
    d = FixNZ(&ki->privateExponent, &dlen);
    p = FixNZ(&ki->prime[0], &plen);
    q = FixNZ(&ki->prime[1], &qlen);
    dmodp1 = FixNZ(&ki->primeExponent[0], &dmodpllen);
    dmodq1 = FixNZ(&ki->primeExponent[1], &dmodqllen);
    coeff = FixNZ(&ki->coefficient, &coefflen);
#else   /* !BSAFE */
    n = FindNZ(key->key.modulus, &nlen, sizeof(key->key.modulus));
    e = FindNZ(key->key.publicExponent, &elen, sizeof(key->key.publicExponent));
    d = FindNZ(key->key.exponent, &dlen, sizeof(key->key.exponent));
    p = FindNZ(key->key.prime[0], &plen, sizeof(key->key.prime[0]));
    q = FindNZ(key->key.prime[1], &qlen, sizeof(key->key.prime[1]));
    dmodp1 = FindNZ(key->key.primeExponent[0], &dmodpllen,
                    sizeof(key->key.primeExponent[0]));
    dmodq1 = FindNZ(key->key.primeExponent[1], &dmodqllen,
                    sizeof(key->key.primeExponent[0]));
    coeff = FindNZ(key->key.coefficient, &coefflen,
                   sizeof(key->key.coefficient));
#endif  /* !BSAFE */

/* Encode RSAPrivateKey ala PKCS#1 */
    DER_EncodeInt(&vers, &version, DER_INTEGER, 0);
    DER_EncodeStr(&dn, &dnlen, DER_INTEGER, n, nlen);
    DER_EncodeStr(&de, &delen, DER_INTEGER, e, elen);
    DER_EncodeStr(&dd, &ddlen, DER_INTEGER, d, dlen);
    DER_EncodeStr(&dp, &dplen, DER_INTEGER, p, plen);
    DER_EncodeStr(&dq, &dqlen, DER_INTEGER, q, qlen);
    DER_EncodeStr(&ddmodp1, &ddmodpllen, DER_INTEGER, dmodp1, dmodpllen);
    DER_EncodeStr(&ddmodq1, &ddmodqllen, DER_INTEGER, dmodq1, dmodqllen);
    DER_EncodeStr(&dcoeff, &dcoefflen, DER_INTEGER, coeff, coefflen);
    DER_EncodeSeq(pk, pklenp, DER_CONSTRUCTED,
                  vers, version,
                  dn, dnlen,
                  de, delen,
                  dd, ddlen,
                  dp, dplen,
                  dq, dqlen,
                  ddmodp1, ddmodpllen,
                  ddmodq1, ddmodqllen,
                  dcoeff, dcoefflen,
                  0, 0);
    free(vers);
    S_Zfree(n, nlen);
    S_Zfree(e, elen);
``` sslpkcs1.c

```
                unsigned char const *buf, unsigned buflen,
                RSAPrivateKey *key)
{
    unsigned char *sb;
    unsigned sblen, keySize;
#ifdef BSAFE
    B_ALGORITHM_OBJ sign;
    RNGContext *rnd;
    int rv;
#else
    R_SIGNATURE_CTX *sign;
endif keySize = PKCS1_GetPrivateKeySize(key) >> 3;
    sb = (unsigned char*) malloc(keySize);
#ifdef BSAFE
    B_CreateAlgorithmObject(&sign);
    do {
        rv = B_SetAlgorithmInfo(sign,
                     (alg == SSL_MD5)
                     ? AI_MD5WithRSAEncryption
                     : AI_MD2WithRSAEncryption,
                     (POINTER) 0);
        rv = B_SignInit(sign, key->key, chooser, 0);
        rv = B_SignUpdate(sign, (unsigned char*) buf, buflen, 0);
        rv = B_SignFinal(sign, sb, &sblen, keySize, 0, 0);
    } while (0);
    B_DestroyAlgorithmObject(&sign);
    if (rv) {
        SSL_SetError(rv);
        *siglen = 0;
        *sig = 0;
        free(sb);
        return;
    }
#else
    sign = (R_SIGNATURE_CTX*) calloc(1, sizeof(R_SIGNATURE_CTX));
    R_SignInit(sign, (alg == SSL_MD5) ? DA_MD5 : DA_MD2);
    R_SignUpdate(sign, (unsigned char*) buf, buflen);
    R_SignFinal(sign, sb, &sblen, &key->key);
    free(sign);
#endif
    *sig = (unsigned char*) malloc(sblen);
    *siglen = sblen;
    memcpy(*sig, sb, sblen);
    free(sb);
}
``` sslpkcsl.c

```
        S_Zfree(d, dlen);
        S_Zfree(p, plen);
        S_Zfree(q, qlen);
        S_Zfree(dmodp1, dmodp1len);
        S_Zfree(dmodq1, dmodq1len);
        S_Zfree(coeff, coefflen);
        S_Zfree(dn, dnlen);
        S_Zfree(de, delen);
        S_Zfree(dd, ddlen);
        S_Zfree(dp, dplen);
        S_Zfree(dq, dqlen);
        S_Zfree(ddmodp1, ddmodp1len);
        S_Zfree(ddmodq1, ddmodq1len);
        S_Zfree(dcoeff, dcoefflen);
}

/**************************************************************************/
/*
** Convert a private key into a public key
*/
RSAPublicKey *PKCS1_ConvertToPublic(RSAPrivateKey *priv)
{
    RSAPublicKey *pub;
#ifdef BSAFE
    A_RSA_KEY *ki;
    int rv;
endif /* BSAFE */ pub = (RSAPublicKey*) calloc(1, sizeof(RSAPublicKey));
ifdef BSAFE
    ki = 0;
    B_CreateKeyObject(&pub->key);
    do {
        rv = B_GetKeyInfo((POINTER*)&ki, priv->key, KI_RSAPublic);
        if (rv) break;
        rv = B_SetKeyInfo(pub->key, KI_RSAPublic, (POINTER)ki);
        if (rv) break;
    } while (0);
    if (rv) {
        SSL_SetError(rv);
        B_DestroyKeyObject(&pub->key);
        S_Zfree(pub, sizeof(RSAPublicKey));
        pub = 0;
    }
#else  /* !BSAFE */
    pub->key.bits = priv->key.bits;
    memcpy(pub->key.modulus, priv->key.modulus, sizeof(pub->key.modulus));
    memcpy(pub->key.exponent, priv->key.publicExponent,
           sizeof(pub->key.exponent));
#endif /* BSAFE */
    return pub;
}

/*
** Destroy an existing public key
*/
void PKCS1_DestroyPublicKey(RSAPublicKey *key)
{
#ifdef BSAFE
    B_DestroyKeyObject(&key->key);
#endif /* BSAFE */
    memset(key, 0, sizeof(RSAPublicKey));
    free(key);
}

/*
``` sslpkcsl.c

```
/*
** Return the size, in bits, of the given public key
*/
unsigned PKCS1_GetPublicKeySize(RSAPublicKey *pub)
{
#ifdef BSAFE
    A_RSA_KEY *ki;
    unsigned rv;

rv = B_GetKeyInfo((POINTER*)&ki, pub->key, KI_RSAPublic);
    rv = ki->modulus.len << 3;
    return rv;
#else
    return pub->key.bits;
#endif
}

/*
** Perform PKCS1 public key encryption
*/
void PKCS1_PublicEncrypt(RSAPublicKey *pub,
                         unsigned char *out, unsigned *outlen,
                         unsigned char *in, unsigned inlen,
                         RNGContext *rng)
{
#ifdef BSAFE
    B_ALGORITHM_OBJ alg;
    unsigned part1, part2, nlen;
    int rv;

nlen = PKCS1_GetPublicKeySize(pub) >> 3;
    B_CreateAlgorithmObject(&alg);
    do {
        rv = B_SetAlgorithmInfo(alg, AI_PKCS_RSAPublic, (POINTER) 0);
        if (rv) break;
        rv = B_EncryptInit(alg, pub->key, chooser, 0);
        if (rv) break;
        rv = B_EncryptUpdate(alg, out, &part1, nlen, in, inlen, rng->rng, 0);
        if (rv) break;
        rv = B_EncryptFinal(alg, out+part1, &part2, nlen-part1, rng->rng, 0);
        if (rv) break;
    } while (0);
    B_DestroyAlgorithmObject(&alg);
    alg = 0;
    if (rv) {
        SSL_SetError(rv);
        *outlen = 0;
    } else {
        *outlen = part1 + part2;
    }
#else   /* !BSAFE */
    R_RANDOM_STRUCT ctx;

SetupRNG(rng, &ctx);
    RSAPublicEncrypt(out, outlen, in, inlen, &pub->key, &ctx); /* !RSAREF */
#endif  /* BSAFE */
}

/*
** DER Encode a public key using PKCS1
*/
void PKCS1_EncodePublicKey(unsigned char **pk, unsigned *pklenp,
                           RSAPublicKey *key)
{
    unsigned char *n, *e, *dn, *de;
    unsigned nlen, elen, dnlen, delen;
#ifdef BSAFE
    A_RSA_KEY *ki;
``` sslpkcs1.c

```
#endif  /* BSAFE */
#ifdef  BSAFE
    ki = 0;
    B_GetKeyInfo((POINTER*)&ki, key->key, KI_RSAPublic);
    n = FixNZ(&ki->modulus, &nlen);
    e = FixNZ(&ki->exponent, &elen);
#else   /* !BSAFE */
    n = FindNZ(key->key.modulus, &nlen, sizeof(key->key.modulus));
    e = FindNZ(key->key.exponent, &elen, sizeof(key->key.exponent));
#endif  /* BSAFE */
    DER_EncodeStr(&dn, &dnlen, DER_INTEGER, n, nlen);
    DER_EncodeStr(&de, &delen, DER_INTEGER, e, elen);
    DER_EncodeSeq(pk, pklenp, 0,
                  dn, dnlen,
                  de, delen,
                  0, 0);

S_Zfree(n, nlen);
    S_Zfree(e, elen);
    S_Zfree(dn, dnlen);
    S_Zfree(de, delen);
}

/*************************************************************/ int PKCS1_VerifySignature(int alg, unsigned char const *buf, unsigned len,
                          unsigned char const *sig, unsigned siglen,
                          RSAPublicKey *pubKey)
{
    int rv;
#ifdef  BSAFE
    B_ALGORITHM_OBJ verify;

B_CreateAlgorithmObject(&verify);
    do {
        rv = B_SetAlgorithmInfo(verify, (alg == SSL_MD2)
                                ? AI_MD2WithRSAEncryption
                                : AI_MD5WithRSAEncryption,
                                (POINTER)0);
        if (rv) break;
        rv = B_VerifyInit(verify, pubKey->key, chooser, 0);
        if (rv) break;
        rv = B_VerifyUpdate(verify, (unsigned char*)buf, len, 0);
        if (rv) break;
        rv = B_VerifyFinal(verify, (unsigned char*)sig, siglen, 0, 0);
    } while (0);
    B_DestroyAlgorithmObject(&verify);
#else   /* !BSAFE */
    R_SIGNATURE_CTX *verify;

verify = (R_SIGNATURE_CTX*) calloc(1, sizeof(R_SIGNATURE_CTX));
    R_VerifyInit(verify, (alg == SSL_MD2) ? DA_MD2 : DA_MD5);
    R_VerifyUpdate(verify, (unsigned char*) buf, len);
    rv = R_VerifyFinal(verify, (unsigned char*) sig, siglen, &pubKey->key);
    free(verify);
endif  /* BSAFE */ if (rv) {
        SSL_SetError(rv);
        return -1;
    }
    return 0;
} void PKCS1_Sign(int alg,
                unsigned char **sig, unsigned *siglen,
```

-123- sslmd.c

```
/*
** Copyright (c) 1995. Netscape Communications Corporation. All rights
** reserved. This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "ssllib.h"

struct MDContextStr {
#ifdef BSAFE
    B_ALGORITHM_OBJ md;
#else
    R_DIGEST_CTX md;
#endif
};

#ifdef BSAFE
static B_ALGORITHM_METHOD *chooser[] = {
    &AM_MD2,
    &AM_MD5,
    0,
};
endif MDContext *MD_CreateContext(int type)
{
    MDContext *cx;

cx = (MDContext*) calloc(1, sizeof(MDContext));
#ifdef BSAFE
    B_CreateAlgorithmObject(&cx->md);
    B_SetAlgorithmInfo(cx->md, (type == SSL_MD2) ? AI_MD2 : AI_MD5, (POINTER)0);
    B_DigestInit(cx->md, 0, chooser, 0);
#else
    R_DigestInit(&cx->md, (type == SSL_MD2) ? DA_MD2 : DA_MD5);
#endif
    return cx;
} void MD_Update(MDContext *cx, unsigned char *buf, unsigned len)
{
#ifdef BSAFE
    B_DigestUpdate(cx->md, buf, len, 0);
#else
    R_DigestUpdate(&cx->md, buf, len);
#endif
} void MD_Final(MDContext *cx, unsigned char *digest, unsigned *lenp)
{
#ifdef BSAFE
    B_DigestFinal(cx->md, digest, lenp, 16, 0);
#else
    R_DigestFinal(&cx->md, digest, lenp);
#endif
} void MD_DestroyContext(MDContext *cx)
{
#ifdef BSAFE
    B_DestroyAlgorithmObject(&cx->md);
```

-124- sslmd.c

```
#endif
    memset(cx, 0, sizeof(MDContext));
    free(cx);
}
``` sslpkcs7.c

```c
/*
** Copyright (c) 1995. Netscape Communications Corporation. All rights
** reserved. This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions. The SSL
** Implementation License Agreement grants you no rights to any such
** third party material.
*/
#include "ssllib.h"

/*
** Take an OID and some data and wrap it up in a PKCS7 ContentInfo
** object.
*/
void PKCS7_Wrap(unsigned char **dest, unsigned *destlenp,
                unsigned char *rawoid, unsigned rawoidlen,
                unsigned char *src, unsigned srclen)
{
    unsigned char *oid;
    unsigned oidlen;

DER_EncodeStr(&oid, &oidlen, DER_OBJECT_ID, rawoid, rawoidlen);
    src[0] |= DER_CONTEXT_SPECIFIC;
    DER_EncodeSeq(dest, destlenp, 0,
                  oid, oidlen, src, srclen, 0, 0);
    free(oid);
}

/*
** Given a PKCS7 ContentInfo object, unwrap it into it's oid and data
** components. Caller checks the oid for the type of the data.
*/
int PKCS7_Unwrap(unsigned char **oidp, unsigned *oidlenp,
                 unsigned char **datap, unsigned *datalenp,
                 unsigned char *src, unsigned srclen)
{
    DERLayout lay[2];
    int rv;

lay[0].type = DER_OBJECT_ID;
    lay[1].type = DER_ANY;
    rv = DER_DecodeSeq(&lay[0], 2, 0, src, srclen);
    if (rv) return rv;

*oidp = (unsigned char*) malloc(lay[0].itemLen);
    memcpy(*oidp, lay[0].item, lay[0].itemLen);
    *oidlenp = lay[0].itemLen;

*datap = (unsigned char*) malloc(lay[1].itemLen);
    memcpy(*datap, lay[1].item, lay[1].itemLen);
    *datalenp = lay[1].itemLen;

return 0;
}
``` sslpkcs8.c

```
/*
** Copyright (c) 1995, Netscape Communications Corporation. All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "sslib.h"

#define RSADSI   0x2a, 0x86, 0x48, 0x86, 0xf7, 0x0d
#define PKCS1    RSADSI, 0x01, 0x01
#define PKCS5    RSADSI, 0x01, 0x05
define PKCS7    RSADSI, 0x01, 0x07 static unsigned char pbeWithMD5AndDEScbc[] = { PKCS5, 0x03 };
static unsigned char rsaEncryption[] = { PKCS1, 0x01 };
static unsigned char encryptedPrivateKeyInfo[] = { PKCS7, 0x08 };

#ifdef BSAFE
static B_ALGORITHM_METHOD *chooser[] = {
    &AM_MD5_RANDOM,
    0,
};
endif /*
** Write a private key out to a file using PKCS7 and PKCS8.  Use PKCS7 to
** "wrap" the data so that the file data is typed for later reading. Use
** PKCS8 EncryptedKeyInfo for actual key storage.
*/
void PKCS8_WritePrivateKey(FILE *out, PKCS5Key *key, RSAPrivateKey *key)
{
    unsigned char *rpk, *pk, *pkoid, *null, *pkaid, *vers;
    unsigned rpklen, pklen, pkoidlen, nullen, pkaidlen, verslen;
    unsigned char *attrs, *pki, *rawencdata, *encdata, *nid, *pbep;
    unsigned attrslen, pkilen, rawencdatalen, encdatalen, nidlen, pbeplen;
    unsigned char *algid, *epki, *final;
    unsigned algidlen, epkilen, finallen;

/* Extract and prepare key information */
    PKCS1_EncodePrivateKey(&rpk, &rpklen, key);
    DER_EncodeStr(&pk, &pklen, DER_OCTET_STRING, rpk, rpklen);
    S_Zfree(rpk, rpklen);

/* Encode privateKeyAlgorithm */
    DER_EncodeStr(&pkoid, &pkoidlen, DER_OBJECT_ID,
                  rsaEncryption, sizeof(rsaEncryption));
    DER_EncodeStr(&null, &nullen, DER_NULL, 0, 0);
    DER_EncodeSeq(&pkaid, &pkaidlen, DER_CONSTRUCTED,
                  pkoid, pkoidlen,
                  null, nullen,
                  0, 0);
    free(pkoid);
    free(null);

/* Encode PrivateKeyInfo using PKCS8 */
    DER_EncodeInt(&vers, &verslen, DER_INTEGER, 0);
    DER_EncodeStr(&attrs, &attrslen, DER_CONTEXT_SPECIFIC, 0, 0);
    DER_EncodeSeq(&pki, &pkilen, DER_CONSTRUCTED,
                  vers, verslen,
                  pkaid, pkaidlen,
                  pk, pklen,
``` sslpkcs8.c

```c
                    attrs, attrslen,
                    0, 0);
    free(vers);
    free(pkaid);
    S_Zfree(pk, pklen);
    free(attrs);
#if 0
    {FILE *f = fopen("FOO-pki","w");fwrite(pki,1,pkilen,f);fclose(f);}
endif /* Now encrypt the entire PrivateKeyInfo using PKCS5 */
    rawencdata = (unsigned char*) malloc(pkilen + 8);
    PKCS5_Encrypt(ekey, rawencdata, &rawencdatalen, pki, pkilen);
    DER_EncodeStr(&encdata, &encdatalen, DER_OCTET_STRING,
                  rawencdata, rawencdatalen);
    S_Zfree(pki, pkilen);
    S_Zfree(rawencdata, rawencdatalen);

/* Encode encryptionAlgorithm */
    DER_EncodeStr(&oid, &oidlen, DER_OBJECT_ID, pbeWithMD5AndDEScbc,
                  sizeof(pbeWithMD5AndDEScbc));
    PKCS5_Encode(ekey, &pbep, &pbeplen);
    DER_EncodeSeq(&algid, &algidlen, DER_CONSTRUCTED,
                  oid, oidlen, pbep, pbeplen, 0, 0);
    free(oid);
    S_Zfree(pbep, pbeplen);

/* Encode EncryptedPrivateKeyInfo */
    DER_EncodeSeq(&epki, &epkilen, DER_CONSTRUCTED,
                  algid, algidlen,
                  encdata, encdatalen,
                  0, 0);
    free(algid);
    S_Zfree(encdata, encdatalen);

/* Finally, wrap the whole thing using PKCS#7 */
    PKCS7_Wrap(&final, &finallen,
               encryptedPrivateKeyInfo, sizeof(encryptedPrivateKeyInfo),
               epki, epkilen);
    S_Zfree(epki, epkilen);

/* Write output */
    fwrite(final, 1, finallen, out);
    free(final);
}

/******************************************************************/
#ifdef BSAFE
static void Xfer(ITEM *d, DERLayout *lay)
{
    unsigned hlen, olen;

hlen = DER_GetHeaderLen(lay->item, &olen);
    d->data = lay->item + hlen;
    d->len = olen;
}
#else
static void ZeroFill(unsigned char *dest, int destlen, DERLayout *lay)
{
    unsigned hlen, olen;

hlen = DER_GetHeaderLen(lay->item, &olen);
    memset(dest, 0, destlen);
    memcpy(dest + destlen - olen, lay->item + hlen, olen);
}
endif
``` sslpkcs8.c

```
/*
** Read in a private key written out using the above write routine.
*/
RSAPrivateKey *PKCS8_ReadPrivateKey(FILE *in, char *pw)
{
    unsigned char *buf, *old, *epki, *pki;
    unsigned buflen, notused, oldlen, epkilen, pkilen, i, iterationCount;
    PKCS5Key *dkey;
    RSAPrivateKey *key;
    DERLayout epkilay[2], algid[2], pbe[2], pkilay[4], pkilayid[2], pklay[9];
    long version;
#ifdef BSAFE
    A_PKCS_RSA_PRIVATE_KEY k1;
endif buf = 0;
    old = 0;
    epki = 0;
    pki = 0;
    dkey = 0;
    key = 0;

buf = (unsigned char*) malloc(10000);
    buflen = fread(buf, 1, 10000, in);
    if ((int)buflen <= 0) goto loser;

/* First unwrap PKCS7 wrapper */
    PKCS7_Unwrap(&old, &oldlen, &epki, &epkilen, buf, buflen);
    /* XXX check contentType ... */

/* Next, take apart the EncryptedPrivateKeyInfo */
    epkilay[0].type = DER_SEQUENCE | DER_CONSTRUCTED;
    epkilay[1].type = DER_OCTET_STRING;
    DER_DecodeSeq(&epkilay[0], 2, DER_CONTEXT_SPECIFIC, epki, epkilen);

/* Take apart the encryptionAlgorithm */
    algid[0].type = DER_OBJECT_ID;
    algid[1].type = DER_ANY;
    DER_DecodeSeq(&algid[0], 2, 0, epkilay[0].item, epkilay[0].itemLen);

/* Check encryption algorithm */
    if (((algid[0].item[0] != 0x06) ||
        (algid[0].item[1] != sizeof(pbeWithMD5AndDEScbc)) ||
        (memcmp(&algid[0].item[2], pbeWithMD5AndDEScbc,
                sizeof(pbeWithMD5AndDEScbc)) != 0)) {
        /* Wrong algorithm id */
        goto loser;
    }

/* Next, extract the arguments to the pbe algorithm */
    pbe[0].type = DER_OCTET_STRING;
    pbe[1].type = DER_INTEGER;
    DER_DecodeSeq(&pbe[0], 2, 0, algid[1].item, algid[1].itemLen);

/*
    ** Construct decryption key.
    */
    i = DER_GetHeaderLen(pbe[0].item, &notused);
    iterationCount = DER_GetInteger(pbe[1].item);
    dkey = PKCS5_GenerateKey(pw, pbe[0].item+i, iterationCount);

/* Decrypt encryptedData to reveal the PrivateKeyInfo */
    pki = (unsigned char*) malloc(epkilay[1].itemLen);
    i = DER_GetHeaderLen(epkilay[1].item, &notused);
    PKCS5_Decrypt(dkey, pki, &pkilen, epkilay[1].item + i,
                  epkilay[1].itemLen - i);
``` sslpkcs8.c

```c
if (pkl[0] != (DER_SEQUENCE|DER_CONSTRUCTED)) {
    /* Probably a bad password */
    goto loser;
}

/* Tear apart the PrivateKeyInfo */
pkllay[0].type = DER_INTEGER;
pkllay[1].type = DER_SEQUENCE | DER_CONSTRUCTED;
pkllay[2].type = DER_OCTET_STRING;
pkllay[3].type = DER_ANY;
DER_DecodeSeq(&pkllay[0], 4, 0, pkl, pkllen);

/* Make sure it's version 0 */
version = DER_GetInteger(&pkllay[0].item);
if (version != 0) {
    goto loser;
}

/* Tear apart privateKeyAlgorithm */
pklaid[0].type = DER_OBJECT_ID;
pklaid[1].type = DER_ANY;
DER_DecodeSeq(&pklaid[0], 2, 0, pkllay[1].item, pkllay[1].itemLen);
if ((pklaid[0].item[0] != 0x06) ||
    (pklaid[0].item[1] != sizeof(rsaEncryption)) ||
    (memcmp(&pklaid[0].item[2], rsaEncryption,
            sizeof(rsaEncryption)) != 0)) {
    /* Wrong algorithm id */
    goto loser;
}

/* Tear apart privateKey and construct RSA private key */
key = (RSAPrivateKey*) calloc(1, sizeof(RSAPrivateKey));
for (i = 0; i < 9; i++)
    pklay[i].type = DER_INTEGER;
i = DER_GetHeaderLen(pklay[2].item, &notused);
DER_DecodeSeq(&pklay[0], 9, 0, pklay[2].item+i, pklay[2].itemLen-i);
#ifdef BSAFE
    Xfer(&ki.modulus, &pklay[1]);
    Xfer(&ki.publicExponent, &pklay[2]);
    Xfer(&ki.privateExponent, &pklay[3]);
    Xfer(&ki.prime[0], &pklay[4]);
    Xfer(&ki.prime[1], &pklay[5]);
    Xfer(&ki.primeExponent[0], &pklay[6]);
    Xfer(&ki.primeExponent[1], &pklay[7]);
    Xfer(&ki.coefficient, &pklay[8]);
    B_CreateKeyObject(&key->key);
    B_SetKeyInfo(key->key, KI_PKCS_RSAPrivate, (POINTER) &ki);
    memset(&ki, 0, sizeof(ki));
#else
    i = DER_GetHeaderLen(pklay[1].item, &notused);
    key->key.bits = pklay[1].itemLen - 1;
    if (pklay[1].item[i] == 0x00) {
        key->key.bits--;
    }
    key->key.bits <<= 3;
    ZeroFill(&key->key.modulus[0], MAX_RSA_MODULUS_LEN, &pklay[1]);
    ZeroFill(&key->key.publicExponent[0], MAX_RSA_MODULUS_LEN, &pklay[2]);
    ZeroFill(&key->key.exponent[0], MAX_RSA_MODULUS_LEN, &pklay[3]);
    ZeroFill(&key->key.prime[0][0], MAX_RSA_PRIME_LEN, &pklay[4]);
    ZeroFill(&key->key.prime[1][0], MAX_RSA_PRIME_LEN, &pklay[5]);
    ZeroFill(&key->key.primeExponent[0][0], MAX_RSA_PRIME_LEN, &pklay[6]);
    ZeroFill(&key->key.primeExponent[1][0], MAX_RSA_PRIME_LEN, &pklay[7]);
    ZeroFill(&key->key.coefficient[0], MAX_RSA_PRIME_LEN, &pklay[8]);
#endif
    goto done;

loser:
```

-130- sslpkcs8.c

```
    if (key) PKCS1_DestroyPrivateKey(key);
    key = 0;

done:
    memset(epklay, 0, sizeof(epklay));
    memset(algid, 0, sizeof(algid));
    memset(pbe, 0, sizeof(pbe));
    memset(pklay, 0, sizeof(pklay));
    memset(pkiaid, 0, sizeof(pkiaid));
    memset(pklay, 0, sizeof(pklay));
    if (buf) free(buf);
    if (old) free(old);
    if (epki) S_Zfree(epki, epkilen);
    if (pki) S_Zfree(pki, pkilen);
    if (dkey) PKCS5_DestroyKey(dkey);
    return key;
}
``` sslpwd.c

```c
/*
** Copyright (c) 1995. Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "sslib.h"
include <termios.h> static void echoOff(int fd)
{
    if (isatty(fd)) {
        struct termios tio;
        tcgetattr(fd, &tio);
        tio.c_lflag &= ~ECHO;
        tcsetattr(fd, TCSAFLUSH, &tio);
    }
} static void echoOn(int fd)
{
    if (isatty(fd)) {
        struct termios tio;
        tcgetattr(fd, &tio);
        tio.c_lflag |= ECHO;
        tcsetattr(fd, TCSAFLUSH, &tio);
    }
} char *S_GetPassword(char *prompt)
{
    FILE *in, *out;
    char buf[200];

in = fopen("/dev/tty", "r");
    out = fopen("/dev/tty", "w");
    echoOff(fileno(out));
    for (;;) {
        fprintf(out, prompt);
        fflush(out);
        buf[0] = 0;
        fgets(buf, sizeof(buf), in);
        fprintf(out, "\n");
        if (buf[0]) break;
    }
    echoOn(fileno(out));
    fclose(out);
    fclose(in);
    return strdup(buf);
}
``` sslrng.c

```
/*
** Copyright (c) 1995. Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "ssllb.h"
#include <sys/types.h>
#include <sys/time.h>
include <sys/stat.h> ifdef BSAFE
static B_ALGORITHM_METHOD *chooser[] = {
    &AM_MD5_RANDOM,
    0,
};
endif /*
** NOTE: because RSAREF doesn't export R_GenerateRandomBytes, we have to
** fake our own generator here. Use something based on MD5 that should
** be good enough. No analysis of the security of this generator has been
** done. No warranty expressed or implied, etc...
*/

/*
** Create a new random number generator.
** If no seed is passed in then it is "randomly" seeded.
** Few systems have good ways to do this so we try to get some
** external information besides just the time of day to use.
*/
RNGContext *RNG_CreateContext(char *pseed, int seedlen)
{
    RNGContext *cx;
    struct timeval now;
    struct timezone tz;
    int pid, ppid;
    struct stat is, dev, tmp;
#ifndef BSAFE
    unsigned statelen;
    R_DIGEST_CTX digest;
endif cx = (RNGContext*) calloc(1, sizeof(RNGContext));
ifdef BSAFE
    B_CreateAlgorithmObject(&cx->rng);
    B_SetAlgorithmInfo(cx->rng, AI_MD5Random, (POINTER)0);
    B_RandomInit(cx->rng, chooser, 0);
#else
    R_DigestInit(&digest, DA_MD5);
endif if( pseed ) {
ifdef BSAFE
        B_RandomUpdate(cx->rng, pseed, seedlen, 0);
#else
        R_DigestUpdate(&digest, pseed, seedlen);
        R_DigestFinal(&digest, cx->state, &statelen);
#endif
    } else {
        /* Get data for seeding the generator */
``` sslrng.c

```
        gettimeofday(&now, ...);
        pid = getpid();
        ppid = getppid();
        stat("/bin/ls", &ls);
        stat("/dev", &dev);
        stat("/tmp", &tmp);
#ifdef BSAFE
        B_RandomUpdate(cx->rng, (unsigned char*) &now, sizeof(now), 0);
        B_RandomUpdate(cx->rng, (unsigned char*) &pid, sizeof(pid), 0);
        B_RandomUpdate(cx->rng, (unsigned char*) &ppid, sizeof(ppid), 0);
        B_RandomUpdate(cx->rng, (unsigned char*) &ls, sizeof(ls), 0);
        B_RandomUpdate(cx->rng, (unsigned char*) &dev, sizeof(dev), 0);
        B_RandomUpdate(cx->rng, (unsigned char*) &tmp, sizeof(tmp), 0);
#else
        R_DigestUpdate(&digest, (unsigned char*) &now, sizeof(now));
        R_DigestUpdate(&digest, (unsigned char*) &pid, sizeof(pid));
        R_DigestUpdate(&digest, (unsigned char*) &ppid, sizeof(ppid));
        R_DigestUpdate(&digest, (unsigned char*) &ls, sizeof(ls));
        R_DigestUpdate(&digest, (unsigned char*) &dev, sizeof(dev));
        R_DigestUpdate(&digest, (unsigned char*) &tmp, sizeof(tmp));
        R_DigestFinal(&digest, cx->state, &statelen);
#endif
    } return cx;
} static void Inc(unsigned char *buf, int len)
{
    int carry = 0;

while (len) {
        if (*buf == 255) {
            carry = 1;
            *buf++ = 0;
            len--;
        } else {
            *buf = *buf + 1;
            break;
        }
    }
} void RNG_GenerateRandomBytes(RNGContext *cx, unsigned char *buf, unsigned len)
{
#ifdef BSAFE
    B_GenerateRandomBytes(cx->rng, buf, len, 0);
#else
    R_DIGEST_CTX digest;

while (len) {
        if (cx->streamlen == 0) {
            R_DigestInit(&digest, DA_MD5);
            R_DigestUpdate(&digest, cx->state, 16);
            R_DigestFinal(&digest, cx->stream, &cx->streamlen);

/* Increment state */
            Inc(cx->state, 16);
        }
        *buf++ = cx->stream[--cx->streamlen];
        len--;
    }
endif
} void RNG_DestroyContext(RNGContext *cx)
```

-134- sslrng.c

```
#ifdef BSAFE
    B_DestroyAlgorithmObject(&cx->rng);
#endif
    memset(cx, 0, sizeof(PNGContext));
    free(cx);
}
``` ssircmd.c

```
/*
 * Copyright (c) 1983, 1993, 1994
 *      The Regents of the University of California.  All rights reserved.
 *
 * Redistribution and use in source and binary forms, with or without
 * modification, are permitted provided that the following conditions
 * are met:
 * 1. Redistributions of source code must retain the above copyright
 *    notice, this list of conditions and the following disclaimer.
 * 2. Redistributions in binary form must reproduce the above copyright
 *    notice, this list of conditions and the following disclaimer in the
 *    documentation and/or other materials provided with the distribution.
 * 3. All advertising materials mentioning features or use of this software
 *    must display the following acknowledgement:
 *      This product includes software developed by the University of
 *      California, Berkeley and its contributors.
 * 4. Neither the name of the University nor the names of its contributors
 *    may be used to endorse or promote products derived from this software
 *    without specific prior written permission.
 *
 * THIS SOFTWARE IS PROVIDED BY THE REGENTS AND CONTRIBUTORS ``AS IS'' AND
 * ANY EXPRESS OR IMPLIED WARRANTIES, INCLUDING, BUT NOT LIMITED TO, THE
 * IMPLIED WARRANTIES OF MERCHANTABILITY AND FITNESS FOR A PARTICULAR PURPOSE
 * ARE DISCLAIMED.  IN NO EVENT SHALL THE REGENTS OR CONTRIBUTORS BE LIABLE
 * FOR ANY DIRECT, INDIRECT, INCIDENTAL, SPECIAL, EXEMPLARY, OR CONSEQUENTIAL
 * DAMAGES (INCLUDING, BUT NOT LIMITED TO, PROCUREMENT OF SUBSTITUTE GOODS
 * OR SERVICES; LOSS OF USE, DATA, OR PROFITS; OR BUSINESS INTERRUPTION)
 * HOWEVER CAUSED AND ON ANY THEORY OF LIABILITY, WHETHER IN CONTRACT, STRICT
 * LIABILITY, OR TORT (INCLUDING NEGLIGENCE OR OTHERWISE) ARISING IN ANY WAY
 * OUT OF THE USE OF THIS SOFTWARE, EVEN IF ADVISED OF THE POSSIBILITY OF
 * SUCH DAMAGE.
 */ if defined(LIBC_SCCS) && !defined(lint)
static char sccsid[] = "@(#)rcmd.c      8.3 (Berkeley) 3/26/94";
endif /* LIBC_SCCS and not lint */ include <sys/param.h>
include <sys/socket.h>
include <sys/stat.h> include <netinet/in.h>
include <arpa/inet.h> include <signal.h>
include <fcntl.h>
#include <netdb.h>
#include <unistd.h>
#include <pwd.h>
#include <errno.h>
#include <stdio.h>
#include <ctype.h>
#include <string.h>
#include "ssl.h"
#include "ssllib.h"
#ifdef sql
#include <bstring.h>
endif ifdef NO_STRERROR
char errbuf[10];

char *
strerror(int err)
{
        sprintf(errbuf, "%d", err);
        return(errbuf);
``` sslrcmd.c

```c
}
endif
extern int rresvport( int *port );

SSLHandle *
SSL_Rcmd(char **ahost,
         int rport,
         char *locuser,
         char *remuser,
         char *cmd,
         SSLHandle **h2p,
         int createflags)
{
    struct hostent *hp;
    struct sockaddr_in sin, from;
    fd_set reads;
    long oldmask;
    pid_t pid;
    int s, lport, timo;
    char c;
    SSLHandle *h, *h2, *h3;

pid = getpid();
    hp = gethostbyname(*ahost);
    if (hp == NULL) {
        fprintf(stderr, "rcmd:gethostbyname: %s\n", *ahost);
        return (0);
    }
    *ahost = hp->h_name;
    oldmask = sigblock(sigmask(SIGURG));
    for (timo = 1, lport = IPPORT_RESERVED - 1;;) {
        s = rresvport(&lport);
        if (s < 0) {
            if (errno == EAGAIN)
                (void)fprintf(stderr,
                              "rcmd: socket: All ports in use\n");
            else
                (void)fprintf(stderr, "rcmd: socket: %s\n",
                              strerror(errno));
            sigsetmask(oldmask);
            return (0);
        }
#ifdef __hpux
        ioctl(s, SIOCSPGRP, pid);
#else
        fcntl(s, F_SETOWN, pid);
#endif
        h = SSL_Create(s, createflags);
        sin.sin_family = hp->h_addrtype;
        memcpy(&sin.sin_addr, hp->h_addr_list[0], hp->h_length);
        sin.sin_port = rport;
        if (SSL_Connect(h, (struct sockaddr *)&sin, sizeof(sin)) >= 0)
            break;
        (void)close(s);
        if (errno == EADDRINUSE) {
            lport--;
            continue;
        }
        if (errno == ECONNREFUSED && timo <= 16) {
            (void)sleep(timo);
            timo *= 2;
            continue;
        }
        if (hp->h_addr_list[1] != NULL) {
            int oerrno = errno;

(void)fprintf(stderr, "connect to address %s: ",
``` sslrcmd.c

```
                    inet_ntoa(sin.sin_addr));
            errno = oerrno;
            perror(0);
            hp->h_addr_list++;
            memcpy(&sin.sin_addr, hp->h_addr_list[0], hp->h_length);
            (void)fprintf(stderr, "Trying %s...\n",
                    inet_ntoa(sin.sin_addr));
            continue;
        }
        (void)fprintf(stderr, "%s: %s\n", hp->h_name, strerror(errno));
        sigsetmask(oldmask);
        return (0);
    }
    if( SSL_Handshake(h, SSL_HANDSHAKE_AS_CLIENT) < 0 ) {
        perror("SSL_Rcmd:handshake failed");
        goto bad;
    }
    lport--;
    if (h2p == 0) {
        write(s, "", 1);
        lport = 0;
    } else {
        char num[8];
        int s2;
        int len = sizeof(from);
        struct sockaddr_in backsin;
        int sinlen;

s2 = rresvport(&lport);

if (s2 < 0)
            goto bad;

h2 = SSL_Create(s2, createflags);

/* XXX - send a bind message to sockd */ if ( ( h2->createFlags & SSL_PROXY_MASK ) != SSL_NO_PROXY ) {
            if ( SSL_Bind(h2, &backsin, sizeof(backsin),
                    sin.sin_addr.s_addr) < 0 ) {
                if ( !h2->socks->direct || errno != EINVAL ) {
                    perror("SSL_Rcmd:SSL_Bind()");
                    close(s2);
                    goto bad;
                }
            }
        }
        if( SSL_Getsockname(h2, (struct sockaddr *)&backsin, &sinlen) < 0) { perror("SSL_Rcmd:SSL_Getsockname()");
            close(s2);
            goto bad;
        }

SSL_Listen(h2, 1);
        (void)sprintf(num, "%u", ntohs(backsin.sin_port));
        if (SSL_Write(h, num, strlen(num)+1) != strlen(num)+1) {
            (void)fprintf(stderr,
                "rcmd: write (setting up stderr): %s\n",
                strerror(errno));
            (void)close(s2);
            goto bad;
        }
        FD_ZERO(&reads);
        FD_SET(s, &reads);
        FD_SET(s2, &reads);
        errno = 0;
```

-137- sslrcmd.c

```c
        if (select(32, &reads, 0, 0, 0) < 1 || !FD_ISSET(s2, &reads)) {
            if (errno != 0)
                (void)fprintf(stderr,
                    "rcmd: select (setting up stderr): %s\n",
                    strerror(errno));
            else
                (void)fprintf(stderr,
                    "select:1: protocol failure in circuit setup\n");
            (void)close(s2);
            goto bad;
        }
        h3 = SSL_Accept(h2, (struct sockaddr *)&from, &len);
        (void)close(s2);
        if (!h3) {
            (void)fprintf(stderr,
                "rcmd: accept: %s\n", strerror(errno));
            lport = 0;
            goto bad;
        }
        *h2p = h3;
        from.sin_port = ntohs((u_short)from.sin_port);
        if ( ( !h3->socks->direct ) &&
             (from.sin_family != AF_INET ||
              from.sin_port >= IPPORT_RESERVED ||
              from.sin_port < IPPORT_RESERVED / 2) ) {
            (void)fprintf(stderr,
                "socket:2: protocol failure in circuit setup.\n");
            goto bad2;
        }
        if( SSL_Handshake(h3, SSL_HANDSHAKE_AS_CLIENT) < 0 ) {
            perror("SSL_Rcmd:stderr handshake failed");
            goto bad2;
        }
    }
    (void)SSL_Write(h, locuser, strlen(locuser)+1);
    (void)SSL_Write(h, remuser, strlen(remuser)+1);
    (void)SSL_Write(h, cmd, strlen(cmd)+1);
    if (SSL_Read(h, &c, 1) != 1) {
        (void)fprintf(stderr,
            "rcmd: %s: %s\n", *ahost, strerror(errno));
        goto bad2;
    }
    if (c != 0) {
        while (SSL_Read(h, &c, 1) == 1) {
            (void)write(STDERR_FILENO, &c, 1);
            if (c == '\n')
                break;
        }
        goto bad2;
    }
    sigsetmask(oldmask);
    return (h);
bad2:
    if (lport)
        (void)close(h)->fd);
bad:
    (void)close(s);
    sigsetmask(oldmask);
    return (0);
}
``` sslpkcs5.c

```c
/*
** Copyright (c) 1995. Netscape Communications Corporation. All rights
** reserved. This use of this Secure Sockets Layer Reference
** Implementation (the "Software") is governed by the terms of the SSL
** Reference Implementation License Agreement. Please read the
** accompanying "License" file for a description of the rights granted.
** Any other third party materials you use with this Software may be
** subject to additional license restrictions from the licensors of such
** third party software and/or additional export restrictions. The SSL
** Implementation License Agreement grants you no rights to any such
** third party material.
*/
#include "ssllib.h"

struct PKCS5KeyStr {
    unsigned char key[8];
    unsigned char salt[8];
    unsigned char iv[8];
    int IterationCount;
};

/*
** Generate a DES key using PKCS5
*/
PKCS5Key *PKCS5_GenerateKey(char *pw, char *salt, int IterationCount)
{
    PKCS5Key *k;
    unsigned hashlen;
    unsigned char hash[16];
    MDContext *md;
    int i;

k = (PKCS5Key*) calloc(1, sizeof(PKCS5Key));
    k->IterationCount = IterationCount;
    memcpy(k->salt, salt, 8);

/* Generate key and iv as per PKCS5 */
    for (i = 0; i < IterationCount; i++) {
        md = MD_CreateContext(SSL_MD5);
        if (i == 0) {
            MD_Update(md, pw, strlen(pw));
            MD_Update(md, k->salt, sizeof(k->salt));
        } else {
            MD_Update(md, hash, hashlen);
        }
        MD_Final(md, hash, &hashlen);
        MD_DestroyContext(md);
    }
    memcpy(k->key, hash, sizeof(k->key));
    memcpy(k->iv, hash+8, sizeof(k->iv));

return k;
} void PKCS5_DestroyKey(PKCS5Key *key)
{
    memset(key, 0, sizeof(PKCS5Key));
    free(key);
}

/*
** Encrypt a block of data using PKCS5 style encryption
*/
void PKCS5_Encrypt(PKCS5Key *key, unsigned char *out, unsigned *outlen,
                   unsigned char *in, unsigned inlen)
{
    DESContext *des;
```

-140- sslpkcs5.c

```
    unsigned part;
    unsigned char final[8];

*outlen = ((inlen + 8) >> 3) << 3;

des = DES_CreateContext(key->key, key->iv, 1);
    while (inlen >= 8) {
        DES_Encrypt(des, out, &part, in, 8);
        in += 8;
        out += 8;
        inlen -= 8;
    }
    memcpy(final, in, inlen);
    memset(final+inlen, 8-inlen, 8-inlen);
    DES_Encrypt(des, out, &part, final, 8);
    DES_DestroyContext(des);
}

/*
** Decrypt a block of data using PKCS5 style encryption
*/
void PKCS5_Decrypt(PKCS5Key *key, unsigned char *out, unsigned *outlen,
                   unsigned char *in, unsigned inlen)
{
    DESContext *des;
    unsigned padding, part;

des = DES_CreateContext(key->key, key->iv, 0);
    DES_Decrypt(des, out, &part, in, inlen);
    DES_DestroyContext(des);

padding = out[part-1];
    *outlen = inlen - padding;
}

/*
** Generate DER encoded key information
*/
void PKCS5_Encode(PKCS5Key *key, unsigned char **bufp, unsigned *lenp)
{
    unsigned char *salt, *ic;
    unsigned saltlen, iclen;

DER_EncodeStr(&salt, &saltlen, DER_OCTET_STRING, key->salt, 8);
    DER_EncodeInt(&ic, &iclen, DER_INTEGER, key->iterationCount);
    DER_EncodeSeq(bufp, lenp, 0, salt, saltlen, ic, iclen, 0, 0);

free(salt);
    free(ic);
}
```

-141- sslsocks.c

```c
#include "ssl.h"
#include "ssllib.h"
#include <netdb.h>
#include <sys/socket.h>
#include <errno.h>

/*
 * SOCKS defaults
 */
#define SOCKS_FILE      "/etc/socks.conf"
#define DEF_SOCKD_PORT  1080

/*
 * SOCKS protocol defines
 */
define SOCKS_VERSION    4 define SOCKS_CONNECT    1
define SOCKS_BIND       2 define SOCKS_RESULT     90
define SOCKS_FAIL       91
#define SOCKS_NO_IDENTD  92 /* Failed to connect to Identd on client machine */
#define SOCKS_BAD_ID     93 /* Client's Identd reported a different user-id */

/*
 * Make an IP address
 */
#define MAKE_IN_ADDR(a,b,c,d) \
    htonl(((a) << 24) | ((b) << 16) | ((c) << 8) | (d))

/*
 * This structure describes an entry from the SOCKS configuration file.
 */
typedef struct SocksConfItemStr SocksConfItem;

struct SocksConfItemStr {
    char direct;
    unsigned long daddr;
    unsigned long dmask;
    int op;
    unsigned short port;
    SocksConfItem *next;
};

/* Values for op, used when parsing the port field of the conf file */
#define OP_LESS      1
#define OP_EQUAL     2
#define OP_LEQUAL    3
#define OP_GREATER   4
#define OP_NOTEQUAL  5
#define OP_GEQUAL    6
define OP_ALWAYS    7 static unsigned long ourHost;
/* the list of all entries from the SOCKS config file */
static SocksConfItem *ssl_socks_confs;

int
ssl_CreateSocksInfo(SSLHandle *h)
{
    SSLSocksInfo *si;

if (h->socks) {
        /* Already been done */
```

-142- ssisocks.c

```c
        return 0;
    }
    si = (SSLSocksInfo*) calloc(1,sizeof(SSLSocksInfo));
    if (si) {
        h->socks = si;
        if ( ( h->createFlags & SSL_PROXY_MASK ) == SSL_NO_PROXY )
            si->direct = 1;
        }
        return 0;
    }
    return -1;
} int
ssl_CopySocksInfo(SSLHandle *h, SSLHandle *oh)
{
    int rv;

#ifdef __cplusplus
    oh = oh;
#endif
    rv = ssl_CreateSocksInfo(h);

if ( rv < 0 ) {
        return(rv);
    } memcpy(h->socks, oh->socks, sizeof(SSLSocksInfo));

return rv;
}
void
ssl_DestroySocksInfo(SSLSocksInfo *si)
{
    if (si) {
        free(si);
    }
} static int
GetOurHost(void)
{
    char name[100];
    struct hostent *hp;

gethostname(name, sizeof(name));
    hp = gethostbyname(name);
    if (hp) {
        ourHost = *(unsigned long *)hp->h_addr;
    } else {
        /* Total lossage! */
        return -1;
    }
    return 0;
}

/*
** Setup default SocksConfItem list so that loopback is direct, things in the
** same subnet (?) address are direct, everything else uses sockd
*/
static void
BuildDefaultConfList(void)
{
    SocksConfItem *ci;
    SocksConfItem **lp;
``` sslsocks.c

```c
/* Put loopback onto direct list */
lp = &ssl_socks_confs;
cl = (SocksConfItem*) calloc(1,sizeof(SocksConfItem));
if (!cl) {
    return;
}
cl->direct = 1;
cl->daddr = MAKE_IN_ADDR(127,0,0,1);
cl->dmask = MAKE_IN_ADDR(255,255,255,255);
cl->op = OP_ALWAYS;
*lp = cl;
lp = &cl->next;

/* Put our hosts's subnet onto direct list */
cl = (SocksConfItem*) calloc(1,sizeof(SocksConfItem));
if (!cl) {
    return;
}
cl->direct = 1;
cl->daddr = htonl((ntohl(ourHost) & ~0xff) | 0xff);
cl->dmask = MAKE_IN_ADDR(255,255,255,0);
cl->op = OP_ALWAYS;
*lp = cl;
lp = &cl->next;

/* Everything else goes to sockd */
cl = (SocksConfItem*) calloc(1,sizeof(SocksConfItem));
if (!cl) {
    return;
}
cl->daddr = MAKE_IN_ADDR(255,255,255,255);
cl->op = OP_ALWAYS;
*lp = cl;
}

/*
 * Break up a line of the conf file into white-space seperated words
 */
static int
FragmentLine(char *cp, char **argv, int maxargc)
{
    int argc = 0;
    char *save;
    char ch;

save = cp;
    for (; (ch = *cp) != 0; cp++) {
        if ((ch == '#') || (ch == '\n')) {
            /* Done */
            break;
        }
        if (ch == ':') {
            break;
        }
        if ((ch == ' ') || (ch == '\t')) {
            /* Seperator, see if it seperated anything */
            if (cp - save > 0) {
                /* Put a null at the end of the word */
                *cp = 0;
                argc++;
                *argv++ = save;
                if (argc == maxargc) {
                    return argc;
                }
            }
            save = cp + 1;
        }
``` sslsocks.c

```
        }
    }
    if (cp - save > 0) {
        *cp = 0;
        argc++;
        *argv = save;
    }
    return argc;
}

/*
 * convert the next element of an inet address string to an integer
 */
/* XXX inet_addr? */
static char *
ConvertOne(char *cp, unsigned char *rvp)
{
    char *s = strchr(cp, '.');
    if (s) {
        *s = 0;
    }
    *rvp = atoi(cp) & 0xff;
    return s ? s+1 : cp;
}

/*
 * Convert an ascii string inet address into an integer representation
 */
static unsigned long
ConvertAddr(char *buf)
{
    unsigned char b0, b1, b2, b3;
    unsigned long addr;

buf = ConvertOne(buf, &b0);
    buf = ConvertOne(buf, &b1);
    buf = ConvertOne(buf, &b2);
    buf = ConvertOne(buf, &b3);
    addr = (b0 << 24) | (b1 << 16) | (b2 << 8) | b3;
    return htonl(addr);
}

/*
 * Read the SOCKS configuration file
 */
static int
ReadConfFile(void)
{
    int rv;

rv = GetOurHost();
    if (rv < 0) {
        /* If we can't figure out our host id, use socks. Loser! */
        return -1;
    }

{
        SocksConfItem *cl;
        SocksConfItem **lp;
        FILE *fp;
        char *file = SOCKS_FILE;
        int op, direct, port, lineNumber = 0;

fp = fopen(file, "r");
        if (!fp) {
            BuildDefaultConfList();
            return 0;
```

-145- sslsocks.c

```
/* Parse config file and generate config item list */
lp = &ssl_socks_confs;
for (;;) {
    char buf[1000];
    char *s, *argv[10];
    int argc;

s = fgets(buf, sizeof(buf), fp);
    if (!s) {
        break;
    }
    lineNumber++;
    argc = FragmentLine(buf, argv, 10);
    if (argc < 3) {
        if (argc == 0) {
            /* must be a comment/empty line */
            continue;
        }
        fprintf(stderr, "%s:%d: bad config line\n",
                file, lineNumber);
        continue;
    }
    if (strcmp(argv[0], "direct") == 0) {
        direct = 1;
    } else if (strcmp(argv[0], "sockd") == 0) {
        direct = 0;
    } else {
        fprintf(stderr, "%s:%d: bad command: \"%s\"\n",
                file, lineNumber, argv[0]);
        continue;
    }

/* Look for port spec */
    op = OP_ALWAYS;
    if (argc > 4) {
        if (strcmp(argv[3], "lt") == 0) {
            op = OP_LESS;
        } else if (strcmp(argv[3], "eq") == 0) {
            op = OP_EQUAL;
        } else if (strcmp(argv[3], "le") == 0) {
            op = OP_LEQUAL;
        } else if (strcmp(argv[3], "gt") == 0) {
            op = OP_GREATER;
        } else if (strcmp(argv[3], "neq") == 0) {
            op = OP_NOTEQUAL;
        } else if (strcmp(argv[3], "ge") == 0) {
            op = OP_GEQUAL;
        } else {
            fprintf(stderr, "%s:%d: bad comparison op: \"%s\"\n",
                    file, lineNumber, argv[3]);
            continue;
        }
        port = atoi(argv[4]);
    } ci = (SocksConfItem*) calloc(1, sizeof(SocksConfItem));
    if (!ci) {
        break;
    }
    ci->direct = direct;
    ci->daddr = ConvertAddr(argv[1]);
    ci->dmask = ConvertAddr(argv[2]);
    ci->op = op;
    ci->port = port;
    *lp = ci;
``` sslsocks.c

```c
        lp = &ci->next;
    }
    if (!ssl_socks_confs) {
        /* Empty file. Fix it for the user */
        BuildDefaultConfList();
    }
    return 0;
}
/* XXX - why do we need the handle??? */
static int
ChooseAddress(SSLHandle *h, struct sockaddr_in *direct)
{
    unsigned long dstAddr;
    unsigned short dstPort;
    SocksConfItem *ci;
    int rv;

if (!ssl_socks_confs) {
        rv = ReadConfFile();
        if (rv) {
            return rv;
        }
    }

/*
    ** Scan socks config info and look for a direct match or a force to
    ** use the sockd. Bail on first hit.
    */
    dstAddr = direct->sin_addr.s_addr;
    dstPort = ntohs(direct->sin_port);
    ci = ssl_socks_confs;
    while (ci) {
        if ((ci->daddr & ci->dmask) == (dstAddr & ci->dmask)) {
            int portMatch;
            switch (ci->op) {
                case OP_LESS:     portMatch = dstPort < ci->port; break;
                case OP_EQUAL:    portMatch = dstPort == ci->port; break;
                case OP_LEQUAL:   portMatch = dstPort <= ci->port; break;
                case OP_GREATER:  portMatch = dstPort > ci->port; break;
                case OP_NOTEQUAL: portMatch = dstPort != ci->port; break;
                case OP_GEQUAL:   portMatch = dstPort >= ci->port; break;
                case OP_ALWAYS:   portMatch = 1; break;
            }
            if (portMatch) {
                return ci->direct;
            }
        }
        ci = ci->next;
    }
    return 0;
}

/*
** Find port # and host # of socks daemon. Use info in h->socks struct
** when valid. If not valid, try to figure it all out.
*/
static int
FindDaemon(SSLHandle *h, struct sockaddr_in *our)
{
    SSLSocksInfo *si;
    unsigned short port;
    unsigned long host;
    struct hostent *hent;
    char *hostname;
```

-147- sslsocks.c

```
si = h->socks;

/* For now, assume we are using the socks daemon */
host = si->sockdHost;
port = si->sockdPort;
if (!port) {
    static char firstTime = 1;
    static unsigned short sockdPort;

if (firstTime) {
        struct servent *sp;

firstTime = 0;
        sp = getservbyname("socks", "tcp");
        if (sp) {
            sockdPort = sp->s_port;
        }
    }
    port = sockdPort;
}
if (!port) {
    port = DEF_SOCKD_PORT;
}
if (host == 0) {
    if ( hostname = getenv( "SOCKS_HOST" ) ) {
        hent = gethostbyname(hostname);
        if ( hent ) {
            host = *(unsigned long *)hent->h_addr_list[0];
        } else {
            errno = EINVAL;
            return -1;
        }
    } else {
        /* XXX - is there a better way? */
        errno = EINVAL;
        return -1;
    }
}

/* We know the ip addr of the socks server */
out->sin_family = AF_INET;
out->sin_port = htons(port);
out->sin_addr.s_addr = host;

return 0;
}
/*
** Send our desired address and our user name to the socks daemon.
*/
static int
SayHello(SSLHandle *h, int cmd, struct sockaddr_in *sa, char *user)
{
    int rv, len;
    unsigned char msg[8];
    unsigned short port;
    unsigned long host;

/* Send dst message to sockd */
    port = sa->sin_port;
    host = sa->sin_addr.s_addr;
    msg[0] = SOCKS_VERSION;
    msg[1] = cmd;
    memcpy(msg+2, &port, 2);
    memcpy(msg+4, &host, 4);
```

-148- sslsocks.c

```
    rv = S_Write(h->fd, msg, sizeof(msg));
    if (rv < 0) {
        goto io_error;
    }

/* Send src-user message to sockd */
    len = strlen(user)+1;
    rv = S_Write(h->fd, user, len);
    if (rv < 0) {
        goto io_error;
    }
    return 0;

io_error:
    return -1;
} static int
GetDst(SSLHandle *h)
{
    unsigned char msg[8], cmd;

S_Read(h->fd, msg, sizeof(msg));
    cmd = msg[1];
    memcpy(&h->socks->destPort, msg+2, 2);
    memcpy(&h->socks->destHost, msg+4, 4);

/* Check status back from sockd */
    switch (cmd) {
        case SOCKS_FAIL:
        case SOCKS_NO_IDENTD:
        case SOCKS_BAD_ID:
            /* XXX - is there a better way? */
            errno = ECONNREFUSED;
            return -1;

default:
            break;
    } return 0;
}

/* BSDI ain't got no cuserid() */
#ifdef __386BSD__
#include <pwd.h>
char *bsdi_cuserid(char *b)
{
    struct passwd *pw = getpwuid(getuid());

if (!b) return pw ? pw->pw_name : NULL;

if (!pw || !pw->pw_name)
        b[0] = '\0';
    else
        strcpy(b, pw->pw_name);
    return b;
}
endif int
SSL_Connect(SSLHandle *h, const void *sa, int salen)
{
    int rv, err, direct;
    struct sockaddr_in daemon, *sip;
    char *user;
``` sslsocks.c

```c
#ifdef __cplusplus
    salen = salen;
#endif
    switch( h->createFlags & SSL_PROXY_MASK ) {
        case SSL_NO_PROXY:
            /* direct connect */
            direct = 1;
            break;
        case SSL_PROXY:
            /* do we talk to sockd? */
            direct = ChooseAddress(h, (struct sockaddr_in*)sa);
            break;
        case SSL_SECURE_PROXY:
            /* talk to ssld */
            break;
        default:
            break;
    } if (direct) {
        sip = (struct sockaddr_in*) sa;
        h->socks->direct = 1;
    } else {
        /* Figure out where the sockd is */
        rv = FindDaemon(h, &daemon);
        if (rv) {
            return -1;
        }
        sip = &daemon;
        h->socks->direct = 0;
    }

/* Attempt first connection */
    rv = connect(h->fd, (struct sockaddr*)sip, sizeof(*sip));
    if (rv < 0) {
        return rv;
    }

/* If talking to sockd, do handshake */
    if (!direct) {
        /* Find user */
#ifdef __386BSD__
        user = bsdi_cuserid(0);
#else
        user = cuserid(0);
#endif
        if (!user) {
            errno = EINVAL;
            return -1;
        }

/* Send our message to it */
        rv = SayHello(h, SOCKS_CONNECT, (struct sockaddr_in*) sa, user);
        if (rv) {
            return rv;
        }

/* Get the reply */
        rv = GetDst(h);
        if (rv) {
            return rv;
        }
    }
    return 0;
``` sslsocks.c

```c
} int
SSL_Bind(SSLHandle *h, const void *sa, int salen, long dsthost)
{
    SSLSocksInfo *si;
    int rv, direct;
    struct sockaddr_in daemon;
    char *user;
    struct sockaddr_in dst;

dst.sin_family = AF_INET;
    dst.sin_addr.s_addr = dsthost;
    dst.sin_port = 0;

si = h->socks;

if ( ( h->createFlags & SSL_PROXY_MASK ) == SSL_PROXY ) {
        /* Figure out where to connect to */
        rv = FindDaemon(h, &daemon);
        if (rv) {
            return -1;
        }
        direct = ChooseAddress(h, &dst);
    } else {
        /* don't even try socks proxy */
        direct = 1;
    } if (direct) {
        h->socks->direct = 1;
        rv = bind(h->fd, (struct sockaddr*) sa, salen);
        memcpy(&h->socks->bindAddr, sa, sizeof(struct sockaddr_in));
    } else {
        h->socks->direct = 0;

/* First connect to socks daemon. ASYNC connects must be disabled! */
        rv = connect(h->fd, (struct sockaddr*)&daemon, sizeof(daemon));
        if (rv < 0) {
            return rv;
        }

/* Find user */
#ifdef __386BSD__
        user = bsdi_cuserid(0);
#else
        user = cuserid(0);
#endif
        if (!user) {
            errno = EINVAL;
            return -1;
        }

/* Send message to sockd */
        rv = SayHello(h, SOCKS_BIND, &dst, user);
        if (rv) {
            return rv;
        }

/* Gather up bind response from sockd */
        rv = GetDst(h);

if (rv == 0) {
            /* Done */
            si->bindAddr.sin_family = AF_INET;
            si->bindAddr.sin_port = si->destPort;
            if (ntohl(si->destHost) == INADDR_ANY)
``` sslsocks.c

```
                si->bindAddr.sin_addr.s_addr = daemon.sin_addr.s_addr;
        } else {
                si->bindAddr.sin_addr.s_addr = si->destHost;
        } si->didBind = 1;
        return rv;
}

SSLHandle *
SSL_dup(SSLHandle *h, int fd)
{
    SSLHandle *nh;

/* Dup the descriptor and return it */

/* Dup the socket structure */
    nh = ssl_NewHandle(fd, h->createFlags);
    ssl_CopySocksInfo(nh, h);
    if (!nh->socks) {
        close(fd);
        return 0;
    } return nh;
}

SSLHandle *
SSL_Accept(SSLHandle *h, void *addr, int *addrlenp)
{
    SSLHandle *nh;
    SSLSocksInfo *si;
    int rv;

si = h->socks;

if ( addr && ( *addrlenp < sizeof(struct sockaddr_in))) {
        errno = EINVAL;
        return 0;
    } if (!si->didBind || si->direct) {
        /*
        ** If we didn't do the bind yet this call will generate an error
        ** from the OS. If we did do the bind then we must be direct and
        ** let the OS do the accept.
        */
        rv = accept(h->fd, (struct sockaddr*) addr, addrlenp);
        if (rv < 0) {
            return 0;
        }
    } else {
        /* Get next accept response from server */
        rv = GetDst(h);
        if (rv) {
            return 0;
        }

/* Handshake finished. Give dest address back to caller */
        ((struct sockaddr_in*)addr)->sin_family = AF_INET;
        ((struct sockaddr_in*)addr)->sin_port = si->destPort;
        ((struct sockaddr_in*)addr)->sin_addr.s_addr = si->destHost;

/* now dup the socket */
        rv = dup(h->fd);
        if ( rv < 0 ) {
``` sslsocks.c

```
        return 0;
    }
} nh = SSL_dup(h, rv);

return nh;
} int
SSL_Listen(SSLHandle *h, int backlog)
{
    int rv;

if (h->socks->direct) {
        return(listen(h->fd, backlog));
    }
    return 0;
} int
SSL_Getsockname(SSLHandle *h, void *name, int *namelenp)
{
    int rv;

if (!h->socks->didBind || h->socks->direct) {
        return(getsockname(h->fd, (struct sockaddr *)name, namelenp));
    } if (*namelenp < sizeof(struct sockaddr_in)) {
        errno = EINVAL;
        return -1;
    }
    *namelenp = sizeof(struct sockaddr_in);
    memcpy(name, &h->socks->bindAddr, sizeof(struct sockaddr_in));

return 0;
} int
SSL_HandleToFD(SSLHandle *h)
{
    return(h->fd);
}
``` ssix509.c

```
/*
** Copyright (c) 1995. Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
#include "ssl.h"
#include "ssllib.h"

static unsigned char md2_alg[] = {
    0x30, 0x0d, 0x06, 0x09, 0x2a, 0x86, 0x48, 0x86,
    0xf7, 0x0d, 0x01, 0x01, 0x02, 0x05, 0x00,
};

static unsigned char md5_alg[] = {
    0x30, 0x0d, 0x06, 0x09, 0x2a, 0x86, 0x48, 0x86,
    0xf7, 0x0d, 0x01, 0x01, 0x04, 0x05, 0x00,
};

static unsigned char netscape_testca_name[] = {
    0x31, 0x0b, 0x30, 0x09, 0x06, 0x03, 0x55, 0x04,
    0x06, 0x13, 0x02, 0x55, 0x53, 0x31, 0x10, 0x30,
    0x0e, 0x06, 0x03, 0x55, 0x04, 0x0b, 0x13, 0x07,
    0x54, 0x65, 0x73, 0x74, 0x20, 0x43, 0x41, 0x31,
    0x26, 0x30, 0x24, 0x06, 0x03, 0x55, 0x04, 0x0a,
    0x13, 0x1d, 0x4e, 0x65, 0x74, 0x73, 0x63, 0x61,
    0x70, 0x65, 0x20, 0x43, 0x6f, 0x6d, 0x6d, 0x75,
    0x6e, 0x69, 0x63, 0x61, 0x74, 0x69, 0x6f, 0x6e,
    0x73, 0x20, 0x43, 0x6f, 0x72, 0x70, 0x2e,
};

static unsigned char netscape_testca_n[] = {
    0xb4, 0x6c, 0x8a, 0xec, 0xba, 0x18, 0x7b,
    0x72, 0xa1, 0x3c, 0xcb, 0xe9, 0x81, 0x15, 0x2d,
    0xdf, 0x9b, 0xb2, 0x82, 0x5b, 0x13, 0x50, 0x02,
    0x2a, 0xfe, 0x7c, 0x51, 0x07, 0xe6, 0x14, 0xc3,
    0x60, 0xad, 0x15, 0x56, 0xde, 0xf0, 0xa7, 0x32,
    0xc1, 0xa0, 0x34, 0x95, 0xa3, 0x6a, 0x4e, 0xbf,
    0x21, 0x48, 0x4a, 0x4a, 0x21, 0x7d, 0x6b, 0x37,
    0x12, 0x59, 0x8a, 0xb8, 0xc9, 0x65, 0xff, 0xa7,
    0x45, 0xa0, 0x16, 0xb7, 0xe1, 0xb8, 0xcb, 0x52,
    0x0e, 0x16, 0xbd, 0xe0, 0x16, 0xdd, 0xdd, 0xa7,
    0x36, 0x67, 0x3e, 0x09, 0xb9, 0xdb, 0x33, 0xbd,
    0x74, 0xfc, 0xde, 0x58, 0x94, 0xcf, 0x28, 0xb3,
    0x96, 0xd5, 0x8e, 0x33, 0x61, 0x1f, 0xcb, 0x40,
    0x3f, 0x2a, 0x29, 0x2d, 0x0b, 0x68, 0x87, 0x15,
    0x68, 0xfd, 0x09, 0x00, 0xe0, 0x77, 0x4e, 0xd2,
    0x40, 0x1a, 0x1e, 0x5f, 0x9c, 0xd3, 0xcc, 0x16,
    0x63,
};

static unsigned char netscape_testca_e[] = {
    0x03,
};

static unsigned char rsa_secure_server_ca_name[] = {
    0x31, 0x0b, 0x30, 0x09, 0x06, 0x03, 0x55, 0x04,
    0x06, 0x13, 0x02, 0x55, 0x53, 0x31, 0x20, 0x30,
    0x1e, 0x06, 0x03, 0x55, 0x04, 0x0a, 0x13, 0x17,
    0x52, 0x53, 0x41, 0x20, 0x44, 0x61, 0x74, 0x61,
    0x20, 0x53, 0x65, 0x63, 0x75, 0x72, 0x69, 0x74,
``` ssix509.c

```
      0x79, 0x2c, 0x20, 0x49, 0x6e, 0x63, 0x2e, 0x31,
      0x2e, 0x30, 0x2c, 0x06, 0x03, 0x55, 0x04, 0x0b,
      0x13, 0x25, 0x53, 0x65, 0x63, 0x75, 0x72, 0x65,
      0x20, 0x53, 0x65, 0x72, 0x76, 0x65, 0x72, 0x20,
      0x43, 0x65, 0x72, 0x74, 0x69, 0x66, 0x69, 0x63,
      0x61, 0x74, 0x69, 0x6f, 0x6e, 0x20, 0x41, 0x75,
      0x74, 0x68, 0x6f, 0x72, 0x69, 0x74, 0x79,
};

static unsigned char rsa_secure_server_ca_n[] = {
      0x92, 0xce, 0x7a, 0xc1, 0xae, 0x83, 0x3e,
      0x5a, 0xaa, 0x89, 0x83, 0x57, 0xac, 0x25, 0x01,
      0x76, 0x0c, 0xad, 0xae, 0x8e, 0x2c, 0x37, 0xce,
      0xeb, 0x35, 0x78, 0x64, 0x54, 0x03, 0xe5, 0x84,
      0x40, 0x51, 0xc9, 0xbf, 0x8f, 0x08, 0xe2, 0x8a,
      0x82, 0x08, 0xd2, 0x16, 0x86, 0x37, 0x55, 0xe9,
      0xb1, 0x21, 0x02, 0xad, 0x76, 0x68, 0x81, 0x9a,
      0x05, 0xa2, 0x4b, 0xc9, 0x4b, 0x25, 0x66, 0x22,
      0x56, 0x6c, 0x88, 0x07, 0x8f, 0xf7, 0x81, 0x59,
      0x6d, 0x84, 0x07, 0x65, 0x70, 0x13, 0x71, 0x76,
      0x3e, 0x9b, 0x77, 0x4c, 0xe3, 0x50, 0x89, 0x56,
      0x98, 0x48, 0xb9, 0x1d, 0xa7, 0x29, 0x1a, 0x13,
      0x2e, 0x4a, 0x11, 0x59, 0x9c, 0x1e, 0x15, 0xd5,
      0x49, 0x54, 0x2c, 0x73, 0x3a, 0x69, 0x82, 0xb1,
      0x97, 0x39, 0x9c, 0x6d, 0x70, 0x67, 0x48, 0xe5,
      0xdd, 0x2d, 0x06, 0xc8, 0x1e, 0x7b
};

static unsigned char rsa_secure_server_ca_e[] = {
      0x01, 0x00, 0x01
};

static RSAPublicKey *netscape_testca_key;
static RSAPublicKey *rsa_secure_server_ca_key;

/**********************************************************************/ ifndef BSAFE
static void ZeroFill(unsigned char *dest, int destlen,
                     unsigned char const *src, int srclen)
{
    memset(dest, 0, destlen);
    memcpy(dest + destlen - srclen, src, srclen);
}
endif RSAPublicKey *CreatePublicKey(unsigned char const *n, unsigned nlen,
                              unsigned char const *e, unsigned elen)
{
    RSAPublicKey *key;
#ifdef BSAFE
    A_RSA_KEY ki;
    int rv;
endif /* BSAFE */ key = (RSAPublicKey*) calloc(1, sizeof(RSAPublicKey));
ifdef BSAFE
    ki.modulus.data = (unsigned char*) n;
    ki.modulus.len = nlen;
    ki.exponent.data = (unsigned char*) e;
    ki.exponent.len = elen;
    B_CreateKeyObject(&key->key);
    rv = B_SetKeyInfo(key->key, KI_RSAPublic, (POINTER)&ki);
    if (rv) {
        SSL_SetError(rv);
        B_DestroyKeyObject(&key->key);
        free(key);
``` ssix509.c

```c
        return 0;
#else   /* !BSAFE */
    key->key.bits = nlen * 8;
    ZeroFill(&key->key.modulus[0], MAX_RSA_MODULUS_LEN, n, nlen);
    ZeroFill(&key->key.exponent[0], MAX_RSA_MODULUS_LEN, e, elen);
endif  /* BSAFE */ return key;
} static int SetupIssuers(void)
{
    netscape_testca_key =
        CreatePublicKey(netscape_testca_n, sizeof(netscape_testca_n),
                        netscape_testca_e, sizeof(netscape_testca_e));
    rsa_secure_server_ca_key =
        CreatePublicKey(rsa_secure_server_ca_n, sizeof(rsa_secure_server_ca_n),
                        rsa_secure_server_ca_e, sizeof(rsa_secure_server_ca_e));
} static int GetLength(unsigned char const *p, int *lenlen)
{
    switch (p[0]) {
      case 0x81:
        *lenlen = 2;
        return p[1];
      case 0x82:
        *lenlen = 3;
        return COMBINE(p+1);
      default:
        break;
    }
    *lenlen = 1;
    return p[0];
} static int Skip(unsigned char const **bodyp, int *bodylenp, unsigned char e)
{
    unsigned char const *body = *bodyp;
    int len, ll, bodylen = *bodylenp;

if (body[0] != e) return SSL_SetError(SSL_ERROR_BAD_CERT);
    len = GetLength(&body[1], &ll);
    if (len < 0) return SSL_SetError(SSL_ERROR_BAD_CERT);
    body = body + 1 + ll + len;
    bodylen = bodylen - 1 - ll - len;
    if (bodylen < 0) return SSL_SetError(SSL_ERROR_BAD_CERT);
    *bodyp = body;
    *bodylenp = bodylen;
    return 0;
} static RSAPublicKey *FindIssuer(unsigned char const *body, int bodylen)
{
    unsigned char const *issuer;
    int len, ll;
    static int firsttime = 1;

if (firsttime) {
        if (SetupIssuers() < 0) {
            return 0;
        }
        firsttime = 0;
    }

/* Get to issuer */
``` sslx509.c

```
if (body[0] != 0x30) {
    SSL_SetError(SSL_ERROR_BAD_CERT);
    return 0;
}
len = GetLength(&body[1], &ll);
if (len < 0) {
    SSL_SetError(SSL_ERROR_BAD_CERT);
    return 0;
} body = body + 1 + ll;
bodylen = bodylen - 1 - ll;
if (bodylen < 0) {
    SSL_SetError(SSL_ERROR_BAD_CERT);
    return 0;
} if (Skip(&body, &bodylen, 0x02)) {      /* sn */
    SSL_SetError(SSL_ERROR_BAD_CERT);
    return 0;
} if (Skip(&body, &bodylen, 0x30)) {      /* sig alg */
    SSL_SetError(SSL_ERROR_BAD_CERT);
    return 0;
} if (body[0] != 0x30) {
    SSL_SetError(SSL_ERROR_BAD_CERT);
    return 0;
} len = GetLength(&body[1], &ll);
if (len < 0) {
    SSL_SetError(SSL_ERROR_BAD_CERT);
    return 0;
}
issuer = body + 1 + ll;
bodylen = bodylen - 1 - ll - len;
if (bodylen < 0) {
    SSL_SetError(SSL_ERROR_BAD_CERT);
    return 0;
}

/* Now see if we have heard of it */
if ((len == sizeof(netscape_testca_name)) &&
    (memcmp(issuer, netscape_testca_name, len) == 0)) {
    return netscape_testca_key;
} if ((len == sizeof(rsa_secure_server_ca_name)) &&
    (memcmp(issuer, rsa_secure_server_ca_name, len) == 0)) {
    return rsa_secure_server_ca_key;
}
SSL_SetError(SSL_ERROR_BAD_CERT);
return 0;
} static RSAPublicKey *ExtractPublicKey(unsigned char const *body, int bodylen)
{
    int len, ll, baselen, bslen, nlen, elen;
    unsigned char const *base, *n, *e;
    RSAPublicKey *pubKey;

/* Get to public-key */
    if (body[0] != 0x30) {
        SSL_SetError(SSL_ERROR_BAD_CERT);
        return 0;
    } len = GetLength(&body[1], &ll);
    if (len < 0) {
        SSL_SetError(SSL_ERROR_BAD_CERT);
        return 0;
    }
``` sslx509.c

```
}
body = body + 1 + 11;
bodylen = bodylen - 1 - 11;
if (bodylen < 0) {
    SSL_SetError(SSL_ERROR_BAD_CERT);
    return 0;
}
if (Skip(&body, &bodylen, 0x02)) {        /* sn */
    SSL_SetError(SSL_ERROR_BAD_CERT);
    return 0;
}
if (Skip(&body, &bodylen, 0x30)) {        /* sig alg */
    SSL_SetError(SSL_ERROR_BAD_CERT);
    return 0;
}
if (Skip(&body, &bodylen, 0x30)) {        /* issuer */
    SSL_SetError(SSL_ERROR_BAD_CERT);
    return 0;
}
if (Skip(&body, &bodylen, 0x30)) {        /* validity */
    SSL_SetError(SSL_ERROR_BAD_CERT);
    return 0;
}
if (Skip(&body, &bodylen, 0x30)) {        /* subject */
    SSL_SetError(SSL_ERROR_BAD_CERT);
    return 0;
}
if (body[0] != 0x30) {
    SSL_SetError(SSL_ERROR_BAD_CERT);
    return 0;
}
baselen = GetLength(&body[1], &11);
if (baselen < 0) {
    SSL_SetError(SSL_ERROR_BAD_CERT);
    return 0;
}
base = body + 1 + 11;
bodylen = bodylen - 1 - 11 - baselen;
if (bodylen < 0) {
    SSL_SetError(SSL_ERROR_BAD_CERT);
    return 0;
}
if (Skip(&base, &baselen, 0x30)) {        /* alg info */
    SSL_SetError(SSL_ERROR_BAD_CERT);
    return 0;
}
if (base[0] != 0x03) {
    SSL_SetError(SSL_ERROR_BAD_CERT);
    return 0;
}
bslen = GetLength(&base[1], &11);
if (bslen < 0) {
    SSL_SetError(SSL_ERROR_BAD_CERT);
    return 0;
}
base = base + 1 + 11;
if (base[0] != 0x00) {
    SSL_SetError(SSL_ERROR_BAD_CERT);
    return 0;
}
base++;
bslen--;
if (base[0] != 0x30) {
    SSL_SetError(SSL_ERROR_BAD_CERT);
    return 0;
}
len = GetLength(&body[1], &11);
``` sslx509.c

```
        if (len < 0) {
            SSL_SetError(SSL_ERROR_BAD_CERT);
            return 0;
        }
        base = base + 1 + ll;

/* Capture public key info */
        if (base[0] != 0x02) {                          /* n */
            SSL_SetError(SSL_ERROR_BAD_CERT);
            return 0;
        }
        nlen = GetLength(&base[1], &ll);
        if (nlen < 0) {
            SSL_SetError(SSL_ERROR_BAD_CERT);
            return 0;
        }
        n = base + 1 + ll;
        base = n + nlen;
        if (base[0] != 0x02) {                          /* e */
            SSL_SetError(SSL_ERROR_BAD_CERT);
            return 0;
        }
        elen = GetLength(&base[1], &ll);
        if (elen < 0) {
            SSL_SetError(SSL_ERROR_BAD_CERT);
            return 0;
        }
        e = base + 1 + ll;
        if (n[0] == 0x00) {
            n++;
            nlen--;
        } pubKey = CreatePublicKey(n, nlen, e, elen);
        return pubKey;
} unsigned char *
FindAttrInRDN(unsigned char const *rdn,
              int rdnlen,
              unsigned char const *attrtype,
              int typelen)
{
    int ll;
    int avalen;
    unsigned const char *ava;
    int len, checklen, vallen;
    unsigned const char *type, *val;
    unsigned char *retval;

while ( rdnlen > 0 ) {
        if ( rdn[0] != 0x30 ) { /* start of an AVA(SEQ OF(TYPE, VAL)) */
            SSL_SetError(SSL_ERROR_BAD_CERT);
            return 0;
        } avalen = GetLength(&rdn[1], &ll);
        rdnlen = rdnlen - 1 - ll - avalen;

if ( rdnlen < 0 ) {
            SSL_SetError(SSL_ERROR_BAD_CERT);
            return 0;
        } ava = rdn + 1 + ll;
        rdn = ava + avalen;
``` ssIx509.c

```c
		if ( ava[0] != 0x6 ) { /* object id of attr type */
			SSL_SetError(SSL_ERROR_BAD_CERT);
			return 0;
		} len = GetLength(&ava[1], &l1);
		if ( len == typelen ) {
			type = ava + 1 + l1;
			checklen = avalen - 1 - l1 - typelen;
			if ( memcmp(attrtype, type, len) == 0 ) {
				/* match found */
				val = type + typelen;
				if ( val[0] != 0x13 ) { /* value is printable string */
					SSL_SetError(SSL_ERROR_BAD_CERT);
					return 0;
				} vallen = GetLength(&val[1], &l1);
				val = val + 1 + l1;
				checklen = checklen - 1 - l1 - vallen;
				if ( checklen != 0 ) {
					SSL_SetError(SSL_ERROR_BAD_CERT);
					return 0;
				}

/* malloc space for the value string and copy it */
				retval = (char *)calloc(1, vallen+1);
				if ( retval ) {
					memcpy(retval, val, vallen);
					retval[vallen] = 0;
				} return(retval);
			}
		}
	}
	return 0;
}
unsigned char *
FindAttrInName(unsigned char const *name,
		int namelen,
		unsigned char const *attrtype,
		int typelen)
{
	int l1;
	int rdnlen;
	unsigned const char *rdn;
	unsigned char *value;

while ( namelen > 0 ) {
		if ( name[0] != 0x31 ) { /* start of an RDN(SET OF AVA) */
			SSL_SetError(SSL_ERROR_BAD_CERT);
			return 0;
		} rdnlen = GetLength(&name[1], &l1);
		namelen = namelen - 1 - l1 - rdnlen;

if ( namelen < 0 ) {
			SSL_SetError(SSL_ERROR_BAD_CERT);
			return 0;
		} rdn = name + 1 + l1;
		name = rdn + rdnlen;
``` sslx509.c

```
            value = FindAttrInRDN(rdn, rdnlen, attrtype, typelen);
            if ( value ) {
                return(value);
            }
        }
    }
    return 0;
}
static unsigned char commonName[] = { 0x55, 0x4, 0x3 };
char *X509_FindSubject(unsigned char const *cert, int certlen)
{
    int subjlen, len, ll, baselen, bslen, nlen, elen, bodylen, outerlen;
    unsigned char const *base, *n, *e, *body;
    unsigned char *cname;

/* Strip off outer wrapping */
    if (cert[0] != 0x30) {
        SSL_SetError(SSL_ERROR_BAD_CERT);
        return 0;
    } outerlen = GetLength(&cert[1], &ll);
    if (outerlen < 0) {
        SSL_SetError(SSL_ERROR_BAD_CERT);
        return 0;
    } cert = cert + 1 + ll;
    certlen = certlen - 1 - ll;
    if (certlen < 0) {
        SSL_SetError(SSL_ERROR_BAD_CERT);
        return 0;
    }

/* Find the certificate body */
    if (cert[0] != 0x30) {
        SSL_SetError(SSL_ERROR_BAD_CERT);
        return 0;
    } bodylen = GetLength(&cert[1], &ll);
    if (bodylen < 0) {
        SSL_SetError(SSL_ERROR_BAD_CERT);
        return 0;
    } body = cert;
    bodylen = 1 + ll + bodylen;
    cert = cert + bodylen;
    certlen = certlen - bodylen;
    if (certlen < 0) {
        SSL_SetError(SSL_ERROR_BAD_CERT);
        return 0;
    }

/* Get to subject */
    if (body[0] != 0x30) {
        SSL_SetError(SSL_ERROR_BAD_CERT);
        return 0;
    }
    len = GetLength(&body[1], &ll);
    if (len < 0) {
        SSL_SetError(SSL_ERROR_BAD_CERT);
        return 0;
    }
``` sslx509.c

```
}
body = body + 1 + 11;
bodylen = bodylen - 1 - 11;
if (bodylen < 0) {
    SSL_SetError(SSL_ERROR_BAD_CERT);
    return 0;
}
if (Skip(&body, &bodylen, 0x02)) {          /* sn */
    SSL_SetError(SSL_ERROR_BAD_CERT);
    return 0;
}
if (Skip(&body, &bodylen, 0x30)) {          /* sig alg */
    SSL_SetError(SSL_ERROR_BAD_CERT);
    return 0;
}
if (Skip(&body, &bodylen, 0x30)) {          /* issuer */
    SSL_SetError(SSL_ERROR_BAD_CERT);
    return 0;
}
if (Skip(&body, &bodylen, 0x30)) {          /* validity */
    SSL_SetError(SSL_ERROR_BAD_CERT);
    return 0;
}

/* we should be at the subject field now */
if ( body[0] != 0x30 ) {
    SSL_SetError(SSL_ERROR_BAD_CERT);
    return 0;
} subjlen = GetLength(&body[1], &ll);
body = body + 1 + ll;
bodylen = bodylen - 1 - ll;

if ( ( bodylen < 0 ) || ( bodylen < subjlen ) ) {
    SSL_SetError(SSL_ERROR_BAD_CERT);
    return 0;
} return(FindAttrInName(body, subjlen, commonName, sizeof(commonName)));
} char *
SSL_GetPeerCommonName(SSLHandle *h)
{
    if ( h->peerCert ) {
        return X509_FindSubject(h->peerCert, h->peerCertLen);
    } else {
        return 0;
    }
} int X509_CheckCert(SSLHandle *h, unsigned char const *cert, int certlen)
{
    unsigned char const *body, *alg, *sig;
    int rv, outerlen, bodylen, alglen, siglen, ll, da;
    RSAPublicKey *pubKey;

/* Strip off outer wrapping */
    if (cert[0] != 0x30) return SSL_SetError(SSL_ERROR_BAD_CERT);
    outerlen = GetLength(&cert[1], &ll);
    if (outerlen < 0) return SSL_SetError(SSL_ERROR_BAD_CERT);
    cert = cert + 1 + ll;
    certlen = certlen - 1 - ll;
    if (certlen < 0) return SSL_SetError(SSL_ERROR_BAD_CERT);
``` ssix509.c

```c
/* Find the certificate body */
if (cert[0] != 0x30) return SSL_SetError(SSL_ERROR_BAD_CERT);
bodylen = GetLength(&cert[1], &11);
if (bodylen < 0) return SSL_SetError(SSL_ERROR_BAD_CERT);
body = cert;
bodylen = 1 + 11 + bodylen;
cert = cert + bodylen;
certlen = certlen - bodylen;
if (certlen < 0) return SSL_SetError(SSL_ERROR_BAD_CERT);

/* Find the algorithm info */
if (cert[0] != 0x30) return SSL_SetError(SSL_ERROR_BAD_CERT);
alglen = GetLength(&cert[1], &11);
if (alglen < 0) return SSL_SetError(SSL_ERROR_BAD_CERT);
alg = cert;
alglen = 1 + 11 + alglen;
cert = cert + alglen;
certlen = certlen - alglen;
if (certlen < 0) return SSL_SetError(SSL_ERROR_BAD_CERT);

/* Find the signature */
if (cert[0] != 0x03) return SSL_SetError(SSL_ERROR_BAD_CERT);
siglen = GetLength(&cert[1], &11);
if (siglen < 0) return SSL_SetError(SSL_ERROR_BAD_CERT);
sig = cert + 1 + 11;
certlen = certlen - 1 - 11 - siglen;
if (certlen != 0) return SSL_SetError(SSL_ERROR_BAD_CERT);
if (sig[0] != 0x00) return SSL_SetError(SSL_ERROR_BAD_CERT);
sig++; siglen--;

/* See if we know the certificate issuer */
pubKey = FindIssuer(body, bodylen);
if (!pubKey) return SSL_SetError(SSL_ERROR_BAD_CERT);

/*
** Next, check the signature. First figure out what kind of hash
** function was used by examining the alginfo.
*/
if ((alglen == sizeof(md2_alg)) && (memcmp(alg, md2_alg, alglen) == 0)) {
    da = SSL_MD2;
} else
if ((alglen == sizeof(md5_alg)) && (memcmp(alg, md5_alg, alglen) == 0)) {
    da = SSL_MD5;
} else
    return SSL_SetError(SSL_ERROR_BAD_CERT);

rv = PKCS1_VerifySignature(da, body, bodylen, sig, siglen, pubKey);
if (rv) {
    return SSL_SetError(SSL_ERROR_BAD_CERT_SIG);
}

/* XXX no validity checking yet */

/* Extract public key and put into h */
pubKey = ExtractPublicKey(body, bodylen);
if (!pubKey) return SSL_SetError(SSL_ERROR_BAD_CERT);
h->pubKey = pubKey;
return 0;
}
``` t_stdlib.c

```
/*
** Copyright (c) 1995  Netscape Communications Corporation.  All rights
** reserved.  This use of this Secure Sockets Layer Reference
** Implementation (the "Software") is governed by the terms of the SSL
** Reference Implementation License Agreement.  Please read the
** accompanying "License" file for a description of the rights granted.
** Any other third party materials you use with this Software may be
** subject to additional license restrictions from the licensors of such
** third party software and/or additional export restrictions.  The SSL
** Implementation License Agreement grants you no rights to any such
** third party material.
*/
ifdef BSAFE include "sslcfg.h"
include <stdio.h>
#include <stdlib.h>
#include <string.h>

/*
** Standard implementation of the T_ functions for bsafe2 assuming a
** complete ANSI environment.
*/ void T_free(POINTER block)
{
    if (block != NULL_PTR) {
        free(block);
    }
}

POINTER T_malloc(unsigned int len)
{
    return (POINTER) malloc(len ? len : 1);
} int T_memcmp(POINTER firstBlock, POINTER secondBlock, unsigned int len)
{
    if (len == 0) {
        return 0;
    }
    return memcmp(firstBlock, secondBlock, len);
} void T_memcpy(POINTER output, POINTER input, unsigned int len)
{
    if (len != 0) {
        memcpy(output, input, len);
    }
} void T_memmove(POINTER output, POINTER input, unsigned int len)
{
    if (len != 0) {
        memmove(output, input, len);
    }
} void T_memset(POINTER output, int value, unsigned int len)
{
    if (len != 0) {
        memset(output, value, len);
    }
}

POINTER T_realloc(POINTER block, unsigned int len)
``` t_stdlib.c

```
    POINTER rv;

if (block == NULL_PTR)
        return malloc(len ? len : 1);

rv = (POINTER) realloc(block, len ? len : 1);
    if (rv == NULL_PTR) {
        free(block);
    }
    return rv;
} endif /* BSAFE */
```

What is claimed is:

1. A socket application interface computer program product that interfaces application program code executing in an application layer to transport protocol layer services code, comprising:

application program interface code that encrypts information received from the application program code; and means for providing the encrypted information to the transport protocol layer services code.

2. A socket application interface computer program product that interfaces application program code executing in an application layer to transport protocol layer services code, comprising:

means for decrypting encrypted information received from the transport protocol layer services code;

application program interface code that provides the decrypted information to the application layer program.

3. A client security software application for use by a client application executing on a client computer, for setting up a secure socket connection for secure data transfer between the client computer and a server computer:

means for causing the client computer to transmit to the server computer a client-hello message including challenge data and client cipher-specs data, the client cipher-specs data indicating an indication of at least one bulk cipher supported by the client computer;

means for causing the client computer to receive from the server computer a server-hello message including connection_identification data, server_certificate data and server cipher-specs data, wherein the server cipher-specs data includes an indication of a bulk cipher to be used during the secure data transfer.

4. A client security software application as in claim 3, and further comprising:

means for providing a master key to the server computer.

5. A client security software application as in claim 4, wherein the master key provided to the server computer is encrypted using a key exchange encryption algorithm.

6. A client security software application as in claim 5, wherein the key exchange encryption algorithm is an RSA public key exchange encryption algorithm.

7. A client security software application as in claim 4, wherein the master key providing means includes means for generating the master key by randomly generating a number.

8. A client security software application as in claim 4, and further comprising:

means for generating a session key.

9. A client security software application as in claim 8, wherein the session key generating means includes means for applying a hash function to the master key.

10. A client security software application as in claim 8, and further comprising:

means for providing to the server computer a client-finished message indicating that the client security software application is satisfied with the server.

11. A client security software application as in claim 10, wherein the client-finished message includes an encoding of selected cases of handshake protocol messages previously sent to the client computer by the server during since the client computer sent the client-hello message.

12. A client security software application as in claim 11, wherein the encoding included in the client-finished message is a hash encoding.

13. A client security software as in claim 11, wherein the encoding included in the client-finished message is as application of the bulk cipher received from the server computer.

14. A client security software application as in claim 11, and further including:

means for receiving from the server computer a server verification message indicating a verification from the server computer of the integrity of the secure socket connection.

15. A client security software application as in claim 10, and further comprising:

means for receiving from the server computer a server-finished message indicating that the server computer is satisfied with the client and is ready to begin communication via the secure socket connection.

16. A client security software application as in claim 15, wherein:

the server-finished message receiving means includes means for receiving from the server computer a new_session_identifier of the server-finished message.

17. A client security software application as in claim 16, and further comprising:

means, responsive to the received server-finished message, for storing the received new-session-identifier in a memory along with corresponding security parameters including the encryption algorithm selection, for use in a future secure socket connection between the client computer and the server computer.

18. A client security software application as in claim 15, wherein the server-finished message includes an encryption of selected ones of handshake protocol messages sent by the server computer to the client computer since the server computer sent the server-hello message to the client computer.

19. A client security software application as in claim 18, wherein the encryption included in the server-finished message is a hash encryption.

20. A client security software application as in claim 19, wherein the hash encryption included in the server-finished message is performed using the agreed-upon bulk cipher and the session key generated by the server computer.

21. A client security software application as in claim 20, wherein the server-finished message includes challenge data sent in the client-hello message, encrypted by the selected bulk cipher using the server write key.

22. A client security software application as in claim 21, and further comprising:

means for decrypting the encrypted challenge data received from the server computer and for comparing the decrypted challenge data to the challenge data sent to the server computer in the client-hello message.

23. A client security software application as in claim 17, further including:

interval timer means to measure whether a length of time that the new-session-identifiers and corresponding security parameters have been stored exceeds a predetermined interval; and means for deleting the stored new session_identifier from the memory if the predetermined interval is exceeded.

24. A client security software application as in claim 23, and further including:

means for resetting the interval timer means in response to a subsequent request by the client for a secure socket connection to the server computer session-identifier matching a new-session-identifier stored in the memory.

25. A client security software application as in claim 23, and further including:

means for receiving a server-hello message from the server that includes a session_identification_hit indication;

means responsive to the session_identification_hit indication, for using the security parameters that were previously stored in the cache and that correspond the session-identification sent by the client computer to the server computer in the client-hello message.

26. A client security software application as in claim 3, wherein the client-hello message and the server-hello message are sent in the clear.

27. A socket application interface computer program product as in claim 7, and further comprises:

means for receiving a request, from a Winsock program, for a socket connection to a server computer;

means responsive to the request receiving means, for establishing the socket connection via an operating system protocol stack;

means for receiving an indication that socket connection has been successfully established and for so notifying the Winsock program.

* * * * *